(12) United States Patent
Herr et al.

(10) Patent No.: US 12,393,423 B2
(45) Date of Patent: Aug. 19, 2025

(54) METHODS AND APPARATUS FOR INTENTIONAL PROGRAMMING FOR HETEROGENEOUS SYSTEMS

(71) Applicant: Intel Corporation, Santa Clara, CA (US)

(72) Inventors: Adam Herr, Forest Grove, OR (US); Derek Gerstmann, Del Mar, CA (US); Justin Gottschlich, Santa Clara, CA (US); Mikael Bourges-Sevenier, Santa Clara, CA (US); Sridhar Sharma, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/434,426

(22) Filed: Feb. 6, 2024

(65) Prior Publication Data

US 2024/0329997 A1 Oct. 3, 2024

Related U.S. Application Data

(63) Continuation of application No. 17/672,142, filed on Feb. 15, 2022, now Pat. No. 11,941,400, which is a
(Continued)

(51) Int. Cl.
*G06F 9/30* (2018.01)
*G06F 8/30* (2018.01)
(Continued)

(52) U.S. Cl.
CPC ............ *G06F 9/30174* (2013.01); *G06F 8/31* (2013.01); *G06F 8/52* (2013.01); *G06F 8/75* (2013.01);
(Continued)

(58) Field of Classification Search
CPC .......... G06F 9/30174; G06F 8/31; G06F 8/52; G06F 8/75; G06F 8/76; G06F 9/3877
See application file for complete search history.

(56) References Cited

U.S. PATENT DOCUMENTS 8,296,743 B2 * 10/2012 Linderman ............. G06F 9/505
717/140
9,483,282 B1 11/2016 Vandervennet
(Continued)

OTHER PUBLICATIONS

United States Patent and Trademark Office, "Corrected Notice of Allowance" issued in connection with U.S. Appl. No. 16/455,628, dated Feb. 26, 2021, 7 pages.
(Continued)

*Primary Examiner* — S. Sough
*Assistant Examiner* — Cheneca Smith
(74) *Attorney, Agent, or Firm* — HANLEY, FLIGHT & ZIMMERMAN, LLC

(57) ABSTRACT

Methods, apparatus, systems and articles of manufacture are disclosed for intentional programming for heterogeneous systems. An example apparatus includes a code lifter to identify annotated code corresponding to an algorithm to be executed on the heterogeneous system based on an identifier being associated with the annotated code, and convert the annotated code in the first representation to intermediate code in a second representation by identifying the intermediate code as having a first algorithmic intent that corresponds to a second algorithmic intent of the annotated code, a domain specific language (DSL) generator to translate the intermediate code in the second representation to DSL code in a third representation when the first algorithmic intent matches the second algorithmic intent, the third representation corresponding to a DSL representation, and a code replacer to invoke a compiler to generate an executable including variant binaries based on the DSL code.

18 Claims, 17 Drawing Sheets

Related U.S. Application Data continuation of application No. 16/455,388, filed on Jun. 27, 2019, now Pat. No. 11,269,639.

(51) Int. Cl.

| | |
|---|---|
| *G06F 8/52* | (2018.01) |
| *G06F 8/75* | (2018.01) |
| *G06F 8/76* | (2018.01) |
| *G06F 9/38* | (2018.01) |
| *G06N 3/04* | (2023.01) |

(52) U.S. Cl.
CPC .............. *G06F 8/76* (2013.01); *G06F 9/3877* (2013.01); *G06N 3/04* (2013.01)

(56) References Cited

U.S. PATENT DOCUMENTS

| | | |
|---|---|---|
| 9,800,466 B1 | 10/2017 | Rangole |
| 10,007,520 B1 | 6/2018 | Ross |
| 10,187,252 B2 | 1/2019 | Byers |
| 10,289,394 B2 | 5/2019 | Huang et al. |
| 10,445,118 B2 | 10/2019 | Guo |
| 10,713,213 B2 | 7/2020 | Tamir |
| 10,831,451 B2 | 11/2020 | Udupa et al. |
| 10,908,884 B2 | 2/2021 | Herr |
| 11,036,477 B2 | 6/2021 | Herr |
| 11,269,639 B2 | 3/2022 | Herr et al. |
| 11,449,347 B1* | 9/2022 | Kong ................ G06F 16/285 |
| 2009/0158248 A1 | 6/2009 | Linderman |
| 2010/0153934 A1 | 6/2010 | Lachner |
| 2011/0289519 A1 | 11/2011 | Frost |
| 2013/0212365 A1 | 8/2013 | Chen |
| 2016/0210174 A1 | 7/2016 | Hsieh |
| 2016/0350088 A1 | 12/2016 | Ravishankar |
| 2017/0123775 A1 | 5/2017 | Xu |
| 2018/0082212 A1 | 3/2018 | Faivishevsky |
| 2018/0173675 A1 | 6/2018 | Tamir |
| 2018/0183660 A1 | 6/2018 | Byers |
| 2019/0103872 A1* | 4/2019 | Clark ............... H03K 19/1776 |
| 2019/0317740 A1 | 10/2019 | Herr |
| 2019/0317741 A1 | 10/2019 | Herr |
| 2019/0317880 A1 | 10/2019 | Herr |
| 2019/0324755 A1 | 10/2019 | Herr et al. |
| 2020/0334084 A1* | 10/2020 | Jacobson ............ G06F 11/3037 |

OTHER PUBLICATIONS

United States Patent and Trademark Office, "Non-Final Action" issued in U.S. Appl. No. 16/455,388 on Mar. 3, 2021 (21 pages).
United States Patent and Trademark Office, "Advisory Action" issued in connection with U.S. Appl. No. 16/455,486 dated Mar. 10, 2021, 4 pages.
United States Patent and Trademark Office, "Corrected Notice of Allowance" issued in connection with U.S. Appl. No. 16/455,628, dated May 7, 2021, 2 pages.
United States Patent and Trademark Office, "Final Action" issued in U.S. Appl. No. 16/455,388 on Jul. 7, 2021 (20 pages).
United States Patent and Trademark Office, "Advisory Action", issued in connection with U.S. Appl. No. 16/455,388, filed Oct. 13, 2021, 3 pages.
United States Patent and Trademark Office, "Notice of Allowance" issued in U.S. Appl. No. 16/455,388 on Nov. 2, 2021 (7 pages).
European Patent Office, "Communication pursuant to Article 94(3) EPC," issued in connection with European patent application No. 20165699.8-1203, Jul. 5, 2022, 8 pages.
United States Patent and Trademark Office, "Non-Final Office Action", issued in connection with U.S. Appl. No. 17/672,142, Apr. 13, 2023, 19 pages.
European Patent Office, "Communication under Rule 71(3) EPC— Intention to Grant," issued in connection with European Patent Application No. 20 165 699.8-1203, dated Oct. 20, 2023, 98 pages.

United States Patent and Trademark Office, "Notice of Allowance and Fee(s) Due," issued in connection with U.S. Appl. No. 17/672,142, dated Nov. 7, 2023, 8 pages.
United States Patent and Trademark Office, "Notice of Allowance," issued in connection with U.S. Appl. No. 17/672,142, dated Feb. 28, 2024, 3 pages.
European Patent Office, "Extended European Search Report," issued in connection with European Patent Application No. 24155106.8-1203, dated Mar. 28, 2024, 16 pages.
P. Balaprakash et al., "Autotuning in High-Performance Computing Applications," in Proceedings of the IEEE, vol. 106, No. 11, pp. 2068-2083, Nov. 2018, doi: 10.1109/JPROC.2018.2841200 (16 pages).
Ragan-Kelley, "Halide," [Online]. last retrieved Jul. 10, 2019, Available: http://halide-lang.org/, 3 pages.
United States Patent and Trademark Office, "Corrected Notice of Allowance" issued in connection with U.S. Appl. No. 16/455,379, dated Dec. 11, 2020, 2 pages.
Chen et al., "Learning to Optimize Tensor Programs," 32nd Conference on Neural Information Processing Systems (NeurIPS 2018), Montréal, Canada, 12 pages.
Mullapudi et al., "Automatically Scheduling Halide Image Processing Pipelines," SIGGRAPH, Anaheim, Jul. 24-28, 2016, 11 pages.
Chen et al., "TVM: An Automated End-to-End Optimizing Compiler for Deep Learning," in SysML 2018, Palo Alto, 2018, 17 pages.
Iyer, Srinivasan, et al., "Learning a Neural Semantic Parser from User Feedback," Proceedings of the 55th Annual Meeting of the Association for Computational Linguistics, Vancouver, Canada, Jul. 30-Aug. 4, 2017, p. 963-973 (11 pages).
Ragan-Kelley et al., "Halide: a language and compiler for optimizing parallelism, locality, and recomputation in image processing pipelines," PLDI Seattle, Jun. 16-21, 2013, 12 pages.
Hoffmann et al., "Dynamic Knobs for Responsive Power-Aware Computing," Mar. 2011, 14 pages.
Huang et al., "Programming and Runtime Support to Blaze FPGA Accelerator Deployment at Datacenter Scale," Oct. 2016, 21 pages.
Bergeron et al., "Hardware JIT compilation for off-the-shelf dynamically reconfigurable FPGAs," DIRO, Universite de Montreal GRM, Ecole Polytechnique de Montreal, Budapest, Hungary, Mar. 29-Apr. 6, 2008, 16 pages.
Greskamp et al., "A Virtual Machine for Merit-Based Runtime Reconfiguration," Proceedings of the 13th Annual IEEE Symposium on Field-Programmable Custom Computing Machines, 2005, 2 pages.
Ragan-Kelley, "Decoupling Algorithms from the Organization of Computation for High Performance Image Processing: The design and implementation of the Halide language and compiler," MIT, Cambridge, MA, Jun. 2014, 187 pages.
Yaghmazadeh, Navid, et al., "SQLizer: Query Synthesis from Natural Language," Proc. ACM Program. Lang., vol. 1, No. OOPSLA, Article 63, Oct. 2017, p. 63:1-63:26 (26 pages).
Altera, "FPGA Run-Time Reconfiguration: Two Approaches," Mar. 2008, ver. 1.0, 6 pages.
Munshi et al., "OpenCL Programming Guide," Addison-Wesley Professional, Upper Saddle River, 2012, 120 pages.
Van De Geijn et al., "SUMMA: Scalable Universal Matrix Multiplication Algorithm," University of Texas at Austin, Austin, 1995, 19 pages.
Wang et al. "EXOCHI", Proceedings of the 2007 ACM SIGPLAN Conference on Programming Language Design and Implementation— PLDI '07: San Diego, CA, USA, Jun. 10-13, 2007; doi:10.1145/1250734.1250753, 11 pages.
Dagum et al., "OpenMP: An Industry-Standad API for Shared-Memory Programming," IEEE Computational Science and Engineering, vol. 5, No. 1, pp. 46-55, Jan.-Mar. 1998, 10 pages.
Nickolls et al., "Scalable parallel programming with CUDA," ACM Queue-GPU Computing, vol. 6, No. 2, pp. 40-53, 2008, I. Buck, M. Garland and K. Skadron, "Scalable Parallel Programming with CUDA," ACM Queue-GPU Computing, vol. 6, No. 2, pp. 40-53, Apr. 28, 2008, 19 pages.
Raman et al., "Parcae: A system for flexibble parallel execution," Jun. 2012, 20 pages.

(56) References Cited

OTHER PUBLICATIONS

The Khronos Group, "OpenCL Specification," Nov. 14, 2012, version 1.2, 380 pages.
Lei, Tao et al., "From Natural Language Specifications to Program Input Parsers," Proceedings of the 51st Annual Meeting of the Association for Computational Linguistics (vol. 1: Long Papers), Sofia, Bulgaria, Aug. 2013, pp. 1294-1303, 10 pages.
Ansel et al., "OpenTuner: An Extensible Framework for Program Autotuning," Computer Science and Artificial Intelligence Laboratory Technical Report, MIT, Cambridge, Nov. 1, 2013, 15 pages.
Kamil et al., "Verified Lifting of Stencil Computations," PLDI, Santa Barbara, pp. 711-726, Jun. 13-17, 2016, 16 pages.
Intel, "Intel® FPGA SDK for OpenCL Best Practices Guide," May 8, 2017, 135 pages.
Cray X1TM System, "Optimizing Processor-bound Code," http://docs.cray.com/books/S-2315-52/html-S-2315-52/z1073673157.html, 12 pages, retrieved on Sep. 22, 2017.
Greaves, "Distributing C# Methods and Threads over Ethernet-connected FPGAs using Kiwi," 2011, retrieved on Sep. 22, 2017, 13 pages.
Altera, "Machines Ensuring the Right Path," retrieved on Sep. 22, 2017, 4 pages.
IBM Reasearch, "Liquid Metal," retrieved on Sep. 22, 2017, http://researcher.watson.ibm.com/researcher/view_group.php?id=122, 4 pages.
Maaz Bin Safeer Ahmad et al: "Automatically Leveraging MapReduce Frameworks for Data-Intensive Applications", arxiv.org, Cornell University Library, 201 Olin Library Cornell University Ithaca, NY 14853, Jan. 30, 2018 (Jan. 30, 2018), XP081235403, DOI: 10.1145/3183713.3196891.
Justin Gottschlich et al., "The Three Pillars of Machine Programming," Intel Labs, MIT, May 8, 2018 (11 pages).
United States Patent and Trademark Office, "Non-Final Office Action" issued in connection with U.S. Appl. No. 15/713,301, dated Jul. 20, 2018, 10 pages.
United States Patent and Trademark Office, "Final Office Action", issued in connection with U.S. Appl. No. 15/713,301, on Jan. 28, 2019, 12 pages.
Barati Saeid et al., "Proteus: Language and Runtime Support for Self-Adaptive Software Development," IEEE Software, Institute of Electrical and Electronics Engineers, US, vol. 36, No. 2, Mar. 1, 2019, pp. 73-82, XP01171520, ISSN: 0740-7459, DOI: 10.1109/MS.2018.2884864, retrieved on Feb. 21, 2019, http://dx.doi.org/10.1109/MS.2018.2884864.
Sami Lazreg et al., "Multifaceted Automated Analyses for Variability-intensive embedded systems," 41st ACM/IEEE International Conference on Software Engineering, May 2019, Montreal, Canada, hal-02061251, retrieved online Jan. 28, 2021, pp. 854-865, retrieved from the internet, <URL: https://ieeeexplore.ieee.org/stamp.jsp?ip=&arnumber=8812057>, 13 pages.
United States Patent and Trademark Office, "Notice of Allowance", issued in connection with U.S. Appl. No. 15/713,301, on May 23, 2019, 7 pages.
Mejbah Alam et al., "A Zero-Positive Learning Approach for Diagnosing Software Performance Regressions," May 31, 2019, XP055749022, Retrieved from the Internet: URL: https://arxiv.org/pdf/1709.07536v4.pdf, retrieved on Nov. 10, 2020
Adams et al., "Learning to Optimize Halide with Tree Search and Random Programs," ACM Trans. Graph, vol. 38, No. 4, pp. 121:1-121:12, Jul. 2019, 12 pages.
Ahmad, M. and Cheung, A., "Metalift," [Online]. Last retrieved Jul. 10, 2019, Available: http://metalift.uwplse.org/., 4 pages.
"SYCL: C++ Single-source Heterogeneos Programming for OpenCL," Khronos, [Online] last retrieved Jul. 10, 2019, available: https://www.khronos.org/sycl/, 7 pages.
The Khronos Group, "Vulkan 1.1 API Specification." Khronos, Mar. 2018, [Online]. last retrieved Sep. 25, 2019, Available: https://www.khronos.org/registry/vulkan/, 15 pages.
Ahmad et al., "Automatically translating image processing libraries to Halide," ACM Trans. Graph. vol. 38, No. 6, pp. 204:2-204:13, last retrieved Oct. 2, 2019.
United States Patent and Trademark Office, "Non-Final Office Action" issued in connection with U.S. Appl. No. 16/455,379, dated Apr. 13, 2020, 11 pages.
United States Patent and Trademark Office, "Non-Final Office Action", issued in connection with U.S. Appl. No. 16/455,486, on Jun. 25, 2020, 16 pages.
United States Patent and Trademark Office, "Notice of Allowance", issued in connection with U.S. Appl. No. 16/455,379, on Jul. 23, 2020, 10 pages.
United States Patent and Trademark Office, "Non-Final Office Action", issued in connection with U.S. Appl. No. 16/455,628, on Aug. 7, 2020, 18 pages.
United States Patent and Trademark Office, "Corrected Notice of Allowance" issued in connection with U.S. Appl. No. 16/455,379, dated Aug. 28, 2020, 2 pages.
European Patent Office, "European Search Report," issued in connection with European patent application No. 20165699.8-1224, Nov. 19, 2020, 11 pages.
United States Patent and Trademark Office, "Corrected Notice of Allowance", issued in connection with U.S. Appl. No. 16/455,628, on Dec. 11, 2020, 2 pages.
United States Patent and Trademark Office, "Final Office Action" issued in connection with U.S. Appl. No. 16/455,486, dated Dec. 14, 2020, 19 pages.
United States Patent and Trademark Office, "Corrected Notice of Allowance", issued in connection with U.S. Appl. No. 16/455,379, on Dec. 30, 2020, 5 pages.
United States Patent and Trademark Office, "Notice of Allowance" issued in connection with U.S. Appl. No. 16/455,628, dated Feb. 5, 2021, 9 pages.
Alam et al., "A Zero-Positive Learning Approach for Diagnosing Software Performance Regressions," arXiv:1709.07536, dated May 31, 2019, 12 pages.
Barati et al., "Proteus: Language and Runtime Support for Self-Adaptive Software Development," published in IEEE Software, vol. 36, Issue: 2, Mar.-Apr. 2019, published Feb. 22, 2019, 10 pages.
European Patent Office, "Communication pursuant to Article 94(3) EPC," issued in connection with European Patent Application No. 24155106.8, dated Mar. 10, 2025, 6 pages.

\* cited by examiner

METHODS AND APPARATUS FOR INTENTIONAL PROGRAMMING FOR HETEROGENEOUS SYSTEMS

RELATED APPLICATION

This patent arises from a continuation of U.S. patent application Ser. No. 17/672,142 (now U.S. Pat. No. 11,941,400), which was filed on Feb. 15, 2022, and is a continuation of U.S. patent application Ser. No. 16/455,388 (now U.S. Pat. No. 11,269,639), which was filed on Jun. 27, 2019. U.S. patent application Ser. No. 17/672,142 and U.S. patent application Ser. No. 16/455,388 are hereby incorporated herein by reference in their entireties. Priority to U.S. patent application Ser. No. 17/672,142 and U.S. patent application Ser. No. 16/455,388 is hereby claimed.

FIELD OF THE DISCLOSURE

This disclosure relates generally to machine learning and, more particularly, to methods and apparatus for intentional programming for heterogeneous systems.

BACKGROUND

Computer hardware manufacturers develop hardware components for use in various components of a computer platform. For example, computer hardware manufacturers develop motherboards, chipsets for motherboards, central processing units (CPUs), graphics processing units (GPUs), vision processing units (VPUs), field programmable gate arrays (FPGAs), hard-disk drives (HDDs), solid-state drives (SSDs), and other computer components. Many computer hardware manufacturers develop programs and/or other methods to compile algorithms and/or other code to be run on a specific processing platform.

Figure 1:
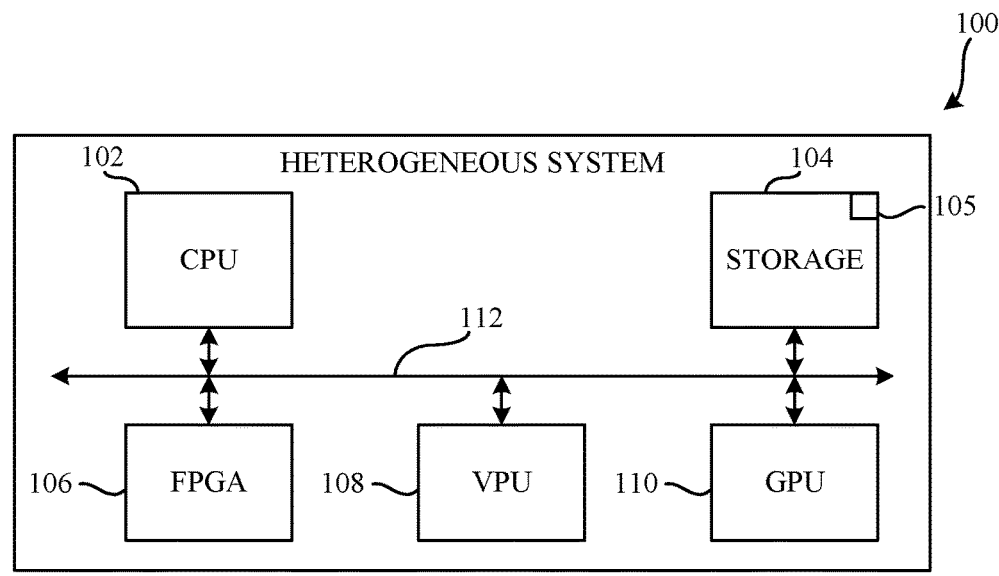
FIG. 1 depicts a block diagram illustrating an example heterogeneous system.

The figures are not to scale. In general, the same reference numbers will be used throughout the drawing(s) and accompanying written description to refer to the same or like parts. Connecting lines or connectors shown in the various figures presented are intended to represent example functional relationships and/or physical or logical couplings between the various elements.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Many computer hardware manufacturers and/or other providers develop programs and/or other methods to compile algorithms and/or other code to be run on a specific processing platform. For example, some computer hardware manufacturers develop programs and/or other methods to compile algorithms and/or other code to be run on a CPU, an FPGA, a GPU, or a VPU. Such programs and/or other methods function using domain specific languages (DSLs). DSLs (e.g., Halide, OpenCL, etc.) utilize the principle of separation of concerns to separate how an algorithm (e.g., a program, a block of code, etc.) is written from how the algorithm is executed. For example, many DSLs prompt a developer of an algorithm to implement a high-level strategy to map a processing pipeline for the algorithm to a parallel machine (e.g., a schedule).

For example, an algorithm may be defined to blur an image (e.g., how the algorithm is written) and a developer may desire for the algorithm to run effectively on a CPU, an FPGA, a GPU, and a VPU. To effectively run the algorithm on the various types of processing elements (e.g., a CPU, an FPGA, a GPU, a VPU, a heterogeneous system, etc.), a schedule is to be generated. To generate the schedule, the algorithm is transformed in different ways depending on the particular processing element. Many methods of automating compilation time scheduling of an algorithm have been developed. For example, compilation auto-scheduling may include auto-tuning, heuristic searching, and hybrid scheduling.

Auto-tuning includes compiling an algorithm in a random way, executing the algorithm, measuring the performance of the processing element, and repeating the process until a threshold of performance has been met (e.g., power consumption, speed of execution, etc.). However, in order to achieve a desired threshold of performance, an extensive compilation time is required, and the compilation time is compounded as the complexity of the algorithm increases.

Heuristic searching includes (1) applying rules that define types of algorithm transformations that will improve the performance to meet a performance threshold and (2) applying rules that define types of algorithm transformations that will not improve the performance to meet the performance threshold. Then, based on the rules, a search space can be defined and searched based on a cost model. The cost model, however, is generally specific to a particular processing element. Similarly, the cost model is difficult to define for an arbitrary algorithm. For example, cost models work for predetermined conditions, but for unknown conditions cost models generally fail.

Hybrid scheduling includes utilizing artificial intelligence (AI) to identify a cost model for a generic processing element. The cost model can correspond to representing, predicting, and/or otherwise determining computation costs of one or more processing elements to execute a portion of code to facilitate processing of one or more workloads. For example, artificial intelligence including machine learning (ML), deep learning (DL), and/or other artificial machine-driven logic enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. Some types of machine learning models include, for example, a support vector machine (SVM), a neural network (NN), a recurrent neural network (RNN), a convolutional neural network (CNN), a long short term memory (LSTM), a gate recurrent unit (GRU), etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

Training is performed using training data. Once training is complete, the model is deployed for use as an executable construct that processes an input and provides an output based on the network of nodes and connections defined in the model.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Regardless of the ML/AI model that is used, once the ML/AI model is trained, the ML/AI model generates a cost model for a generic processing element. The cost model is then utilized by an auto-tuner to generate a schedule for an algorithm. Once a schedule is generated, the schedule is utilized by an integrated development environment (IDE) associated with a DSL to generate an executable file.

The executable file includes a number of different executable sections, where each executable section is executable by a specific processing element, and the executable file is referred to as a fat binary. For example, if a developer is developing code to be used on a heterogeneous processing platform including a CPU, an FPGA, a GPU, and a VPU, an associated fat binary will include executable sections for the CPU, the FPGA, the GPU, and the VPU, respectively. In such examples, a runtime scheduler can utilize the fat binary to execute the algorithm on at least one of the CPU, the FPGA, the GPU, or the VPU depending on the physical characteristics of the heterogeneous system and a function that defines success for the execution (e.g., a function designating successful execution of the algorithm on the heterogeneous system). For example, such a success function may correspond to executing the function to meet and/or otherwise satisfy a threshold of power consumption. In other examples, a success function may correspond to executing the function in a threshold amount of time. However, a runtime scheduler may utilize any suitable success function when determining how to execute the algorithm, via the fat binary, on a heterogeneous system.

While auto-tuning, heuristic searching, and AI-based hybrid methods may be acceptable methods of scheduling during compilation time, such methods of scheduling do not account for the load and real-time performance of the individual processing elements of heterogeneous systems. For example, when developing cost models, a developer or AI system makes assumptions about how a particular processing element (e.g., a CPU, an FPGA, a GPU, a VPU, etc.) is structured. Moreover, a developer or AI system may make assumptions regarding the particular computational elements, memory subsystems, interconnections fabrics, and/or other components of a particular processing element. However, these components of the particular processing element are volatile, sensitive to load and environmental conditions, include nuanced hardware design details, have problematic drivers/compilers, and/or include performance behavior that is counterintuitive to expected performance.

For example, when a heterogeneous system offloads one or more computation tasks (e.g., a workload, a computation workload, etc.) to a GPU, there are particular ramifications for not offloading enough computation to the GPU. More specifically, if an insufficient quantity of computation tasks is offloaded to a GPU, one or more hardware threads of the GPU can stall and cause one or more execution units of the GPU to shut down and, thus, limit processing power of the GPU. An example effect of such a ramification can be that a workload of size X offloaded to the GPU may have the same or substantially similar processing time as a workload of size 0.5× offloaded to the GPU.

Furthermore, even the movement of data from one processing element to another processing element can cause complications. For example, a runtime scheduler may utilize a GPU's texture sampler to process images in a workload. To offload the workload to the GPU, the images are converted from a linear format supported by the CPU to a tiled format supported by the GPU. Such a conversion incurs computational cost on the CPU and while it may be faster to process the image on the GPU, the overall operation of converting the format of the image on the CPU and subsequent processing on the GPU may be longer than simply processing the image on the CPU.

Additionally, many compilers utilize an auto-vectoring which relies on a human developer's knowledge of transformations and other scheduling techniques to trigger the auto-vectorizing functionality. Thus, a developer who is unaware of these techniques will have a less than satisfactory executable file.

Developing code to fully utilize all available computational resources on a heterogeneous system introduces considerable programming difficulty, especially in achieving the best possible performance under a particular power budget. The programming complexity can step from a plurality of sources, such as (1) a hardware organization of a particular processing element may be radically different from a hardware organization of a different processing element, (2) the way a CPU program relates to workload-specific processing elements that require specific offload and synchronization semantics, and (3) processing bottlenecks due to data movement across an entire heterogeneous system.

Typical programming languages (e.g., imperative programming languages like C/C++) and abstractions (e.g., compute application programming interfaces (APIs)) require developers to base programming intent on specific details of a target hardware. However, typical imperative programming languages are often overly descriptive (e.g., they have many ways of writing slow code, but few ways to write fast code) and are based on serial computing constructs (e.g., loops) that are difficult to map on certain types of accelerators.

Typical approaches to developing high-performance workloads can be through direct tuning by working from best-known methods or practices or a given target hardware. For example, developers may use detailed knowledge of a hardware organization for a target hardware to generate code that comprehends the data/thread parallelism, uses access patterns that optimize for cache behavior, and leverages hardware-specific instructions. However, such code may not be readily portable to a different target hardware and, thus, additional development, different hardware expertise, and code-factoring is needed.

Examples disclosed herein include methods and apparatus for intentional programing for heterogeneous systems. As opposed to some methods for developing algorithms for heterogeneous systems, the examples disclosed herein do not rely solely on theoretical understanding of processing elements, developer knowledge of algorithm transformations and other scheduling techniques, and the other pitfalls of some methods for heterogeneous system algorithm development.

Examples disclosed herein include an example code translator to obtain application code corresponding to algorithm(s) in an imperative programming language representation to be executed on a heterogeneous system. The example code translator can identify one or more annotated code blocks in the application code. The example code translator can lift an algorithm intent from the one or more annotated code blocks to a lifted intermediate representation (e.g., lifted intermediate code). The example code translator can lower the one or more code blocks in the lifted intermediate representation into a DSL representation.

In some disclosed examples, the code translator can replace the one or more annotated code blocks with a respective function call to a runtime scheduler that can be used to facilitate an execution of workload(s) on the heterogeneous system. In response to replacing the one or more annotated code blocks, the example code translator can invoke a compiler to generate modified application code to be included in an executable. In some disclosed examples, the heterogeneous system can access the modified application code by invoking the executable to process workload(s) using one or more processing elements of the heterogeneous system. For example, during runtime, the heterogeneous system can execute the executable to process a plurality of workloads to dynamically select one(s) of one or more variant binary files of the executable based on performance characteristics of the heterogeneous system to improve runtime performance of software executing on the heterogeneous system.

FIG. 1 depicts a block diagram illustrating an example heterogeneous system 100. In the illustrated example of FIG. 1, the heterogeneous system 100 includes an example CPU 102, example storage 104, an example FPGA 106, an example VPU 108, and an example GPU 110. The storage 104 of FIG. 1 includes an example executable 105. Alternatively, the storage 104 may include more than one executable. In the illustrated example of FIG. 1, the heterogeneous system 100 is a system on a chip (SoC). Alternatively, the heterogeneous system 100 may be any other type of computing or hardware system.

In the illustrated example of FIG. 1, each of the CPU 102, the storage 104, the FPGA 106, the VPU 108, and the GPU 110 is in communication with the other elements of the heterogeneous system 100. For example, the CPU 102, the storage 104, the FPGA 106, the VPU 108, and the GPU 110 are in communication via an example communication bus 112. For example, the communication bus 112 may correspond to an interface circuit or any other type of hardware or logic circuit to facilitate inter-element communication. In some examples, one or more of the CPU 102, the storage 104, the FPGA 106, the VPU 108, and/or the GPU 110 are in communication via any suitable wired and/or wireless communication method. In some examples, one or more of the CPU 102, the storage 104, the FPGA 106, the VPU 108, and/or the GPU 110 can be in communication with any processing element or hardware component exterior to the heterogeneous system 100 via any suitable wired and/or wireless communication method.

In the illustrated example of FIG. 1, the CPU 102 is a processing element that executes instructions (e.g., machine-readable instructions that are included in and/or otherwise correspond to the executable 105) to execute, perform, and/or facilitate a completion of operations associated with a computer or computing device. In FIG. 1, the CPU 102 is a primary processing element for the heterogeneous system 100 and includes at least one core. Alternatively, the CPU 102 may be a co-primary processing element (e.g., in an example where more than one CPU is utilized) while, in other examples, the CPU 102 may be a secondary processing element.

In the example illustrated in FIG. 1, the storage 104 is memory including the executable 105. Additionally or alternatively, the executable 105 may be stored in the CPU 102, the FPGA 106, the VPU 108, and/or the GPU 110. In FIG. 1, the storage 104 is a shared storage between at least one of the CPU 102, the FPGA 106, the VPU 108, or the GPU 110. In FIG. 1, the storage 104 is a physical storage local to the heterogeneous system 100. Alternatively, the storage 104 may be external to and/or otherwise be remote with respect to the heterogeneous system 100. Alternatively, the storage 104 may be a virtual storage. In the example of FIG. 1, the storage 104 is a persistent storage (e.g., read only memory (ROM), programmable ROM (PROM), erasable PROM (EPROM), electrically erasable PROM (EEPROM), etc.). Alternatively, the storage 104 may be a persistent basic input/output system (BIOS) or a flash storage. Alternatively, the storage 104 may be a volatile memory.

In the illustrated example of FIG. 1, one or more of the FPGA 106, the VPU 108, and/or the GPU 110 are processing elements that may be utilized by a program executing on the heterogeneous system 100 for computing tasks, such as hardware acceleration. For example, the FPGA 106 is a versatile programmable processing element that can be used for a computable operation or process. In other examples, the VPU 108 is a processing element that includes processing resources that are designed and/or otherwise configured or structured to improve the processing speed and overall performance of processing machine vision tasks for AI. In yet other examples, the GPU 110 is a processing element that is designed and/or otherwise configured or structured to improve the processing speed and overall performance of computer graphics and/or image processing. While the FPGA 106, the VPU 108, and GPU 110 include functionality to support specific processing tasks, one or more of the FPGA 106, the VPU 108, and/or the GPU 110 can correspond to processing elements that support general processing tasks that may be offloaded from the CPU 102 on an as-needed basis.

While the heterogeneous system 100 of FIG. 1 includes the CPU 102, the storage 104, the FPGA 106, the VPU 108, and the GPU 110, in some examples, the heterogeneous system 100 may include any number and/or type of processing elements including application-specific instruction set processors (ASIPs), physic processing units (PPUs), digital signal processors (DSPs), image processors, coprocessors, floating-point units, network processors, multi-core processors, and front-end processors.

Figure 2:
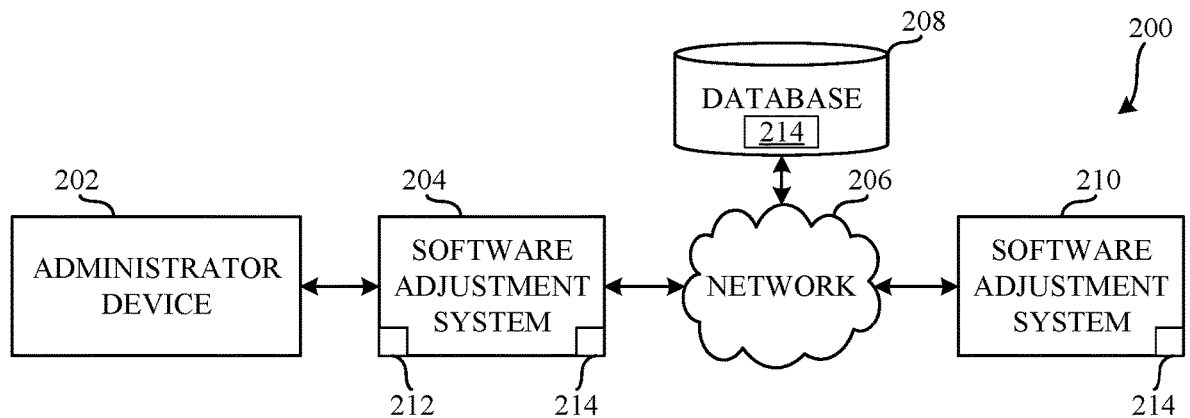
FIG. 2 depicts a block diagram illustrating an example software adjustment system including a first software adjustment system and a second software adjustment system to train an example machine learning/artificial intelligence model.

FIG. 2 depicts a block diagram illustrating an example system (e.g., a software adjustment system) 200 including an example administrator device 202, a first example software adjustment system 204, an example network 206, an example database 208, and a second example software adjustment system 210.

In the illustrated example of FIG. 2, the administrator device 202 is a desktop computer. Alternatively, the administrator device 202 may be any suitable computing system or platform such as a mobile phone, a tablet computer, a workstation, a laptop computer, or a server. In operation, an administrator or user may train the first software adjustment system 204 via the administrator device 202. For example, an administrator may generate training data via the administrator device 202. In some examples, the training data originates from randomly generated algorithms that are subsequently utilized by the first software adjustment system 204. For example, an administrator may use the administrator device 202 to generate and transmit a large quantity (e.g., hundreds, thousands, hundreds of thousands, etc.) of algorithms to the first software adjustment system 204 to train the first software adjustment system 204. In FIG. 2, the administrator device 202 is in communication with the first software adjustment system 204 via a wired connection. Alternatively, the administrator device 202 may be in communication with the first software adjustment system 204 via any suitable wired and/or wireless connection.

In the illustrated example of FIG. 2, one or both the first software adjustment system 204 and/or the second software adjustment system 210 generate and improve the execution of applications on heterogeneous systems (e.g., the heterogeneous system 100 of FIG. 1). One or both the first software adjustment system 204 and/or the second software adjustment system 210 utilize ML/AI techniques to generate applications based on received algorithms and performance of a processing element.

In the illustrated example of FIG. 2, the first software adjustment system 204 is in communication with the administrator device 202 via a wired connection. Alternatively, the first software adjustment system 204 may be in communication with the administrator device 202 via any suitable wired and/or wireless connection. Additionally, the first software adjustment system 204 is in communication with the database 208 and the second software adjustment system 210 via the network 206. The first software adjustment system 204 may be in communication with the network 206 via any suitable wired and/or wireless connection.

In the illustrated example of FIG. 2, the system 200 includes the first software adjustment system 204 to train an ML/AI model (e.g., an untrained ML/AI model) 212 to generate a trained ML/AI model 214 that can be utilized to develop code and/or other algorithms for execution on the heterogeneous system 100 of FIG. 1. In some examples, the trained ML/AI model 214 can be used to facilitate and/or otherwise execute code lifting techniques such as verified lifting, induction synthesis, syntax guided synthesis, etc. For example, the trained ML/AI model 214 can obtain a query including one or more code blocks (e.g., annotated code blocks) corresponding to an algorithm, identify one or more candidate code blocks or programs that has a first algorithmic intent that matches (e.g., substantially matches, equally matches, etc.) a second algorithmic intent of the one or more code blocks, and returns the one or more candidate code blocks or programs as intermediate code for further processing and/or verification.

In some examples, in response to the training, the first software adjustment system 204 transmits and/or stores the trained ML/AI model 214. For example, the first software adjustment system 204 can transmit the trained ML/AI model 214 to the database 208 via the network 206. Additionally or alternatively, the first software adjustment system 204 may transmit the trained ML/AI model 214 to the second software adjustment system 210.

In the illustrated example of FIG. 2, the system 200 includes the second software adjustment system 210 to utilize the trained ML/AI model 214 to execute code and/or other algorithms on a heterogeneous system. The second software adjustment system 210 may obtain the trained ML/AI model 214 from the first software adjustment system 204 or the database 208. Alternatively, the second software adjustment system 210 may generate the trained ML/AI model 214.

In some examples, the second software adjustment system 210 collects and/or otherwise obtains data associated with at least one of a heterogeneous system or a system-wide success function of the heterogeneous system. In response to collecting the data, the second software adjustment system 210 can transmit the data to the first software adjustment system 204 and/or the database 208. The second software adjustment system 210 may format the data in a variety of ways as described below in connection with FIG. 3.

In the illustrated example of FIG. 2, the network 206 is the Internet. However, the network 206 may be implemented using any suitable wired and/or wireless network(s) including, for example, one or more data buses, one or more Local Area Networks (LANs), one or more wireless LANs (WLANs), one or more cellular networks, one or more private networks, one or more public networks, etc. The network 206 enables the first software adjustment system 204, the database 208, and/or the second software adjustment system 210 to be in communication with each other.

In the illustrated example of FIG. 2, the system 200 includes the database 208 to record and/or otherwise store data (e.g., heterogeneous system performance data, a system-wide success function, the trained ML/AI model 214, etc.). The database 208 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 208 may additionally or alternatively be implemented by one or more double data rate (DDR) memories, such as DDR, DDR2, DDR3, DDR4, mobile DDR (mDDR), etc. The database 208 may additionally or alternatively be implemented by one or more mass storage devices such as HDD(s), CD drive(s), digital versatile disk (DVD) drive(s), SSD(s), etc. While in the illustrated example the database 208 is illustrated as a single database, the database 208 may be implemented by any number and/or type(s) of databases. Furthermore, the data stored in the database 208 may be in any data format such as, for example, binary data, comma delimited data, tab delimited data, structured query language (SQL) structures, etc. In FIG. 2, the database 208 is stored on a computational system that is electronically accessible. For example, the database 208 may be stored on a server, a desktop computer, an HDD, an SSD, or any other suitable computing system.

Figure 3:
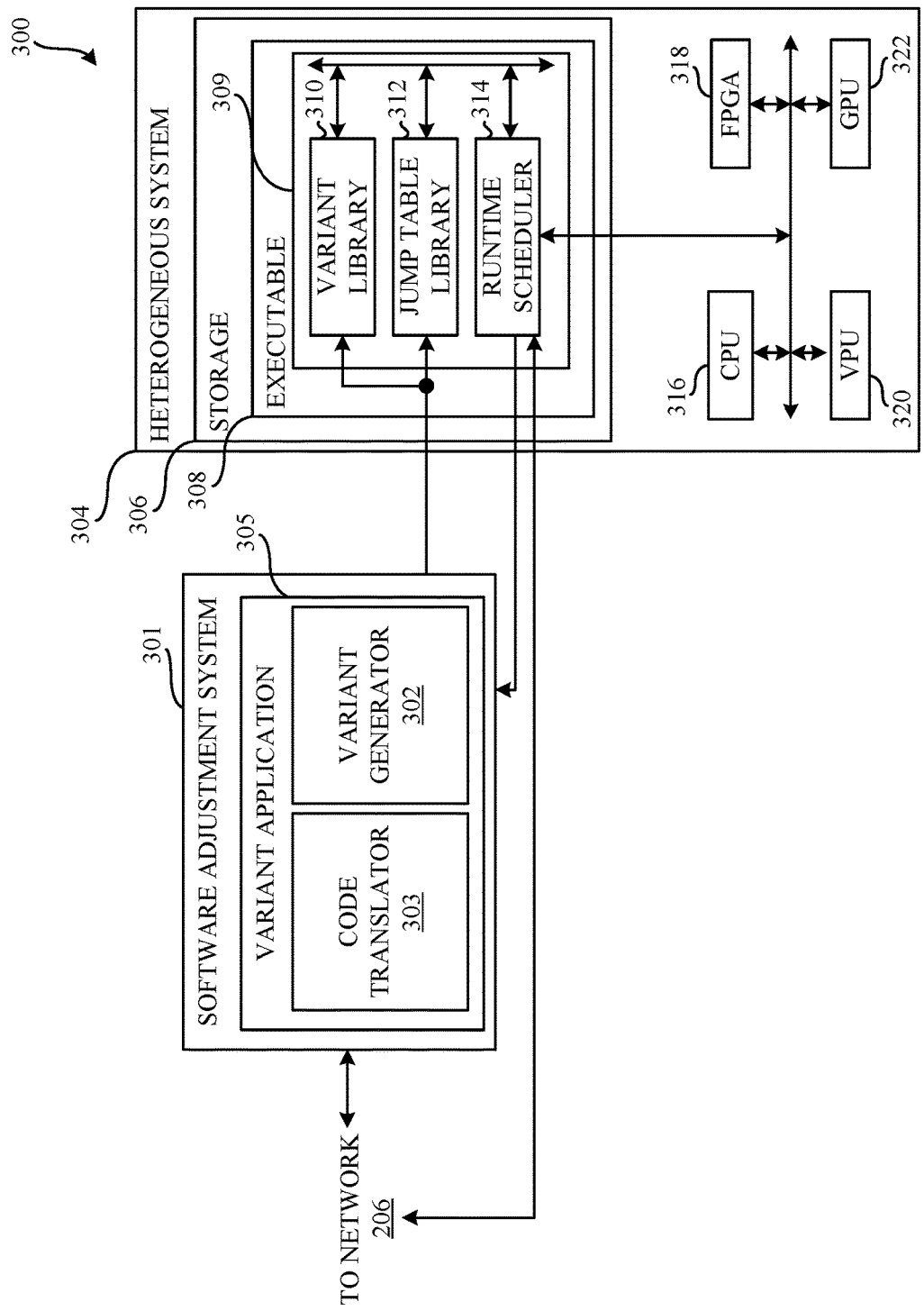
FIG. 3 depicts a block diagram illustrating an example variant generation system including an example variant application including an example variant generator and an example code translator that may be used to implement the first and/or the second software adjustment system of FIG. 2.

FIG. 3 depicts a block diagram illustrating an example system (e.g., a variant generation system) 300 that may be used to implement the first software adjustment system 204 and/or the second software adjustment system 210 of FIG. 2. The variant generation system 300 of FIG. 3 can facilitate operation of two or more ML/AI operational phases including a training phase and an inference phase.

In the illustrated example of FIG. 3, the variant generation system 300 includes a third example software adjustment system 301, an example variant generator 302, an example code translator 303, an example heterogeneous system 304, and example storage 306. In FIG. 3, an example variant application 305 includes the variant generator 302 and the code translator 303. Alternatively, the variant application 305 may include either the variant generator 302 or the code translator 303.

Further depicted in the variant generation system 300 are the network 206 of FIG. 2 and the database 208 of FIG. 2. Alternatively, the variant generation system 300 may not include the network 206 and/or the database 208. Alternatively, the storage 306 may be external to the heterogeneous system 304. The storage 306 of FIG. 3 includes an example executable 308. The executable 308 includes an example fat binary (e.g., a fat binary file) 309 that includes an example variant library 310, an example jump table library 312, and an example runtime scheduler 314. Alternatively, the storage 306 may include more than one executable.

In the illustrated example of FIG. 3, the third software adjustment system 301 can correspond to the first software adjustment system 204 of FIG. 2 or the second software adjustment system 210 of FIG. 2. For example, the third software adjustment system 301 can include the trained untrained ML/AI model 212 and/or the ML/AI model 214 of FIG. 2. In some examples, the variant generator 302 includes the untrained ML/AI model 212 and/or the trained ML/AI model 214. In some examples, the code translator 303 includes the untrained ML/AI model 212 and/or the trained ML/AI model 214. In some examples, each of the variant generator 302 and the code translator 303 include at least one of the untrained ML/AI model 212 or the trained ML/AI model 214.

In the illustrated example of FIG. 3, the heterogeneous system 304 can correspond to the heterogeneous system 100 of FIG. 1. In FIG. 3, the storage 306 can correspond to the storage 104 of FIG. 1. In FIG. 3, the executable 308 can correspond to the executable 105 of FIG. 1. In FIG. 3, the heterogeneous system 304 includes an example CPU 316, an example FPGA 318, an example VPU 320, and an example GPU 322. Alternatively, the heterogeneous system 304 may include fewer or more processing elements than depicted in FIG. 3. Alternatively, the heterogeneous system 304 may include more than one of the CPU 316, the FPGA 318, the VPU 320, and/or the GPU 322. In FIG. 3, the CPU 316 can correspond to the CPU 102 of FIG. 1. In FIG. 3, the FPGA 318 can correspond to the FPGA 106 of FIG. 1. In FIG. 3, the VPU 320 can correspond to the VPU 108 of FIG. 1. In FIG. 3, the GPU 322 can correspond to the GPU 110 of FIG. 1.

In the illustrated example of FIG. 3, the third software adjustment system 301 includes the variant application 305 to facilitate execution of at least one of the variant generator 302 or the code translator 303. For example, the variant application 305 can be a computing application, an executable, etc. In such examples, the variant application 305 can be used by a user (e.g., an administrator, a developer, etc.) to generate algorithms to be deployed to and/or otherwise executed on the heterogeneous system 304. In some examples, the variant application 305 can correspond to and/or otherwise be implemented by a cluster of computers (e.g., a cloud computing environment, a server room, etc.). Alternatively, the variant application 305 may be included in and/or otherwise be implemented by the heterogeneous system 304.

In the illustrated example of FIG. 3, the variant application 305 includes the code translator 303 to convert and/or otherwise translate code (e.g., code blocks, code portions, etc.) in an imperative programming language format or representation into a DSL representation or format. The code translator 303 can be a device or a software executable executed by the device Advantageously, a user can develop code using their existing programming knowledge to perform heterogeneous offload (e.g., instructing one or more processing elements of the heterogeneous system 304 to execute a workload) with minimal knowledge of a specific processing element of the heterogeneous system 304. By converting the code into the DSL representation, the variant generator 302 can generate multiple variations of an algorithm to be executed by one or more processing elements as described in further detail below. The code translator 303 can enable a user to develop code (e.g., basic or simple code) to describe a minimal algorithm and the code translator 303 can handle the peculiarities of hardware organization for the processing elements, heterogeneous offload, and data movement between processing elements.

In some examples, the code translator 303 uses imperative programming language compiler extensions (e.g., #pragma or % pragma, #pragma lift begin or % pragma lift begin, #pragma lift end or % pragma lift end, etc.) to annotate code blocks suitable for heterogeneous offload. Alternatively, any other type of compiler-specific language extensions may be used. The annotated code blocks correspond to and/or otherwise indicative of an intent (e.g., an algorithmic intent) of the computation. For example, the user can describe the intent through a naive implementation of the desired algorithm and, in some examples, provide corresponding metadata regarding runtime scheduling and variant generation. In such examples, the user can develop the naive implementation that describes the algorithmic intent by using typical imperative programming language idioms (e.g., loops, variables, etc.).

In some examples, the code translator 303 lifts the one or more annotated code blocks from the imperative programming language representation to a formal representation. For example, the code translator 303 can use verified lifting techniques, such as inductive synthesis (e.g., inductive program synthesis), to identify and/or otherwise establish algorithmic intent and remove details from the one or more annotated code blocks such as loop orderings and workload-specific optimizations.

In some examples, the code translator 303 uses inductive synthesis techniques to lower the lifted algorithm in the formal representation into a separation-of-concern DSL representation (e.g., Halide, OpenCL, etc.). Accordingly, the code translator 303 can transmit the DSL representation of the algorithmic intent to the variant generator 302 to compile and/or otherwise generate one or more variants of the algorithmic intent.

In the illustrated example of FIG. 3, the variant application 305 includes the variant generator 302 to compile one or more variants of an algorithm to be executed by the heterogeneous system 304. For example, the variant generator 302 may obtain an algorithm in a DSL representation from the code translator 303 and can compile one or more variants of the algorithm to be offloaded to the one or more processing elements of the heterogeneous system 304. Alternatively, the variant generator 302 may be separate from the third software adjustment system 301 and/or the variant application 305.

In the illustrated example of FIG. 3, the variant generator 302 is depicted separately from the heterogeneous system 304. For example, the variant generator 302 may be located at a remote facility (e.g., remote with respect to the heterogeneous system 304). In such examples, the variant generator 302 can correspond to and/or otherwise be implemented by a cluster of computers (e.g., a cloud computing environment, a server room, etc.). Alternatively, the variant generator 302 may be included in and/or otherwise be implemented by the heterogeneous system 304.

In the illustrated example of FIG. 3, the variant generator 302 and/or, more generally, the variant application 305 is coupled to the network 206. In FIG. 3, the variant generator 302 and/or, more generally, the variant application 305 is coupled to the storage 306, the variant library 310, the jump table library 312, and the runtime scheduler 314. The variant generator 302 may receive algorithms and/or machine learning models from one or more external device, such as the administrator device 202, the first software adjustment system 204, or the second software adjustment system 210 of FIG. 2.

In some examples, in a training phase, the variant generator 302 may receive and/or otherwise obtain algorithms (e.g., random or randomly-selected algorithms) from the one or more external devices to train the untrained ML/AI model 212 of FIG. 2. In other examples, in an inference phase, the variant generator 302 can receive and/or otherwise obtain user-generated algorithms and/or trained ML/AI models (e.g., the trained ML/AI model 214 of FIG. 2) from the one or more external devices. In such examples, the code translator 303 can obtain the user-generated algorithms from the one or more external devices, the database 208, etc., translate the user-generated algorithms from an imperative programming language representation into a DSL representation, and transmit the user-generated algorithms in the DSL representation to the variant generator 302 to compile one or more variants of the user-generated algorithms.

In the illustrated example of FIG. 3, the variant generator 302 is a device or a software executable executed by the device that compiles algorithms received from the code translator 303, the one or more external devices, etc., into an executable application including a number of variants of the algorithms. Additionally or alternatively, the variant generator 302 may generate trained ML/AI models (e.g., the trained ML/AI model 214) associated with generating applications to be run on the heterogeneous system 304. For example, if the algorithms received from the one or more external devices are written in a programming language (e.g., an imperative programming language) such as C or C++, the variant generator 302 can compile the algorithms into executable applications for storage in the storage 306 of FIG. 3. In some examples, the executable applications compiled by the variant generator 302 are fat binaries. Alternatively, the executable application compiled by the variant generator 302 may be any other suitable binary or executable file.

In the illustrated example of FIG. 3, the variant generator 302 utilizes ML/AI techniques. In some examples, the variant generator 302 utilizes a convolution neural network (CNN) model, a deep neural network (DNN) model, etc. In general, machine learning models/architectures that are suitable to use in the examples disclosed herein will be supervised. However, other examples may include machine learning models/architectures that utilize unsupervised learning. In some examples, the ML/AI models disclosed herein are trained using gradient descent. In some examples, the hyperparameters utilized to train the ML/AI model disclosed herein control the exponential decay rates of the moving averages of the gradient descent. Such hyperparameters are selected by, for example, iterating through a grid of hyperparameters until the hyperparameters meet and/or otherwise satisfy an acceptable or pre-defined value of performance. Additionally or alternatively, any other ML/AI training algorithm may be used.

In the illustrated example of FIG. 3, during the training phase, the variant generator 302 executes, functions, and/or otherwise operates to generate the trained ML/AI model 214 that is capable of generating an executable application that includes multiple variants of one or more algorithms that can be executed on a variety of processing elements. When in the training phase, the variant generator 302 selects a processing element (e.g., the CPU 316, the FPGA, 318, the VPU 320, or the GPU 322) for which the variant generator 302 is to develop one or more variants and a corresponding executable application. In response to selecting a processing element of interest, for example the FPGA 318, the variant generator 302, when in the training phase, selects an aspect of the processing element to optimize. For example, the variant generator 302 may select a speed of execution of the algorithm on the FPGA 318 to optimize.

In the illustrated example of FIG. 3, in response to selecting the aspect of the processing element to optimize, the variant generator 302 utilizes a machine learning model (e.g., a CNN, a DNN, the trained ML/AI model 214, etc.) to generate a cost model of the processing element. The variant generator 302 utilizes auto-tuning techniques to develop a schedule to map the algorithm to the selected processing element to improve the selected aspect. For example, the variant generator 302 can utilize auto-tuning techniques to develop a schedule to map the algorithm to the FPGA 318 so that the mapping of the algorithm to the FPGA 318 improves the speed of execution of the algorithm on the FPGA 318.

In the illustrated example of FIG. 3, in response to developing a schedule for the selected processing element, the variant generator 302 compiles the algorithm (e.g., the algorithm in the DSL representation from the code translator 303) into a variant (e.g., a variant binary, a variant binary file, etc.) according to the schedule. The compilation of the algorithm differs from the compilation of the executable application because the variant generator 302 is compiling the algorithm into a method, class, and/or object that can be called or invoked by the executable application (e.g., the executable 308). In response to compiling the variant, the variant generator 302, when in the training phase, transmits the variant to the executable 308 in the storage 306. For example, the executable 308 can include the fat binary 309 stored in the storage 306 and the variant generator 302 can store the variant in the variant library 310 of the executable 308. In some examples, the variant generator 302, when in the training phase, transmits a variant symbol to the executable 308 in the storage 306. The variant symbol is a data element that corresponds to a location of the variant in the variant library 310.

In the illustrated example of FIG. 3, the variant is subsequently executed on the heterogeneous system 304. In response to executing the variant on the heterogeneous system 304, the variant generator 302 can obtain performance characteristics associated with the selected processing element (e.g., the FPGA 318). The performance characteristics, when in training mode, can correspond to characteristics of the selected processing element (e.g., the FPGA 318) including, for example, power consumption of the selected processing element, time to run on the selected processing element, and/or other performance characteristics associated with the selected processing element.

In the illustrated example of FIG. 3, the variant generator 302 analyzes the collected data and determines whether the variant used met a performance threshold. In some examples, training is performed until the performance threshold is met. For example, the performance threshold can correspond to an acceptable amount of L2 (least squares regression) error achieved for the selected aspect. In response to meeting the performance threshold, the variant generator 302 can determine whether there are subsequent aspects to be optimized. In response to determining that there is at least one subsequent aspect to be optimized, the variant generator 302 can generate an additional variant corresponding to the subsequent aspect for the selected processing element (e.g., power consumption for the FPGA 318). In response to determining that there is not another aspect to be optimized, the variant generator 302 can determine whether there is at least one subsequent processing element of interest to process to generate one or more corresponding variants (e.g., first variants generated for the CPU 316, second variants generated for the VPU 320, and/or third variants generated for the GPU 322 as opposed to fourth variants generated (e.g., previously generated) for the FPGA 318).

In the illustrated example of FIG. 3, in response to the variant generator 302 generating variants for all the processing elements of the heterogeneous system 304, the variant generator 302 determines whether there is at least one additional algorithm for which to generate variants. In response to determining that there is another algorithm to process, the variant generator 302 can generate variants of the additional algorithm for each processing element of the heterogeneous system 304 for any selected and/or arbitrary aspects of each of the processing elements. In response to determining that there are no additional algorithms of interest to process, the variant generator 302 outputs the trained ML/AI model 214. For example, the variant generator 302 may output one or more files including weights associated with the cost model of each processing element of the heterogeneous system 304. The model may be stored in the database 208, the storage 306, and/or a different variant generator than depicted in FIG. 3. The trained ML/AI model 214 may be executed by the variant generator 302 on a subsequent execution or a different variant generator than depicted in FIG. 3.

In the illustrated example of FIG. 3, in response to outputting and/or otherwise generating the trained ML/AI model 214, the variant generator 302 monitors for any additional input data. For example, the input data may correspond to data associated with the execution of an application generated by the trained ML/AI model 214 on a target platform (e.g., the heterogeneous system 304). The specific data obtained by the variant generator 302 can be indicative of the performance of the target platform when executing a desired workload and can reflect the actual system under an actual load different from a test system under a simulated load. In response to receiving and/or otherwise obtaining input data, the variant generator 302 can identify the success function of the heterogeneous system 304. Based on the success function, the variant generator 302 can determine a performance delta corresponding to a difference between the desired performance (e.g., a performance threshold) defined by the success function and the actual performance achieved during execution of the algorithm during the inference phase.

In the illustrated example of FIG. 3, in response to the variant generator 302 determining at least one of (1) the success function, (2) related aspect(s) of the overall system (e.g., the heterogeneous system 304) to target, or (3) the performance delta associated with the success function, the variant generator 302 updates and/or otherwise adjusts the cost model(s) associated with the respective processing elements of the heterogeneous system 304 to account for the real-time characteristics and load (e.g., load profile) of the heterogeneous system 304. The updating and other adjustment of the cost model(s) associated with the respective processing elements of a heterogeneous system is described below in connection with FIG. 4.

In the illustrated example of FIG. 3, the variant library 310 is a data structure associated with the executable 308 that stores the different variants of an algorithm that the executable 308 can perform. For example, the variant library 310 can correspond to a data section of the fat binary 309 that includes the different variants associated with a particular algorithm, such as variants associated with the respective processing elements of the heterogeneous system 304. For one or more processing elements, the variant library 310 may additionally include variants that target different aspects of performance of the respective one or more processing elements. In some examples, the variant library 310 is linked to at least one of the jump table library 312 or the runtime scheduler 314. In some examples, the variant library 310 is a static library during execution of the executable 308 but may be updated with new or altered variants between executions of the executable 308.

In the illustrated example of FIG. 3, the jump table library 312 is a data structure associated with the executable 308 that stores one or more jump tables that include variant symbols pointing to locations of respective variants in the variant library 310. For example, the jump table library 312 can correspond to a data section of the executable 308 that includes a jump table including associations of variant symbols (e.g., pointers) and respective variants located in the variant library 310. In some examples, the jump table library 312 does not change during execution of the executable 308. In such examples, the jump table library 312 can be accessed to call, instruct, and/or otherwise invoke a respective variant to be loaded onto one or more of the processing elements of the heterogeneous system 304.

In the illustrated example of FIG. 3, the runtime scheduler 314 determines how to execute a workload (e.g., one or more algorithms) during runtime of the heterogeneous system 304. In some examples, the runtime scheduler 314 generates and/or transmits execution graphs to a processing element to execute and/or otherwise implement. In some examples, the runtime scheduler 314 determines whether a workload should be offloaded from one processing element to a different processing element to achieve a performance goal associated with the overall heterogeneous system 304.

In some examples, the code translator 303 replaces the annotated code blocks with a function call to the runtime scheduler 314. In response to lifting the annotated code blocks associated with a user-generated algorithm out of user-generated application code, the code translator 303 can insert function calls to the runtime scheduler 314 at the site of the lifted out annotated code blocks in the user-generated application code. For example, during execution of the executable 308, the heterogeneous system 304 can invoke the runtime scheduler 314 using the inserted function calls in response to accessing the corresponding code site in the user-generated application code of the executable 308.

In some examples, to facilitate execution of the function calls to the runtime scheduler 314, the code translator 303 includes memory allocation routine(s) to the user-generated application code to ensure cross-processing element compatibility. For example, the memory allocation routine(s) can copy data used in heterogeneous offload to a shared memory buffer that is visible to all processing elements of the heterogeneous system 304. In other examples, the code translator 303 can simplify the data aspects of heterogeneous offload by limiting lifting to specific imperative programming language functions (e.g., C++ lambda functions) that have expressly defined data capture semantics.

In the illustrated example of FIG. 3, during execution of the executable 308, the runtime scheduler 314 can monitor the heterogeneous system 304 to profile a performance of the heterogeneous system 304 based on performance characteristics obtained from the executable 308. In some examples, the runtime scheduler 314 can determine to offload a workload from one processing element to another based on the performance. For example, during runtime of the heterogeneous system 304, the executable 308 can be executed by the CPU 316 and, based on the performance of the CPU 316 and/or, more generally, the heterogeneous system 304, the runtime scheduler 314 can offload a workload scheduled to be executed by the CPU 316 to the FPGA 318. In some examples, the CPU 316 executes the executable 308 from the storage 306 while, in other examples, the CPU 316 can execute the executable 308 locally on the CPU 316.

In the illustrated example of FIG. 3, in response to the CPU 316 executing the executable 308, the runtime scheduler 314 determines a success function. For example, during a training phase, the success function can be associated with a processing element of interest (e.g., the GPU 322) for which the untrained ML/AI model 212 of FIG. 2 is being trained. In contrast to operating in the training phase, where the runtime scheduler 314 determines a success function for a processing element of interest, when operating in the inference phase, the runtime scheduler 314 can determine a system-wide success function. For example, a first system-wide success function may be associated with executing an algorithm with the executable 308 by consuming less than or equal to a threshold amount of power. In other examples, a second system-wide success function can be associated with executing the algorithm with the executable 308 as quickly as possible without consideration for power consumption.

In some examples, the system-wide success function(s) are based on an overall state of the heterogeneous system 304. For example, if the heterogeneous system 304 is included in a laptop computer in a low-power mode (e.g., a battery of the laptop computer is below a threshold battery level, the laptop computer is not connected to a battery charging source, etc.), the system-wide success function(s) may be associated with conserving power. In other examples, if the heterogeneous system 304 is included in the laptop computer in a normal-power mode (e.g., the battery is fully charged or substantially fully charged) or operating under normal operating conditions of the laptop computer, the system-wide success function can be associated with speed of execution of the algorithm as conserving power may not be a concern.

In the illustrated example of FIG. 3, the success function can be specific to the processing elements of the heterogeneous system 304. For example, the success function may be associated with utilizing the GPU 322 beyond a threshold amount, preventing contention between CPU 316 threads, or utilizing the high-speed memory of the VPU 320 beyond a threshold amount. In some examples, a success function can be a composite of simpler success functions, such as overall performance of the heterogeneous system 304 per unit of power.

In the illustrated example of FIG. 3, in response to identifying a success function, the runtime scheduler 314 executes the executable 308 based on the variant(s) generated by a ML/AI model. For example, during the training phase, the untrained ML/AI model 212 that generated the variants is not trained and the runtime scheduler 314 is concerned with the specific performance of the processing element with which the untrained ML/AI model 212 is being trained. However, during the inference phase, the trained ML/AI model 214 that generated the variants is trained and the runtime scheduler 314 is concerned with the specific performance of the heterogeneous system 304 with respect to an entirety or a substantial portion of the heterogeneous system 304. For example, during the inference phase, the runtime scheduler 314 may collect specific performance characteristics associated with the heterogeneous system 304 and can store and/or transmit the performance characteristics in the database 208, the storage 306, etc.

In the illustrated example of FIG. 3, during an inference phase, the runtime scheduler 314 collects performance characteristics including metadata and metric information associated with each variant included in the executable 308. For example, such metadata and metric information can include an identifier for the workload (e.g., a name of the algorithm), compatibility constraints associated with drivers and other hardware of the heterogeneous system 304, a version of the cost model utilized to generate a variant, an algorithm execution size, and other data that ensures compatibility between execution of a workload and one or more processing elements. In such examples, the runtime scheduler 314 can determine offload decisions based on the metadata and metric information. The performance characteristics collected during an inference phase by the runtime scheduler 314 may further include average execution time of a variant on each processing element, an average occupancy of each processing element during runtime, stall rate(s), power consumption of the individual processing elements, computational cycle counts utilized by a processing element, memory latency when offloading a workload, hazards of offloading a workload from one processing element to another, system-wide battery life, an amount of memory utilized, metrics associated with a communication bus between the various processing elements, metrics associated with the storage 306 of the heterogeneous system 304, etc., and/or a combination thereof.

In the illustrated example of FIG. 3, the runtime scheduler 314, during an inference phase, collects data associated with state transition data corresponding to load and environmental conditions of the heterogeneous system 304 (e.g., why the runtime scheduler 314 accessed the jump table library 312, where/why the runtime scheduler 314 offloaded the workload, etc.). In some examples, the state transition data includes runtime scheduling rules associated with thermal and power characteristics of the heterogeneous system 304 as well as runtime scheduling rules associated with any other condition that may perturb (e.g., influence) the performance of the heterogeneous system 304.

In the illustrated example of FIG. 3, in response to monitoring and/or collecting the performance characteristics, the runtime scheduler 314 adjusts a configuration of the heterogeneous system 304 based on the success function of the heterogeneous system 304. For example, periodically, throughout the operation of the runtime scheduler 314, during an inference phase, the runtime scheduler 314 may store and/or transmit the performance characteristics for further use by the variant generator 302. In such examples, the runtime scheduler 314 can identify whether the heterogeneous system 304 includes persistent storage (e.g., ROM, PROM, EPROM, etc.), a persistent BIOS, or a flash storage.

In the illustrated example of FIG. 3, if the heterogeneous system 304 includes a persistent storage, the runtime scheduler 314 writes to a data section in the executable 308 (e.g., the fat binary 309) to store the performance characteristics. The performance characteristics can be stored in the executable 308 to avoid a possibility of history loss across different executions of the executable 308. In some examples, the runtime scheduler 314 executes on the CPU 316 as an image of the executable 308. In such examples, the runtime scheduler 314 can store the performance characteristics in the executable 308 stored in the storage 306. If the heterogeneous system 304 does not include a persistent storage, but rather includes a flash storage or a persistent BIOS, a similar method of storing the performance characteristic in the executable 308 may be implemented.

In the illustrated example of FIG. 3, if there is no form or instance of a persistent storage, a persistent BIOS, or a flash storage (for example, if the storage 306 is a volatile memory) available, the runtime scheduler 314 may alternatively transmit the collected performance characteristics to an external device (e.g., the first software adjustment system 204, the second software adjustment system 206, the database 208, the variant generator 302, etc., and/or a combination thereof) utilizing a port of a communication interface. For example, the runtime scheduler 314 may utilize a universal serial bus (USB), an ethernet, a serial, or any other suitable communication interface to transmit the collected performance characteristics to an external device.

In the illustrated example of FIG. 3, in response to the heterogeneous system 304 executing the executable 308, the runtime scheduler 314 transmits the performance characteristics as well as a performance delta associated with the system wide success function to an external device. The performance delta may indicate, for example, the difference in the desired performance and the performance achieved.

In the illustrated example of FIG. 3, on subsequent executions of the executable 308, the runtime scheduler 314 can access the stored performance characteristics and adjust and/or otherwise improve ML/AI models (e.g., the trained ML/AI model 214) to improve the handling and/or facilitation of offloading workloads to processing elements. For example, the runtime scheduler 314 may access stored performance characteristics to adjust the trained ML/AI model 214. In such examples, the stored performance characteristics can include data corresponding to bus traffic under load, preemptive actions taken by an operating system of the heterogeneous system 304, decoding latencies associated with audio and/or video processing, and/or any other data that can be used as a basis for determining an offloading decision. For example, if the runtime scheduler 314 encounters an algorithm that includes decoding video, the runtime scheduler 314 may schedule video decoding tasks initially on the GPU 322. In such examples, the runtime scheduler 314 can have a variant available for a different processing element (e.g., the VPU 320) that, in isolation, can process the video decoding tasks quicker than the variant executing on the GPU 322. However, the runtime scheduler 314 may decide not to offload the video decoding tasks to the different processing element because memory movement latencies associated with moving the workload from the GPU 322 to the different processing element can take the same or an increased amount of time compared to keeping the workload on the GPU 322.

While an example manner of implementing the executable 308 is shown in FIG. 3, one or more of the elements, processes, and/or devices illustrated in FIG. 3 may be combined, divided, re-arranged, omitted, eliminated, and/or implemented in any other way. Further, the example variant library 310, the example jump table library 312, the example runtime scheduler 314 and/or, more generally, the example executable 308 of FIG. 3 may be implemented by hardware, software, firmware and/or any combination of hardware, software and/or firmware. Thus, for example, any of the example variant library 310, the example jump table library 312, the example runtime scheduler 314 and/or, more generally, the example executable 308 of FIG. 3 could be implemented by one or more analog or digital circuit(s), logic circuits, programmable processor(s), programmable controller(s), GPU(s), DSP(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example variant library 310, the example jump table library 312, the example runtime scheduler 314 and/or, more generally, the example executable 308 of FIG. 3 is/are hereby expressly defined to include a non-transitory computer readable storage device or storage disk such as a memory, a DVD, a CD, a Blu-ray disk, etc., including the software and/or firmware. Further still, the example executable 308 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
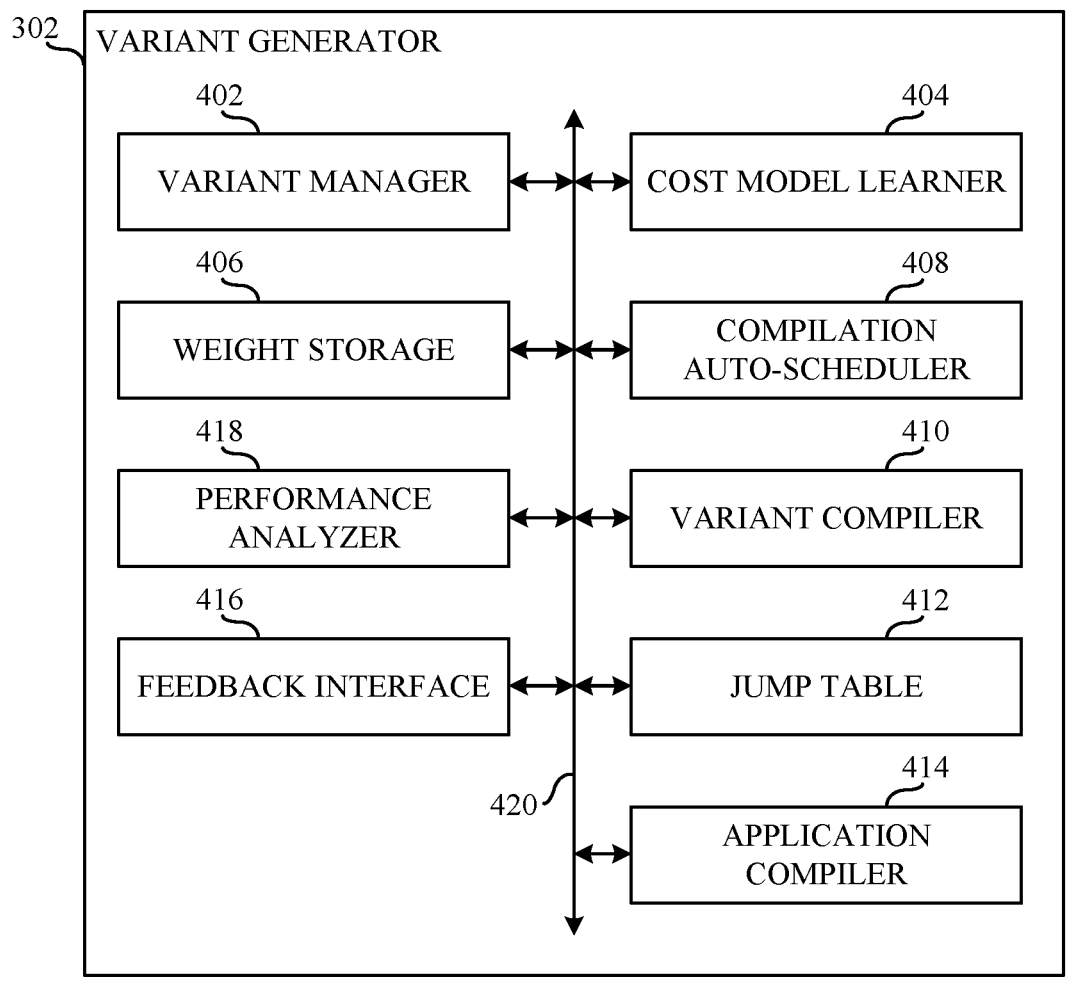
FIG. 4 depicts a block diagram illustrating an example implementation of the example variant generator of FIG. 3.

FIG. 4 depicts a block diagram illustrating an example implementation of the variant generator 302 of FIG. 3. The variant generator 302 compiles one or more variant binary files corresponding to algorithm(s) in a DSL representation from the code translator 303. In the illustrated example of FIG. 4, the variant generator 302 includes an example variant manager 402, an example cost model learner 404, an example weight storage 406, an example compilation auto-scheduler 408, an example variant compiler 410, an example jump table 412, an example application compiler 414, an example feedback interface 416, and an example performance analyzer 418.

In some examples, one or more of the variant manager 402, the cost model learner 404, the weight storage 406, the compilation auto-scheduler 408, the variant compiler 410, the jump table 412, the application compiler 414, the feedback interface 416, and/or the performance analyzer 418 is/are in communication with one or more of the other elements of the variant generator 302. For example, the variant manager 402, the cost model learner 404, the weight storage 406, the compilation auto-scheduler 408, the variant compiler 410, the jump table 412, the application compiler 414, the feedback interface 416, and the performance analyzer 418 can be in communication with each other via an example communication bus 420. For example, the communication bus 420 may correspond to an interface circuit or any other type of hardware or logic circuit to facilitate inter-element communication. In other examples, the communication bus 420 may be implemented in software.

In some examples, the variant manager 402, the cost model learner 404, the weight storage 406, the compilation auto-scheduler 408, the variant compiler 410, the jump table 412, the application compiler 414, the feedback interface 416, and the performance analyzer 418 may be in communication via any suitable wired and/or wireless communication method. In some examples, each of the variant manager 402, the cost model learner 404, the weight storage 406, the compilation auto-scheduler 408, the variant compiler 410, the jump table 412, the application compiler 414, the feedback interface 416, and the performance analyzer 418 may be in communication with any component exterior (e.g., the one or more external devices of FIG. 2) to the variant generator 302 via any suitable wired and/or wireless communication method.

In the illustrated example of FIG. 4, the variant generator 302 includes the variant manager 402 to analyze communications received and/or otherwise obtained from devices external to the variant generator 302 (e.g., the heterogeneous system 304, the database 208 of FIG. 2, the administrator device 202 of FIG. 2, etc., and/or a combination thereof) and manage operation of one or more components of the variant generator 302. In some examples, the variant manager 402 receives and/or otherwise obtains an algorithm from the code translator 303. For example, the variant manager 402 may obtain an algorithm in a DSL representation from the code translator 303, which the code translator 303 converted from an imperative programming language representation.

In some examples, the variant manager 402 receives and/or otherwise obtains an algorithm from an external device. For example, during a training phase, the variant manager 402 may obtain an arbitrary algorithm in a series or collection of arbitrary algorithms that are utilized to train the variant manager 402. Additionally or alternatively, during an inference phase, the variant manager 402 may obtain an algorithm associated with a workload to be executed on the heterogeneous system 304 of FIG. 3.

In the illustrated example of FIG. 4, in response to obtaining an algorithm from an external device, the variant manager 402 can select a processing element for which to generate a cost model and/or variant. For example, the processing element may be one of the CPU 316, the FPGA 318, the VPU 320, or the GPU 322 of FIG. 3. The variant manager 402 may additionally select an aspect of the selected processing element to target for a success function. For example, during a training phase, the variant manager 402 may select power consumption of the GPU 322 to target for a success function associated with the GPU 322. In some examples, during an inference phase, the variant manager 402 selects an aspect associated with a predetermined success function provided by a user (e.g., an administrator, a developer, etc.). In some examples, the variant manager 402 selects multiple aspects to target to provide a runtime scheduler (e.g., the runtime scheduler 314 of FIG. 3) with a variety of variants to choose from based on the performance characteristics of the heterogeneous system 304.

In some examples, in response to generating a variant and determining that the variant meets a performance threshold associated with the success function, the variant manager 402 determines whether there are any additional aspects of the selected processing element to target, whether there are additional processing elements to generate variants for, and/or whether there are any additional algorithms with which to train the cost model learner 404. In response to determining that there are one or more additional aspects, one or more additional processing elements, and/or one or more additional algorithms of interest to process, the variant manager 402 may repeat the above actions. In response to determining that there are no additional aspects, additional processing elements, and/or additional algorithms, the variant manager 402 may output the weights associated with the respective trained ML/AI models (e.g., the trained ML/AI model 214 of FIG. 2) corresponding to the respective processing elements of the heterogeneous system 304.

In some examples, the variant generator 302 includes the variant manager 402 to obtain a configuration of a hardware target of interest. For example, the variant manager 402 may obtain a configuration (e.g., a target configuration) associated with the heterogeneous system 304 of FIG. 3. In some examples, the configuration can correspond to a processing element API, a host architecture, code-generation options, scheduling heuristics, etc., and/or a combination thereof for a processing element of interest. In some examples, the variant manager 402 can obtain the configuration from the database 208, the heterogeneous system 304, etc., and/or a combination thereof. The configuration may include information indicative of and/or otherwise corresponding to the heterogeneous system 304 including the CPU 316, the FPGA 318, the VPU 320, and the GPU 322 of FIG. 3.

In the illustrated example of FIG. 4, the variant generator 302 includes the cost model learner 404 to implement and/or otherwise facilitate the execution of one or more ML/AI techniques to generate trained ML/AI models associated with generating applications to be run on a heterogeneous system. In some examples, the cost model learner 404 implements a supervised DNN to learn and improve cost models associated with processing elements. However, in other examples, the cost model learner 404 may implement any suitable ML/AI model with supervised and/or unsupervised learning. In some examples, the cost model learner 404 implements a CNN, a DNN, etc., for each processing element of the heterogeneous system 304.

In the illustrated example of FIG. 4, the variant generator 302 includes the weight storage 406 as a memory where the weights can be associated with one or more cost models for respective ones of the processing elements of the heterogeneous system 304. In some examples, the weights are stored in a file structure where each cost model has a respective weight file. Alternatively, a weight file may be used for more than one cost model. In some examples, the weight files are read during a compilation auto-scheduling event (e.g., an event executed by the compilation auto-scheduler 408) and in response to the variant manager 402 outputting and/or otherwise generating the trained ML/AI model 214. In some examples, weights are written to the weight files in response to the cost model learner 404 generating a cost model.

In the example illustrated of FIG. 4, the variant generator 302 includes the compilation auto-scheduler 408 to generate a schedule associated with the algorithm for the selected processing element based on the cost model (e.g., the weight file) generated by the cost model learner 404. In some examples, a schedule can correspond to a method or order of operations associated with computing and/or otherwise processing an algorithm, where the schedule can include at least one of choices or decisions about memory locality, redundant computation, or parallelism. In some examples, the compilation auto-scheduler 408 generates a schedule through the use of auto-tuning. Alternatively, any suitable auto-scheduling method may be used to generate a schedule associated with the algorithm for the selected processing element.

In some examples, the compilation auto-scheduler 408 selects and/or otherwise identifies a processing element (e.g., a hardware target) to process. For example, the compilation auto-scheduler 408 may select the CPU 316 of FIG. 3 to process. The compilation auto-scheduler 408 can configure one or more auto-schedulers included in the compilation auto-scheduler 408 for the processing element based on a corresponding configuration. For example, the compilation auto-scheduler 408 may be configured based on the target configuration associated with the CPU 316. In such examples, the compilation auto-scheduler 408 can be configured based on a hardware architecture, scheduling heuristics, etc., associated with the CPU 316.

In some examples, the compilation auto-scheduler 408 can be configured based on metadata from the code translator 303. For example, the code translator 303 may embed and/or otherwise include metadata within an annotated code block or transmit the metadata to the compilation auto-scheduler 408. In some examples, the code translator 303 generates metadata including scheduling information or data corresponding to a power profile of the heterogeneous system 304, where the power profile indicates whether low-power consumption is preferred over maximum performance and to what degree. In some examples, the code translator 303 generates metadata including instructions that specify which of the processing element(s) and/or compute API(s) are to be used for an algorithm of interest. In some examples, the code translator 303 generates metadata including instructions that specify a use of a section of a particular cost model, multiple variants of one or more processing elements to be used, lossy or reduced bit-width variants, etc., and/or a combination thereof.

In the illustrated example of FIG. 4, the variant generator 302 includes the variant compiler 410 to compile the schedule generated by the compilation auto-scheduler 408. In some examples, the variant compiler 410 compiles the algorithm into a method, class, or object that can be called or invoked by an executable application. In response to compiling the variant, the variant compiler 410 can transmit the variant to an application to be compiled. In some examples, the variant compiler 410 transmits the variant to the jump table 412.

In some examples, the variant compiler 410 implements means for compiling the variant binaries 502, 504, 506, 508, 510 based on a schedule, where each of the variant binaries 502, 504, 506, 508, 510 is associated with an algorithm of interest in the DSL, and where the variant binaries 502, 504, 506, 508, 510 include the first variant binary 502 that corresponds to a first processing element (e.g., the CPU 316 of FIG. 3) and the second variant binary 504 that corresponds to a second processing element (e.g., the GPU 322 of FIG. 3). For example, the means for compiling may be implemented by one or more analog or digital circuit(s), logic circuits, programmable processor(s), programmable controller(s), GPU(s), DSP(s), application specific integrated circuit(s) (ASIC(s)), PLD(s), and/or FPLD(s).

In the illustrated example of FIG. 4, the variant generator 302 includes the jump table 412 to associate the different variants generated by the variant compiler 410 with a location where the respective variants are located (e.g., are to be located) in an executable application (e.g., the executable 308, the fat binary 309, etc.). In some examples, the jump table 412 associates the different variants with a respective location of the different variants in an executable application via a variant symbol (e.g., a pointer) that points to the location of the respective variant in the executable application.

Figure 5:
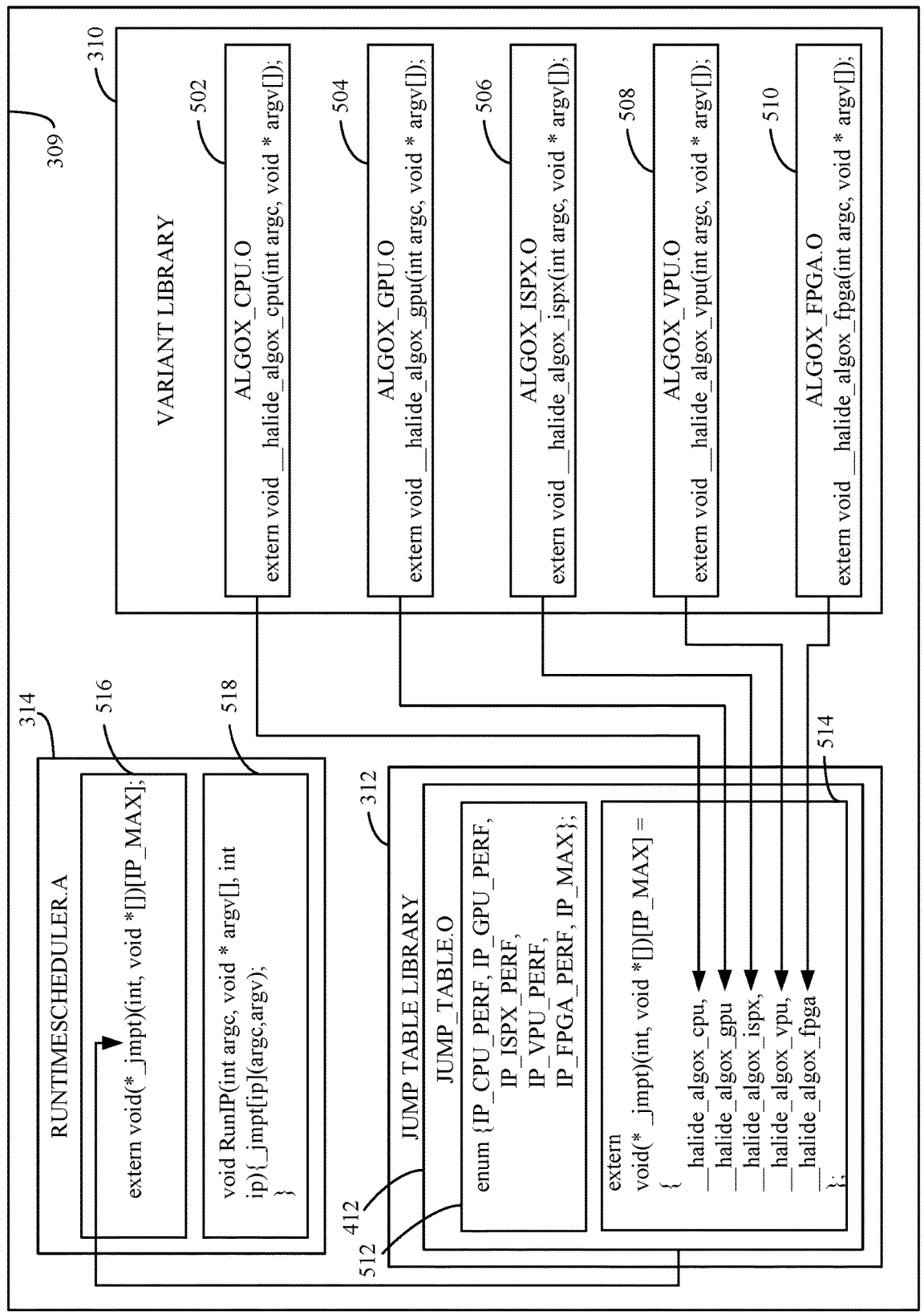
FIG. 5 depicts an example fat binary including an example variant library, an example jump table library, and an example runtime scheduler to implement the examples disclosed herein.

Turning to FIG. 5, the illustrated example depicts the fat binary 309 of FIG. 3 including the variant library 310, the jump table library 312, and the runtime scheduler 314 of FIG. 3. In the illustrated example of FIG. 5, the fat binary 309 includes the variant library 310 to store example variant binaries 502, 504, 506, 508, 510 including a first example variant binary 502, a second example variant binary 504, a third example variant binary 506, a fourth example variant binary 508, and a fifth example variant binary 510. Alternatively, the variant library 310 may include one variant binary or a different quantity of variant binaries than depicted in FIG. 5. In FIG. 5, the variant binaries 502, 504, 506, 508, 510 are based on Halide. Alternatively, one or more of the variant binaries 502, 504, 506, 508, 510 may be based on a different DSL, such as OpenCL.

In the illustrated example of FIG. 5, the first variant binary 502 is a CPU variant binary and corresponds to a compilation of an algorithm according to a first schedule based on a first target configuration of the CPU 316 of FIG. 3. In FIG. 5, the second variant binary 504 is a GPU variant binary and corresponds to a compilation of the algorithm according to a second schedule based on a second target configuration of the GPU 322 of FIG. 3. In FIG. 5, the third variant binary 506 is an iStudio Publisher (ISPX) variant binary and corresponds to a compilation of the algorithm according to a third schedule based on a third target configuration corresponding to one of the CPU 316, the FPGA 318, the VPU 320, or the GPU 322 of FIG. 3. In FIG. 5, the fourth variant binary 508 is a VPU variant binary and corresponds to a compilation of the algorithm according to a fourth schedule based on a fourth target configuration of the VPU 320 of FIG. 3. In FIG. 5, the fifth variant binary 510 is an FPGA variant binary and corresponds to a compilation of the algorithm according to a fifth schedule based on a fifth target configuration of the FPGA 318 of FIG. 3. Accordingly, the fat binary 309 of FIGS. 3 and/or 5 includes multiple versions (e.g., multiple binary versions, multiple schedule versions, etc.) of the same algorithm implemented on a spectrum of processing elements available on target heterogeneous systems (e.g., the heterogeneous system 304 of FIG. 3).

In the illustrated example of FIG. 5, the jump table library 312 includes one or more jump tables including the jump table 412 of FIG. 4. In FIG. 5, the jump table 412 includes example metadata 512 corresponding to information about correct or desired usage of a respective processing element, performance characteristics, and workload characteristics generated in response to a workload being executed on a respective processing element. In FIG. 5, the metadata 512 includes the data structure "IP_CPU_PERF" that can correspond to data associated with at least one of (1) correct or desired usage of the CPU 316, (2) performance characteristics of the CPU 316 that can be representative of values of performance counters or execution graphs, or (3) workload characteristics associated with data generated by the CPU 316 or a performance monitoring unit (PMU) monitoring the CPU 316, where the data is generated in response to the CPU 316 executing a workload.

In the illustrated example of FIG. 5, the jump table 412 includes example symbols (e.g., entry-point symbols, variant symbols, etc.) 514. In FIG. 5, each of the symbols 514 corresponds to a respective one of the variant binaries 502, 504, 506, 508, 510. For example, the symbol "_halide_algox_cpu" can correspond to the first variant binary 502. In FIG. 5, the symbols 514 are based on Halide because the variant binaries 502, 504, 506, 508, 510 of FIG. 5 are based on Halide. Alternatively, one or more of the symbols 514 may be based on a different DSL, such as OpenCL, when a corresponding one of the variant binaries 502, 504, 506, 508, 510 are based on the different DSL.

In the illustrated example of FIG. 5, the fat binary 309 includes the runtime scheduler 314 to access and/or otherwise invoke the jump table 412 of the jump table library 312. In FIG. 5, the variant library 310 is linked to the jump table 412 via the symbols 514. In FIG. 5, the runtime scheduler 314 is linked to the jump table library 312 via an example jump function 516. In operation, the runtime scheduler 314 executes an example application function 518 to execute a workload associated with an algorithm. In operation, the runtime scheduler 314 executes the jump function 516 to determine a workload dispatch decision based on the metadata 512 (e.g., the metadata 512 that is collected in real-time or substantially real-time). In operation, the runtime scheduler 314 determines the workload dispatch decision by identifying one of the processing elements of FIG. 3 to use to execute the workload. For example, the runtime scheduler 314 may determine to use the GPU 322 based on the metadata 512. In such examples, the runtime scheduler 314 can select "_halide_algox_gpu" from the symbols 514 to invoke the second variant binary 504 to execute the workload.

Turning back to the illustrated example of FIG. 4, the variant generator 302 includes the application compiler 414 to compile the algorithms, respective variants, variant symbols, and/or a runtime scheduler (e.g., the runtime scheduler 314 of FIG. 3) into one or more executable applications (e.g., the executable 308) for storage. For example, the application compiler 414 can be in communication with the heterogeneous system 304 and store the one or more executable applications in the storage 306 of FIG. 3 of the heterogeneous system 304 of FIG. 3. In some examples, the application compiler 414 compiles the algorithms, respective variants, and the runtime scheduler as a compiled version of the original algorithm (e.g., code, human-readable instructions, etc.) received by the variant generator 302 (e.g., from the code translator 303, the one or more external devices of FIG. 2, etc.). For example, if the algorithm is written in an imperative programming language such as C or C++, the application compiler 414 can compile the algorithm, the respective variants, variant symbols, and a runtime scheduler into an executable C or C++ application that includes the variants written in their respective languages for execution on respective processing elements.

In some examples, the executable applications compiled by application compiler 414 are fat binaries. For example, the application compiler 414 may compile an application to process one or more algorithms by assembling the executable 308 of FIG. 3 by linking the runtime scheduler 314, the jump table library 312, and the variant library 310. For example, the application compiler 414 may generate the fat binary 309 of FIGS. 3 and/or 5 based on the one or more linkages. Alternatively, the executable application compiled by the application compiler 414 may be any suitable executable file.

In some examples, the application compiler 414 generates a jump table to be included in a jump table library. For example, the application compiler 414 may add the jump table 412 of FIG. 4 to the jump table library 312 of FIGS. 3 and/or 4. Accordingly, the application compiler 414 can generate the jump table library 312 in response to generating one or more jump tables, such as the jump table 412.

In some examples, the application compiler 414 implements means for compiling the executable 308 to include the runtime scheduler 314 to select one or more of the variant binaries 502, 504, 506, 508, 510 of FIG. 5 to execute a workload of interest based on a schedule (e.g., a schedule generated by the compilation auto-scheduler 408).

In the illustrated example of FIG. 4, the variant generator 302 includes the feedback interface 416 to interface between executable applications (e.g., the executable 308) running on a heterogeneous system (e.g., the heterogeneous system 304 of FIG. 3) and/or a storage facility (e.g., the database 208). For example, the feedback interface 416 may be a network interface, a USB port interface, an Ethernet port interface, or a serial port interface. During a training phase, the feedback interface 416 can collect performance characteristics associated with a selected processing element. During the training phase, the collected performance characteristics can correspond to a quantification of power consumption of the selected processing element, a time to run parameter on the selected processing element, and/or other performance characteristics associated with the selected processing element.

In the illustrated example of FIG. 4, during an inference phase, the feedback interface 416 can be configured to collect performance characteristics and the performance delta associated with the system wide success function. In some examples, the feedback interface 416 obtains (e.g., directly obtains) the performance characteristics from an application executing on a heterogeneous system and/or from a storage device exterior to the heterogeneous system.

In the illustrated example of FIG. 4, the variant generator 302 includes the performance analyzer 418 to identify received data (e.g., performance characteristics). During a training phase, the performance analyzer 418 can determine whether the selected variant meets and/or otherwise satisfies a performance threshold. Moreover, during the training phase, the performance analyzer 418 can analyze the performance of a processing element to meet and/or otherwise satisfy a success function. During the initial training phase, the performance analyzer 418 can analyze the performance of an individual processing element in isolation and may not consider the overall context of the processing elements in a heterogeneous system. The analysis of the individual processing element can be fed back into the cost model learner 404 to assist the CNN, the DNN, etc., in analyzing and developing a more accurate cost model for the particular processing element compared to a previous cost model for the particular processing element.

In response to outputting and/or otherwise generating the trained ML/AI model 214 for deployment (e.g., use by an administrator, a developer, etc.), the performance analyzer 418, after receiving an indication that input data (e.g., runtime characteristics on an heterogeneous system under load) has been received (e.g., an indication from the feedback interface 416), the performance analyzer 418 can identify an aspect of the heterogeneous system to target based on the success function of the system and the performance characteristics. In some examples, the performance analyzer 418 determines the performance delta by determining a difference between the desired performance (e.g., a performance threshold) defined by the success function and the actual performance achieved during execution of the algorithm during the inference phase.

In some examples, during a subsequent training phase (e.g., a second training phase after a first training phase is complete), the additional empirical data obtained by the feedback interface 416 and utilized by the performance analyzer 418 may be re-inserted into the cost model learner 404 to adjust the one or more cost models of the individual processing element based on the contextual data associated with the system as a whole (e.g., the performance characteristics, such as, runtime load and environment characteristics).

In some examples, the cost model learner 404 executes and/or otherwise performs a variety of executable actions associated with the different cost models for the respective processing elements based on the contextual data. For example, based on the collected empirical data, the cost model learner 404 may adjust the cost models of the respective processing elements to invoke the compilation auto-scheduler 408 to generate schedules, utilizing the adjusted cost models, to perform a specified workload in a more desirable way (e.g., by using less power, taking less time to perform, etc.).

In some examples, in response to determining that the performance characteristics indicate that a particular variant is infrequently selected, the performance analyzer 418 can determine that variants targeting the particular aspect associated with that variant are not satisfactory candidates for workload offloading during runtime. Based on the determination, the performance analyzer 418 can instruct the variant manager 402 to not generate variants for the associated aspect and/or associated processing element. Advantageously, by not generating the additional variants, the variant manager 402 can reduce space on the application (e.g., the fat binary) generated by the application compiler 414 to reduce the memory consumed by the application when stored in memory.

In the illustrated example of FIG. 4, when utilizing the collected empirical data, the cost model learner 404 may additionally utilize additional CNNs, DNNs, etc., to generate multiple cost models associated with a specific processing element. Each cost model may be focused on a specific aspect of a specific processing element, and at runtime, a runtime scheduler (e.g., the runtime scheduler 314) can choose from a variety of variants to be used on the heterogeneous system 304 of FIG. 3. For example, if an overall system success function is associated with conserving power, the runtime scheduler 314 may utilize variants on all processing elements that are targeted at reducing power consumption. However, when comprehending the overall system performance under a runtime execution (e.g., by collecting empirical data), the cost model learner 404 may generate multiple variants targeting at least reducing power consumption and improving speed. At runtime, the runtime scheduler 314, implementing the examples disclosed herein, may determine that even executing a variant targeting improved speed is still within the bounds of the success function associated with conserving power. Advantageously, the runtime scheduler 314 can improve the performance of an overall heterogeneous system while still maintaining the functionality to satisfy the desired success function.

While an example manner of implementing the variant generator 302 of FIG. 3 is illustrated in FIG. 4, one or more of the elements, processes, and/or devices illustrated in FIG. 4 may be combined, divided, re-arranged, omitted, eliminated, and/or implemented in any other way. Further, the example variant manager 402, the example cost model learner 404, the example weight storage 406, the example compilation auto-scheduler 408, the example variant compiler 410, the example jump table 412, the example application compiler 414, the example feedback interface 416, the example performance analyzer 418 and/or, more generally, the example variant generator 302 of FIG. 3 and/or, more generally, the example variant application 305 of FIG. 3 may be implemented by hardware, software, firmware and/or any combination of hardware, software and/or firmware. Thus, for example, any of the example variant manager 402, the example cost model learner 404, the example weight storage 406, the example compilation auto-scheduler 408, the example variant compiler 410, the example jump table 412, the example application compiler 414, the example feedback interface 416, the example performance analyzer 418 and/or, more generally, the example variant generator 302 and/or, more generally, the example variant application 305 of FIG. 3 could be implemented by one or more analog or digital circuit(s), logic circuits, programmable processor(s), programmable controller(s), GPU(s), DSP(s), ASIC(s), PLD(s) and/or FPLD(s). When reading any of the apparatus or system claims of this patent to cover a purely software and/or firmware implementation, at least one of the example variant manager 402, the example cost model learner 404, the example weight storage 406, the example compilation auto-scheduler 408, the example variant compiler 410, the example jump table 412, the example application compiler 414, the example feedback interface 416, the example performance analyzer 418 and/or, more generally, the example variant generator 302 and/or, more generally, the example variant application 305 of FIG. 3 is/are hereby expressly defined to include a non-transitory computer readable storage device or storage disk such as a memory, a DVD, a CD, a Blu-ray disk, etc., including the software and/or firmware. Further still, the example variant generator 302 may include one or more elements, processes and/or devices in addition to, or instead of, those illustrated in FIG. 3, and/or may include more than one of any or all of the illustrated elements, processes and devices.

Figure 6:
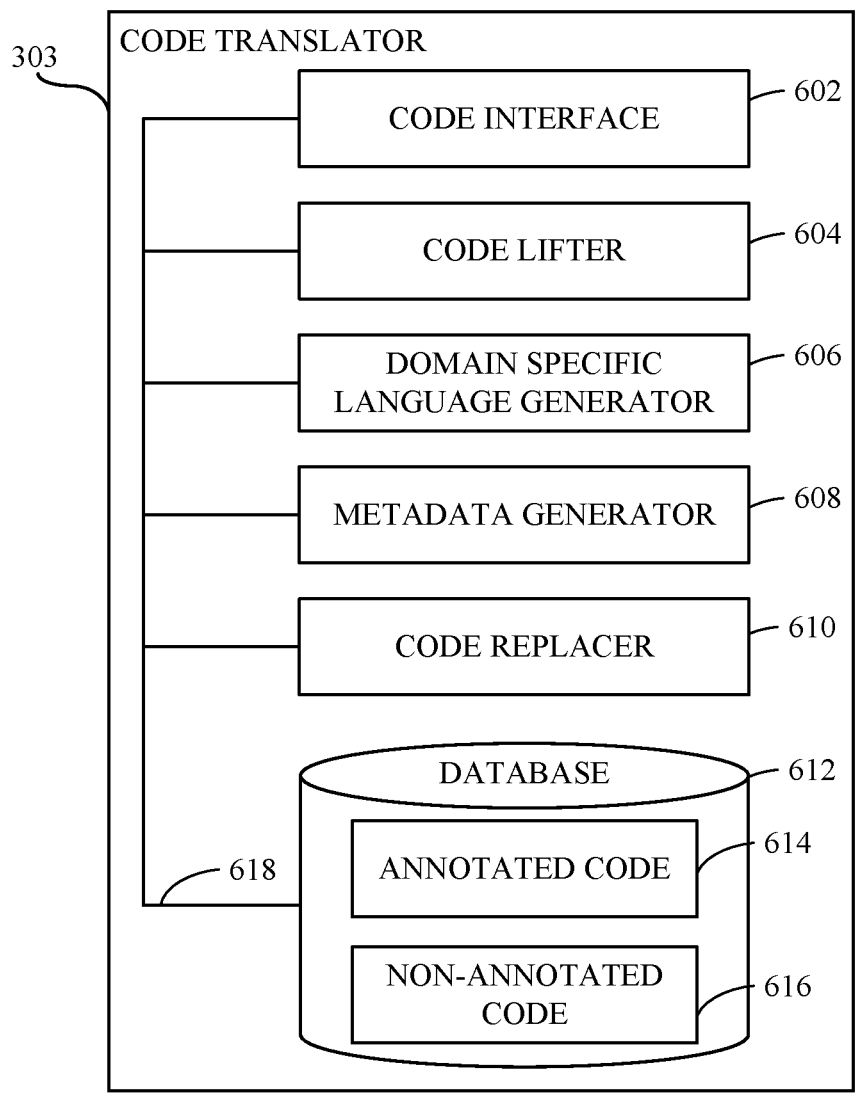
FIG. 6 depicts a block diagram illustrating an example implementation of the example code translator of FIG. 3.

FIG. 6 depicts a block diagram illustrating an example implementation of the code translator 303 of FIG. 3. The code translator 303 generates a representation of one or more algorithms in a DSL. For example, the code translator 303 can convert the one or more algorithms in a first representation corresponding to an imperative programming language to a second representation corresponding to the DSL. The code translator 303 may convert, translate, and/or otherwise generate a Halide representation, an OpenCL representation, etc., of an algorithm initially represented in and/or otherwise by an imperative programming language. Alternatively, the code translator 303 may generate any other type of representation (e.g., separation of concern representation) of the algorithm and/or use any other type of DSL.

In the illustrated example of FIG. 6, the code translator 303 obtains one or more algorithms from the network 206 of FIG. 2, converts the one or more algorithms into the DSL representation, and transmits the one or more translated algorithms to the variant generator 302. In the illustrated example of FIG. 6, the code translator 303 includes an example code interface 602, an example code lifter 604, an example domain specific language (DSL) generator 606, an example metadata generator 608, an example code replacer 610, and an example database 612. In FIG. 6, the database 612 includes example annotated code 614 and example non-annotated code 616. Further depicted in the code translator 303 of FIG. 6 is an example communication bus 618.

In the illustrated example of FIG. 6, the code translator 303 includes the code interface 602 to obtain code (e.g., application code, portions of code, code blocks, human-readable instructions, machine-readable instructions that correspond to human-readable instructions, etc.) corresponding to algorithm(s) in an imperative programming language representation to be executed on the heterogeneous system 304 of FIG. 3. For example, the code can correspond to example application code 700 as described below in connection with FIG. 7. For example, the code can be associated with one or more workloads to be processed by the heterogeneous system 304 of FIG. 3. In some examples, the code interface 602 obtains one or more algorithms from the one or more external devices of FIG. 2, the database 208, the database 612, etc. For example, the code interface 602 can obtain the one or more algorithms from a user (e.g., an administrator, a developer, a computing device associated with the administrator or the developer, etc.).

In the illustrated example of FIG. 6, the code translator 303 includes the code lifter 604 to identify example annotated code 614 (e.g., one or more annotated code block(s), one or more annotated code portion(s), etc.) included in the code obtained by the code interface 602. In some examples, the code lifter 604 identifies the annotated code block(s) based on a presence of an identifier (e.g., an annotated code identifier, an offloading identifier, etc.) corresponding to an imperative programming language compiler extension (e.g., % pragma, #pragma, etc.). For example, a user or a computing device associated with the user can insert the identifier at one or more code sites, locations, positions, etc., within application code to designate, flag, and/or otherwise be indicative of an intent to offload an execution of the designated code on one or more of the processing elements of the heterogeneous system 304.

In some examples, the code lifter 604 identifies non-annotated code 616 (e.g., one or more non-annotated code block(s), one or more non-annotated code portion(s), etc.) included in the code obtained by the code interface 602. In such examples, the code lifter 604 can identify the non-annotated code 616 based on a lack of a presence of the identifier corresponding to the imperative programming language compiler extension.

In some examples, in response to identifying the annotated code 614, the code lifter 604 lifts an algorithmic intent of the annotated code 614 in a first representation corresponding to an imperative programming language to a second representation corresponding to a formal or lifted intermediate representation. For example, the code lifter 604 can lift the algorithmic intent by executing and/or otherwise performing one or more verified lifting techniques. The code lifter 604 can perform verified lifting by taking as input a block of the annotated code 614 (e.g., potentially optimized code for heterogeneous offloading) written in an imperative general-purpose language (e.g., an imperative programming language) and inferring a summary expressed in a high-level or formal specification language (e.g., a lifted intermediate representation, a programming language based on predicate logic, a functional (e.g., a purely functional) programming language, etc.) that is provably equivalent to the semantics of the original program or code. For example, the code lifter 604 can determine that the annotated code 614 is a complex sequence of nested loops that instead can be implemented by a simple five point stencil.

In some examples, the code lifter 604 infers the summary by searching for possible candidate programs in a target language (e.g., a DSL) that the annotated code 614 can be translated into. For example, the code lifter 604 can search the database 208 of FIG. 2, the database 612 of FIG. 6, and/or any other computing device or storage repository. In other examples, the code lifter 604 can query the ML/AI model 214 to invoke the ML/AI model 214 to output one or more candidate programs. In some examples, instead of the code lifter 604 searching for programs that are expressible in the concrete syntax of the target language, the code lifter 604 can search over a space of programs in the database 208 of FIG. 2, the database 612 of FIG. 6, etc., that are expressed in the high-level specification language instead. For example, the high-level specification language can have a functional language-like syntax (e.g., programming languages such as Clean, Haskell, Mercury, etc.) and represent the semantics of the target language. In such examples, the high-level specification language can correspond to an intermediate representation (e.g., a lifted intermediate representation) of code (e.g., intermediate code).

In some examples, the code lifter 604 finds (e.g., automatically finds) the lifted summaries expressed using the predicate language by using inductive synthesis. For example, the code lifter 604 can find the lifted summaries by querying an ML/AI model (e.g., the trained ML/AI model 214 of FIG. 2), the database 208 of FIG. 2, the database 612 of FIG. 6, etc., and/or a combination thereof. For example, the database 612 can include the trained ML/AI model 214. In such examples, the code lifter 604 can query the trained ML/AI model 214 with the annotated code 614 to identify the lifted summaries. In other examples, the code lifter 604 can transmit the annotated code 614 to the database 208 of FIG. 2 to obtain the lifted summaries in response to the query. In response to obtaining the lifted summaries, the code lifter 604 can transmit and/or otherwise provide the lifted summaries to the DSL generator 606 to translate to a high-performance DSL and subsequently retargeted by the variant generator 302 for execution on different architectures or target hardware as needed.

The code lifter 604 of the illustrated example of FIG. 6 can determine that an inferred summary is provably equivalent to the semantics of the original program or code by using inductive synthesis. For example, the code lifter 604 can perform inductive synthesis by generating hypotheses (e.g., a candidate inferred summary) by generalizing from observed behavior of the annotated code 614, and then testing the hypotheses by attempting to verify the hypotheses. For example, the code lifter 604 can generate a hypothesis by converting the annotated code 614 into intermediate code (e.g., code in a formal or intermediate representation, where the formal or the intermediate representation is a high-level specification language). In such examples, the code lifter 604 can convert the code by querying the trained ML/AI model 214, the database 208, etc., with the annotated code 614 and the trained ML/AI model 214, the database 208, etc., can output the intermediate code by matching (e.g., substantially matching, matching an algorithmic intent of the annotated code 614 with the intermediate code, etc.) the annotated code 614 with a stored and/or otherwise previously generated intermediate code. In such examples, the trained ML/AI model 214, the database 208, etc., can return and/or otherwise transmit the intermediate code as the hypothesis for the code lifter 604 to process and/or otherwise validate or verify (e.g., the intermediate code is a correct summary of the annotated code 614).

In some examples, the code lifter 604 determines that the intermediate code is a correct summary of the annotated code 614 by constructing a verification condition. For example, the intermediate code may correspond to a postcondition for the annotated code 614. A postcondition can correspond to a predicate that will be true at the end of a block of code under all possible executions as long as the inputs to the block of code satisfy some given precondition. In some examples, the code lifter 604 determines that the intermediate code is valid with respect to a given precondition and postcondition by constructing a verification condition. The verification condition can correspond to a formula (e.g., a mathematical formula) that, if true, implies that the intermediate code is valid with respect to the precondition and the postcondition.

In some examples, the code lifter 604 uses syntax guided synthesis to search a large space of possible invariants and postconditions. For example, the code lifter 604 may search the database 208, query the trained ML/AI model 214, etc., to identify an invariant (e.g., a loop invariant) for each loop of the annotated code 614 and a corresponding postcondition that can lead to a verification condition that a theorem prover can determine is valid. For example, the code lifter 604 may identify one or more candidate programs or candidate blocks of code stored in a repository that include and/or otherwise correspond to an invariant and postcondition pair.

In some examples, the code lifter 604 validates the intermediate code by confirming the verification condition. For example, the code lifter 604 can search a large space of possible invariants (e.g., loop invariants) on a verification of one or more logic statements. An invariant can refer to a formal statement about a relationship between variables in a code loop that holds true just before the code loop is run and is true again at the bottom of the code loop, each time through the code loop. As a result of the search, the code lifter 604 can find an invariant for each loop (e.g., each loop of the intermediate code) and a postcondition that together can lead to a verification condition that a theorem prover (e.g., an executable or application code that can prove theorems) can certify as valid. In response to validating the intermediate code, the code lifter 604 can transmit the intermediate code to the DSL generator 606 for processing.

In some examples, the code lifter 604 implements means for identifying annotated code corresponding to an algorithm to be executed on the heterogeneous system 304 based on an identifier being associated with the annotated code 614, the annotated code 614 being in a first representation. In some examples, the code lifter 604 implements means for converting the annotated code in the first representation to intermediate code in a second representation by identifying the intermediate code as having a first algorithmic intent that corresponds to a second algorithmic intent of the annotated code. For example, the means for identifying and/or the means for converting may be implemented by one or more analog or digital circuit(s), logic circuits, programmable processor(s), programmable controller(s), GPU(s), DSP(s), application specific integrated circuit(s) (ASIC(s)), PLD(s), and/or FPLD(s).

In the illustrated example of FIG. 6, the code translator 303 includes the DSL generator 606 to convert, transform, and/or otherwise translate the intermediate code to DSL code (e.g., code in a DSL representation). In response to the code lifter 604 identifying a valid postcondition (e.g., a lifted summary, an inferred summary, etc.), the DSL generator 606 can translate the intermediate code into DSL code (e.g., Halide code, OpenCL code, etc.). For example, the DSL generator 606 can generate a C++ source file that, when compiled and executed, produces an object file that can be linked with the original application (e.g., a compiled version of the non-annotated code 616). In some examples, the DSL generator 606 generates additional code portions (e.g., glue or stitching code) that can interface between code blocks of the original application and the DSL code.

In some examples, the DSL generator 606 implements means for translating the intermediate code to DSL code in a DSL representation when a first algorithmic intent of the annotated 614 matches a second algorithmic intent of the intermediate code. For example, the means for translating may be implemented by one or more analog or digital circuit(s), logic circuits, programmable processor(s), programmable controller(s), GPU(s), DSP(s), application specific integrated circuit(s) (ASIC(s)), PLD(s), and/or FPLD(s).

In the illustrated example of FIG. 6, the code translator 303 includes the metadata generator 608 to generate metadata (e.g., scheduling metadata) that can be used to configure the compilation auto-scheduler 408 of FIG. 4. In some examples, the metadata generator 608 embeds and/or otherwise includes metadata within a code block of the annotated code 614. For example, the metadata generator 608 may embed the metadata in the annotated code 614 prior to the code lifter 604 obtaining the annotated code 614. In such examples, the code lifter 604 cam lift an algorithmic intent from the annotated code 614 while maintaining corresponding metadata unprocessed. The code lifter 604 can transmit the intermediate code and the corresponding metadata to the variant generator 302 to configure the compilation auto-scheduler 408 to compile a variant. Alternatively, the metadata generator 608 may transmit the metadata to the compilation auto-scheduler 408.

In some examples, the metadata generator 608 generates metadata including scheduling information or data corresponding to a power profile of the heterogeneous system 304, where the power profile indicates whether low-power consumption is preferred over maximum performance and to what degree. For example, the power profile can correspond to the heterogeneous system 304 operating in a first power state, a second power state, etc., where the first power state has a higher power consumption capability than the second power state. In some examples, the metadata generator 608 generates metadata including instructions that specify which of the processing element(s) and/or compute API(s) are to be used for an algorithm of interest. In some examples, the metadata generator 608 generates metadata including instructions that specify a use of a section of a particular cost model, multiple variants of one or more processing elements to be used, lossy or reduced bit-width variants, etc., and/or a combination thereof.

In some examples, the metadata generator 608 implements means for generating scheduling metadata corresponding to a power profile of the heterogeneous system 304. For example, the means for generating may be implemented by one or more analog or digital circuit(s), logic circuits, programmable processor(s), programmable controller(s), GPU(s), DSP(s), application specific integrated circuit(s) (ASIC(s)), PLD(s), and/or FPLD(s).

In the illustrated example of FIG. 6, the code translator 303 includes the code replacer 610 to modify the original application code obtained by the code interface 602 to bind site(s) of the annotated code 614 to invoke the algorithm of interest via the runtime scheduler 314 of FIG. 3. In some examples, the code replacer 610 replaces a code block of the annotated code 614 with a function call to the runtime scheduler 314.

In some examples, the code replacer 610 modifies the original application code to capture data semantics (e.g., data dependencies) used for the heterogeneous offload. For example, the code replacer 610 may generate memory allocation routine(s) to be included in original application code to ensure cross-processing element compatibility. For example, the code replacer 610 may generate the memory allocation routine(s) to copy data used in heterogeneous offload to a shared memory buffer that is visible to all processing elements of the heterogeneous system 304.

In some examples, the code replacer 610 invokes a compiler (e.g., an imperative programming language compiler, a C/C++ compiler, etc.) to compile the executable 308 of FIG. 3. For example, the code replacer 610 can invoke the compiler to compile the executable 308 by compiling a modified version of application code into the executable 308. For example, the modified version can correspond to application code, where the annotated code 614 is replaced with one or more function calls to the runtime scheduler 314. In such examples, the annotated code 614 can be replaced with the one or more function calls based on the data semantics associated with and/or otherwise used for heterogeneous offload.

In some examples, the code replacer 610 implements means for replacing the annotated code 614 in the application code 700 with a function call to the runtime scheduler 314 to invoke one of the variant binaries 502, 504, 506, 508, 510 to be loaded onto one of the processing elements of the heterogeneous system 304 to execute a workload of interest. For example, the means for replacing may be implemented by one or more analog or digital circuit(s), logic circuits, programmable processor(s), programmable controller(s), GPU(s), DSP(s), application specific integrated circuit(s) (ASIC(s)), PLD(s), and/or FPLD(s).

In some examples, the code replacer 610 implements means for invoking a compiler to generate the executable 308 including the variant binaries 502, 504, 506, 508, 510 based on the DSL code, where each of the variant binaries 502, 504, 506, 508, 510 can invoke a respective one of the processing elements of the heterogeneous system 304 to execute an algorithm of interest. For example, the means for invoking may be implemented by one or more analog or digital circuit(s), logic circuits, programmable processor(s), programmable controller(s), GPU(s), DSP(s), application specific integrated circuit(s) (ASIC(s)), PLD(s), and/or FPLD(s).

In the illustrated example of FIG. 6, the code translator 303 includes the database 612 to record and/or otherwise store data (e.g., the annotated code 614, the non-annotated code 616, loop invariants, preconditions, postconditions, etc.). The database 612 may be implemented by a volatile memory (e.g., a SDRAM, DRAM, RDRAM, etc.) and/or a non-volatile memory (e.g., flash memory). The database 612 may additionally or alternatively be implemented by one or more DDR memories, such as DDR, DDR2, DDR3, DDR4, mDDR, etc. The database 612 may additionally or alternatively be implemented by one or more mass storage devices such as HDD(s), CD drive(s), DVD drive(s), SSD drive(s), etc. While in the illustrated example the database 612 is illustrated as a single database, the database 612 may be implemented by any number and/or type(s) of databases. Furthermore, the data stored in the database 612 may be in any data format such as, for example, binary data, comma delimited data, tab delimited data, SQL structures, etc. In FIG. 6, the database 612 is stored on a computational system that is electronically accessible. For example, the database 612 may be stored on a server, a desktop computer, an HDD, an SSD, or any other suitable computing system.

In the illustrated example of FIG. 6, the code translator 303 includes the communication bus 618 to facilitate communication operations associated with the code translator 303. For example, the communication bus 618 may correspond to an interface circuit or any other type of hardware or logic circuit to facilitate inter-element communication. In other examples, the communication bus 618 may be implemented in software. In some examples, one or more of the code interface 602, the code lifter 604, the DSL generator 606, the metadata generator 608, and/or the code replacer 610 are in communication via any suitable wired and/or wireless communication method. In some examples, one or more of the code interface 602, the code lifter 604, the DSL generator 606, the metadata generator 608, and/or the code replacer 610 can be in communication with any processing element or hardware component exterior to the runtime scheduler 314 via any suitable wired and/or wireless communication method.

While an example manner of implementing the code translator 303 of FIG. 3 is illustrated in FIG. 6, one or more of the elements, processes, and/or devices illustrated in FIG. 6 may be combined, divided, re-arranged, omitted, eliminated, and/or implemented in any other way. Further, the example code interface 602, the example code lifter 604, the example DSL generator 606, the example metadata generator 608, the example code replacer 610, the example database 612, the example communication bus 618 and/or, more generally, the example code translator 303 of FIG. 3 and/or, more generally, the example variant application 305 of FIG. 3 may be implemented by hardware, software, firmware and/or any combination of hardware, software and/or firmware. Thus, for example, any of the example code interface 602, the example code lifter 604, the example DSL generator 606, the example metadata generator 608, the example code replacer 610, the example database 612, the example communication bus 618 and/or, more generally, the example code translator 303 of FIG. 3 and/or, more generally, the example variant application 305 of FIG. 3 could be implemented by one or more analog or digital circuit(s), logic circuits, programmable processor(s), programmable controller(s), GPU(s), DSP(s), ASIC(s), PLD(s) and/or FPLD(s). When reading any of the apparatus or system claims of this patent to cover a purely software and/or firmware implementation, at least one of the example code interface 602, the example code lifter 604, the example DSL generator 606, the example metadata generator 608, the example code replacer 610, the example database 612, the example communication bus 618 and/or, more generally, the example code translator 303 of FIG. 3 is/are hereby expressly defined to include a non-transitory computer readable storage device or storage disk such as a memory, a DVD, a CD, a Blu-ray disk, etc., including the software and/or firmware. Further still, the example code translator 303 of FIG. 3 may include one or more elements, processes and/or devices in addition to, or instead of, those illustrated in FIG. 6 and/or may include more than one of any or all of the illustrated elements, processes and devices.

Figure 7:
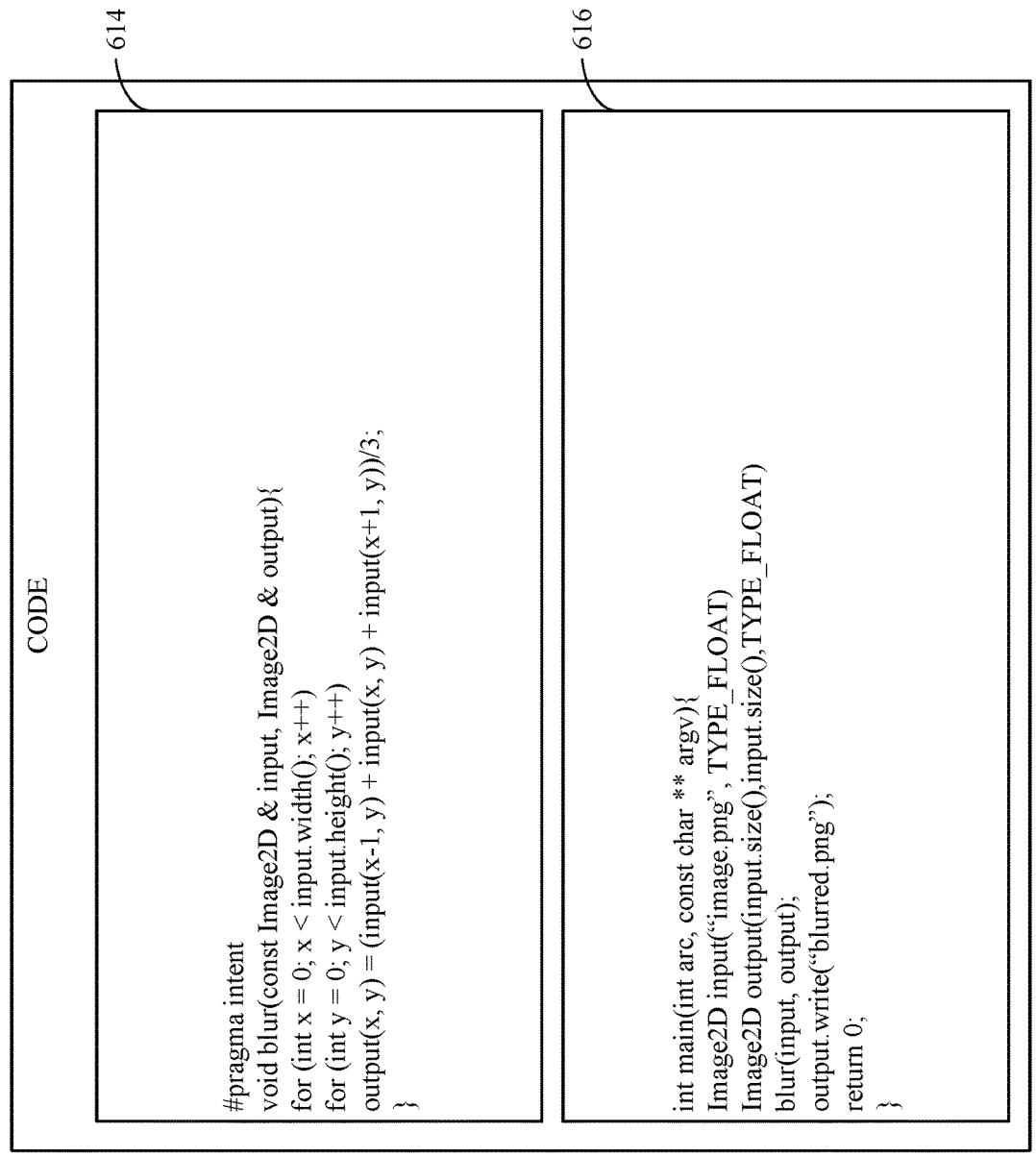
FIG. 7 depicts example application code including example intentional code.

FIG. 7 depicts example application code 700 including the annotated code 614 and the non-annotated code 616 of FIG. 6. For example, the code translator 303 may obtain the application code 700 from a user, the database 208 of FIG. 2, the one or more external devices of FIG. 2, etc., and/or a combination thereof. In FIG. 7, the code translator 303 can identify that the annotated code 614 by identifying and/or otherwise determining a presence of an imperative programming language compiler extensions. In the example of FIG. 7, the code "#pragma intent" can correspond to the imperative programming language compiler extension. For example, the code translator 303 can identify the annotated code 614 as intentional code. Accordingly, the code translator 303 can lift the intentional code from an imperative programming language representation to a formal representation corresponding to intermediate code. In the example of FIG. 7, the code translator 303 can identify the non-annotated code 616 by determining that the non-annotated code 616 is not annotated and/or otherwise marked by an imperative programming language compiler extension.

Figure 8:
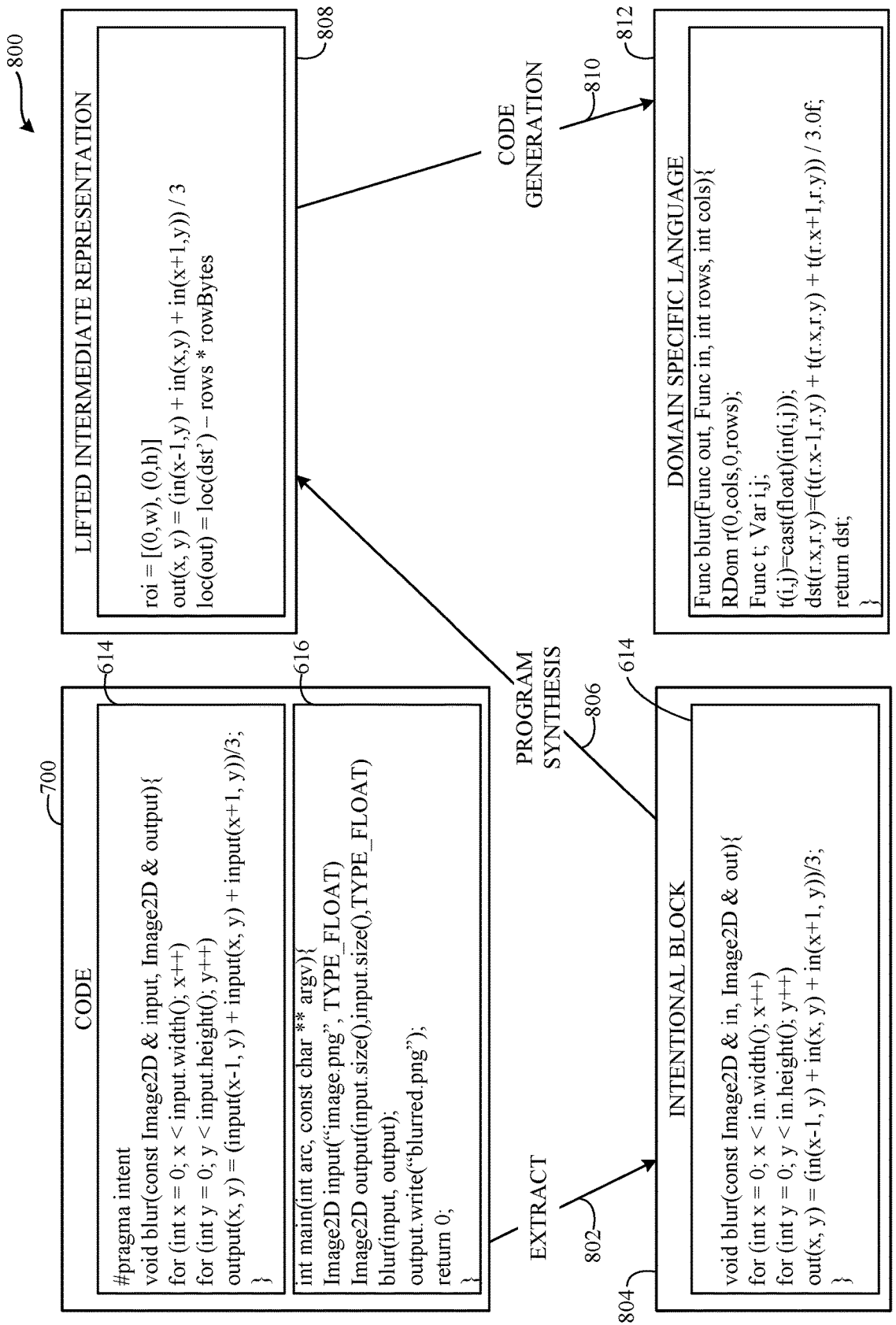
FIG. 8 is an example workflow to convert the example application code of FIG. 7 into a domain specific language representation.

FIG. 8 is an example workflow 800 to convert the application code 700 of FIG. 7 into a DSL representation. In the workflow 800 of FIG. 8, during a first operation 802, the code translator 303 extracts the annotated code 614 from the application code 700 in response to identifying "#pragma intent" in the application code 700. During the first operation 802, the code translator 303 identifies the annotated code 614 as an intentional block 804 (e.g., a block of intentional code, a block of code corresponding to an algorithmic intent, etc.).

In the illustrated example of FIG. 8, during a second operation 806, the code translator 303 converts the annotated code 614 from an imperative programming language representation to example intermediate code (e.g., lifted intermediate code) 808 in a lifted intermediate representation using inductive synthesis. For example, the intermediate code 808 may be represented and/or otherwise expressed in a high-level or formal specification language (e.g., a programming language based on predicate logic, a functional (e.g., a purely functional) programming language, etc.) that is provably equivalent to the semantics of the annotated code 614. During a third operation 810, the code translator 303 can transmit the intermediate code 808 to the variant generator 302. During the third operation 810, the variant generator 302 converts the intermediate code 808 from the lifted intermediate representation to example DSL code 812 in a DSL representation. Alternatively, the order of execution of the operations may be changed, and/or some of the operations described may be changed, eliminated, or combined.

Figure 9:
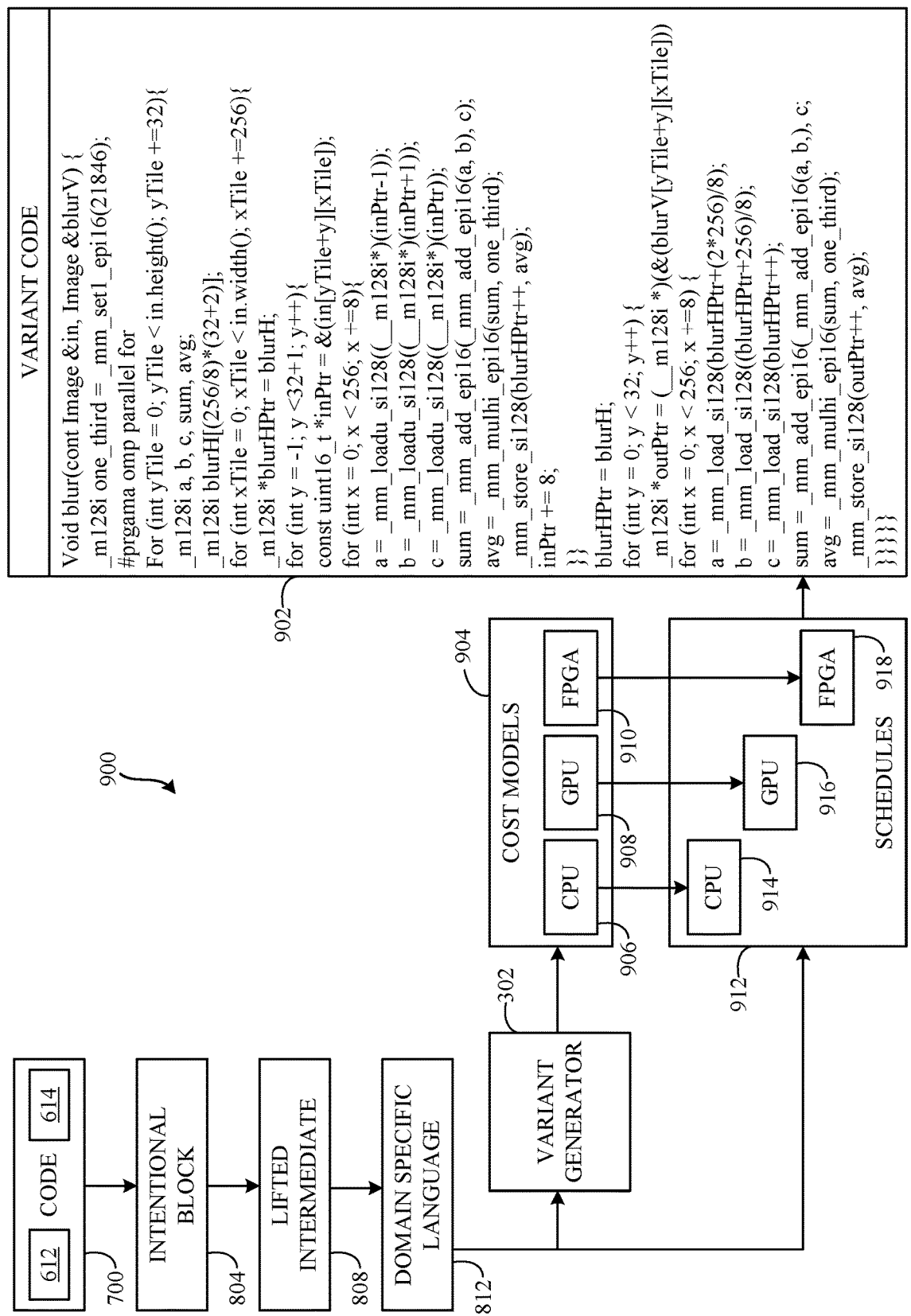
FIG. 9 is an example workflow to convert the example application code of FIG. 7 into example variant code.

FIG. 9 is an example workflow 900 to convert the application code 700 of FIG. 7 into example variant code 902. For example, the workflow 900 of FIG. 9 may correspond to an expanded workflow of the workflow 800 of FIG. 8. In the illustrated example of FIG. 9, in response to the DSL code 812 of FIG. 8 being generated, the code translator 303 can transmit and/or otherwise provide the DSL code 812 to the variant generator 302. In FIG. 9, the variant generator 302 generates example cost models 904 including a CPU cost model 906, a GPU cost model 908, and a FPGA cost model 910. For example, the cost model learner 404 of FIG. 4 may generate the cost models 904 based on the DSL code 812. Alternatively, the cost models 904 may include fewer or more cost models than depicted in FIG. 9.

In the workflow 900 of FIG. 9, the variant generator 302 can generate example schedules 912 including an example CPU schedule 914, an example GPU schedule 916, and an example FPGA schedule 918. In the workflow 900 of FIG. 9, the variant generator 302 can generate the variant code 902 based on the schedules 912. For example, the variant code 902 may correspond to one of the variant binaries 502, 504, 506, 508, 510 that can be executed by a corresponding one of the processing elements of the heterogeneous system 304 of FIG. 3. Alternatively, the order of execution of the operations may be changed, and/or some of the operations described may be changed, eliminated, or combined.

Figure 10:
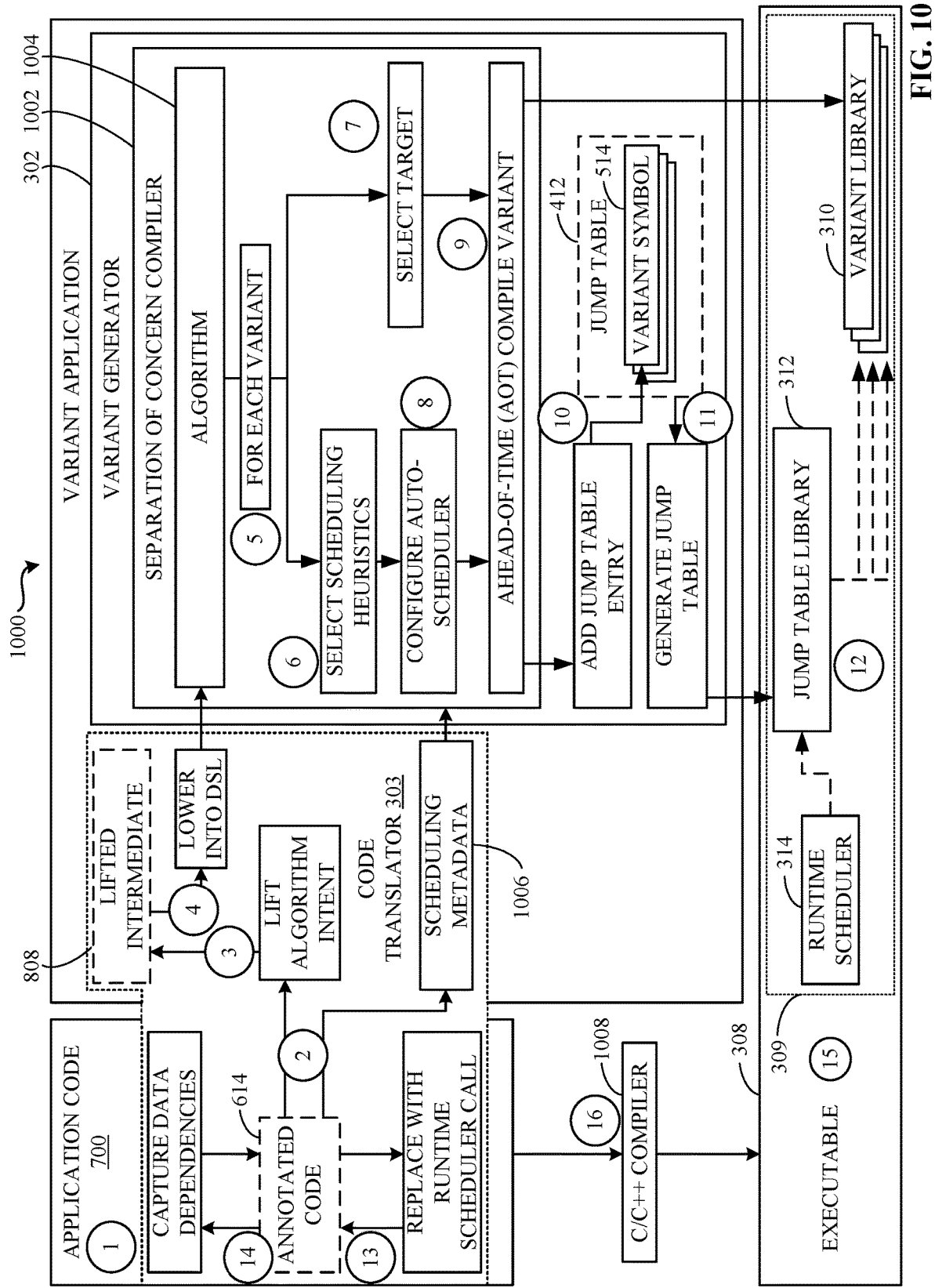
FIG. 10 is an example workflow to compile the example fat binary of FIGS. 3 and/or 5.

FIG. 10 is an example workflow 1000 to compile the fat binary 309 of FIGS. 3 and/or 5. In the illustrated example of FIG. 10, during a first operation, a user (e.g., an administrator, a developer, etc.) develops, generates, and/or obtains the application code 700 of FIG. 7. During a second operation, the code translator 303 identifies the annotated code 614 of FIG. 6 and extracts the identified annotated code 614. During a third operation, the code translator 303 lifts an algorithm intent from the annotated code 614. For example, the code translator 303 may convert the annotated code 614 from a first representation to a second representation, where the second representation corresponds to a lifted intermediate representation. In such examples, the code translator 303 converts the annotated code 614 into the intermediate code 808 of FIG. 8.

In the illustrated example of FIG. 10, during a fourth operation, the code translator 303 lowers the intermediate code 808 into the DSL code 812 of FIG. 8 corresponding to a DSL representation. In the illustrated example of FIG. 7, the variant generator 302 implements and/or otherwise facilitates execution of a separation of concern compiler 1002. In FIG. 10, the variant generator 302 includes the separation of concern compiler 1002 to output the variant library 310 of FIG. 3, the jump table library 312 of FIG. 3, etc., for generation of the executable 308 of FIG. 3. The separation of concern compiler 1002 utilizes the principle of separation of concerns to separate how an example algorithm 1004 in a DSL representation is written from how the algorithm 1004 is executed. For example, the separation of concern compiler 1002 can implement at least one of the variant manager 402, the cost model learner 404, the weight storage 406, the compilation auto-scheduler 408, the variant compiler 410, the jump table 412, the application compiler 414, the feedback interface 416, or the performance analyzer 418 of FIG. 4.

In the illustrated example of FIG. 10, during a fifth operation, the separation of concern compiler 1002 selects a variant (e.g., a variant binary) of interest corresponding to a processing element of interest. For each variant (e.g., to be executed in parallel, in sequential order, etc.), the separation of concern compiler 1002 selects scheduling heuristics corresponding to the variant of interest during a sixth operation and selects a target (e.g., a hardware target, a processing element, etc.) during a seventh operation. In response to selecting the scheduling heuristics at the sixth operation, the separation of concern compiler 1002 configures the compilation auto-scheduler 408 of FIG. 4 based on the corresponding scheduling heuristics during an eighth operation. For example, the compilation auto-scheduler 408 may be configured based on example scheduling metadata 1006 corresponding to the annotated code 614.

In the illustrated example of FIG. 10, during a ninth operation, the separation of concern compiler 1002 ahead-of-time (AOT) compiles a variant binary for each variant of interest. During the ninth operation, the separation of concern compiler 1002 stores the compiled variant binary in the variant library 310 of FIG. 3. In FIG. 10, during a tenth operation, the separation of concern compiler 1002 invokes the variant generator 302 to add a jump table entry corresponding to the compiled variant binary. For example, a jump table entry of the jump table 412 may be generated and a corresponding one of the variant symbols 514 may be stored at the jump table entry.

In the illustrated example of FIG. 10, during an eleventh operation, after each variant has been compiled and/or otherwise processed, the variant generator 302 generates a jump table (e.g., the jump table 412 of FIG. 4) and stores the jump table in the jump table library 312. During a twelfth operation, the variant generator 302 generates the fat binary 309 of FIGS. 3 and/or 5 by at least linking the variant library 310, the jump table library 312, and the runtime scheduler 314 of FIGS. 3, 4, and/or 5. During a thirteenth operation, the code translator 303 replaces the annotated code 614 with one or more runtime scheduler calls. For example, the code translator 303 may replace a code block of the annotated code 614 with a function call to the runtime scheduler 314 to invoke the jump table library 312. During a fourteenth operation, the code translator 303 captures and/or otherwise determines data dependencies between the application code 700 and the annotated code 614. For example, the code translator 303 may link the replaced sections of the annotated code 614 with the application code 700.

In the illustrated example of FIG. 10, during a fifteenth operation, the variant generator 302 compiles the fat binary 309. For example, the variant generator 302 may compile the fat binary 309 by linking at least one of the variant library 310, the jump table library 312, or the runtime scheduler 314. During a sixteenth operation, the code translator 303 invokes an example imperative programming language compiler 1008 (e.g., a C/C++ Compiler) to compile the executable 308. For example, the code translator 303 can invoke the compiler 1008 to compile the executable 308 by compiling a modified version of the application code 700 into the executable 308. For example, the modified version can correspond to the application code 700 of FIG. 7 where the annotated code 614 is replaced with one or more function calls to the runtime scheduler 314. In such examples, the annotated code 614 can be replaced with the one or more function calls based on the data dependencies captured during the fourteenth operation.

In the illustrated example of FIG. 10, the compiler 1008 can compile the executable 308 by at least linking the variant library 310, the jump table library 312, the runtime scheduler 314, and the modified version of the application code 700. Alternatively, the compiler 1008 may be included in the code translator 303, the variant generator 302, and/or, more generally, the variant application 305. Alternatively, the order of execution of the operations may be changed, and/or some of the operations described may be changed, eliminated, or combined.

Figure 11:
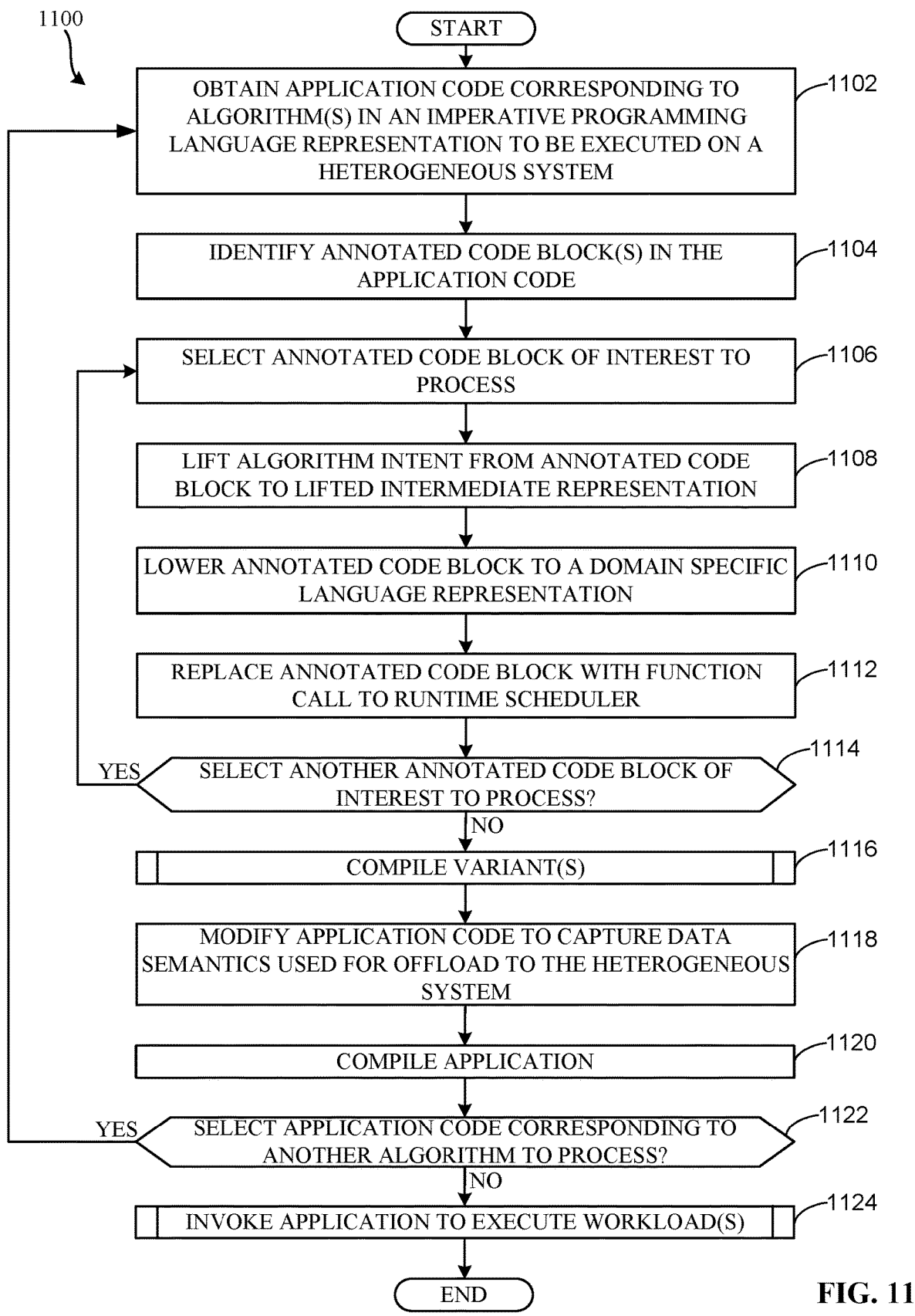
FIG. 11 is a flowchart representative of example machine readable instructions that may be executed to implement the example code translator of FIGS. 3, 4, 6, and/or 10 and/or the example variant generator of FIGS. 3, 4, 6, 9 and/or 10 to invoke an application to execute workload(s) on a heterogeneous system.
Figure 12:
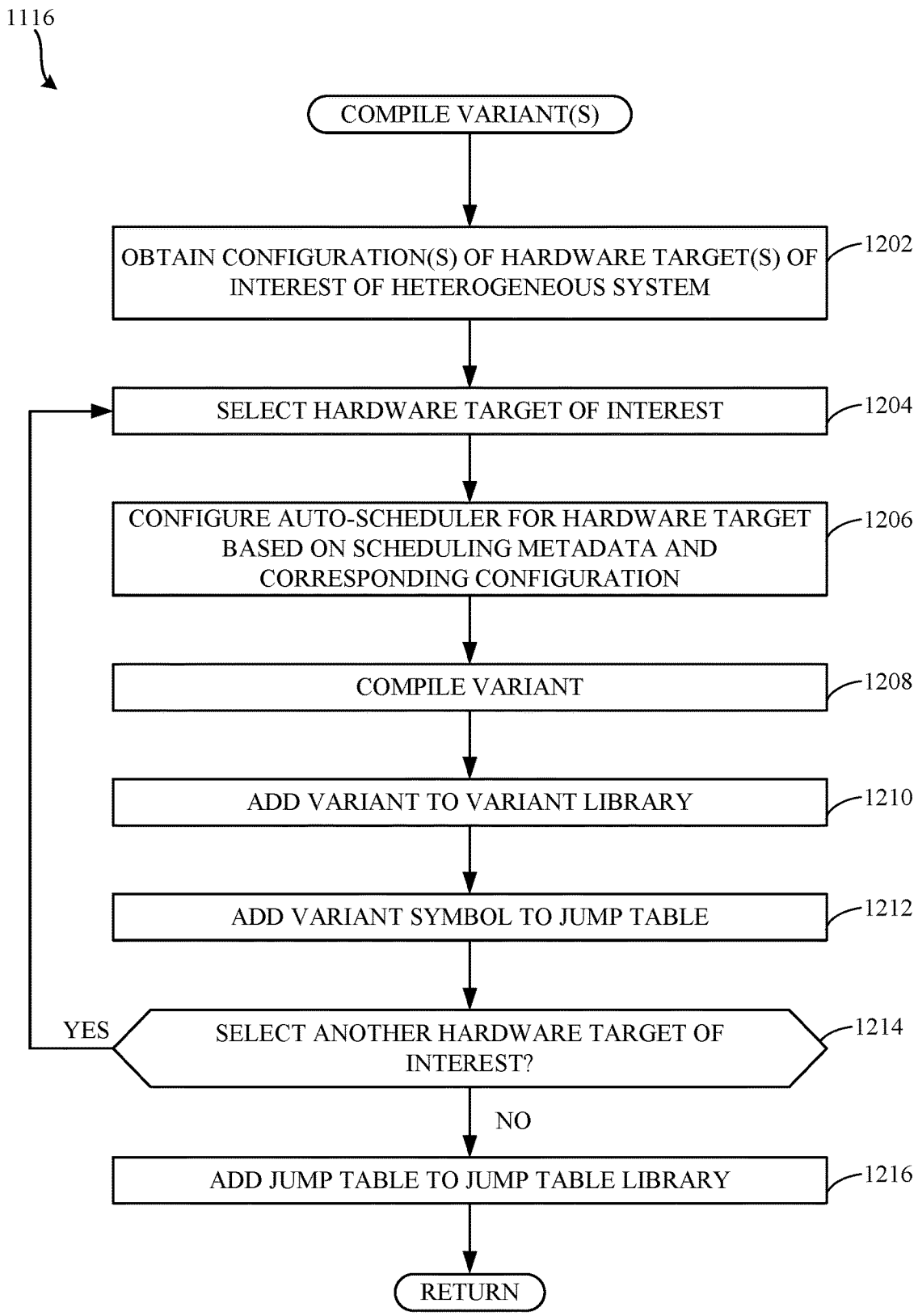
FIG. 12 is a flowchart representative of example machine readable instructions that may be executed to implement the example variant generator of FIGS. 3, 4, 6, 9, and/or 10 to compile variant(s).
Figure 14:
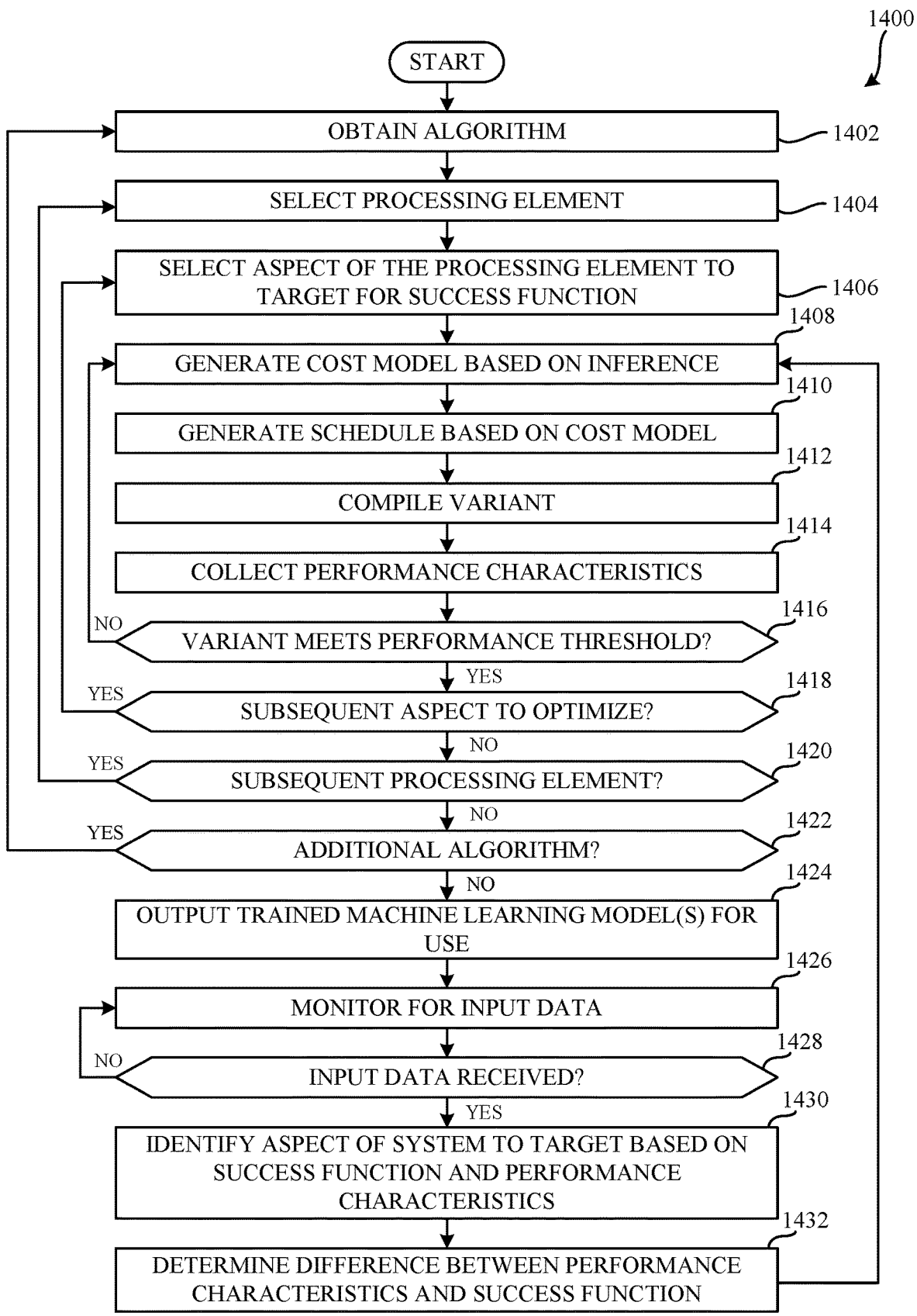
FIG. 14 is a flowchart representative of example machine readable instructions that may be executed to implement the example variant generator of FIGS. 3, 4, 6, 9, and/or 10 during a training phase.

Flowcharts representative of example hardware logic, machine readable instructions, hardware implemented state machines, and/or any combination thereof for implementing the variant generator 302 of FIGS. 3, 4, 6, 9, and/or 10 and/or the code translator 303 of FIGS. 3, 4, 6, and/or 10 are shown in FIGS. 11, 12, 14, and/or 15. The machine readable instructions may be one or more executable programs or portion(s) of an executable program for execution by a computer processor such as the processor 1712 shown in the example processor platform 1700 discussed below in connection with FIG. 17. The program may be embodied in software stored on a non-transitory computer readable storage medium such as a CD-ROM, a floppy disk, a hard drive, a DVD, a Blu-ray disk, or a memory associated with the processor 1712, but the entire program and/or parts thereof could alternatively be executed by a device other than the processor 1712 and/or embodied in firmware or dedicated hardware. Further, although the example program is described with reference to the flowcharts illustrated in FIGS. 11, 12, 14, and/or 15, many other methods of implementing the example variant generator 302 and/or the code translator 303 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Figure 13:
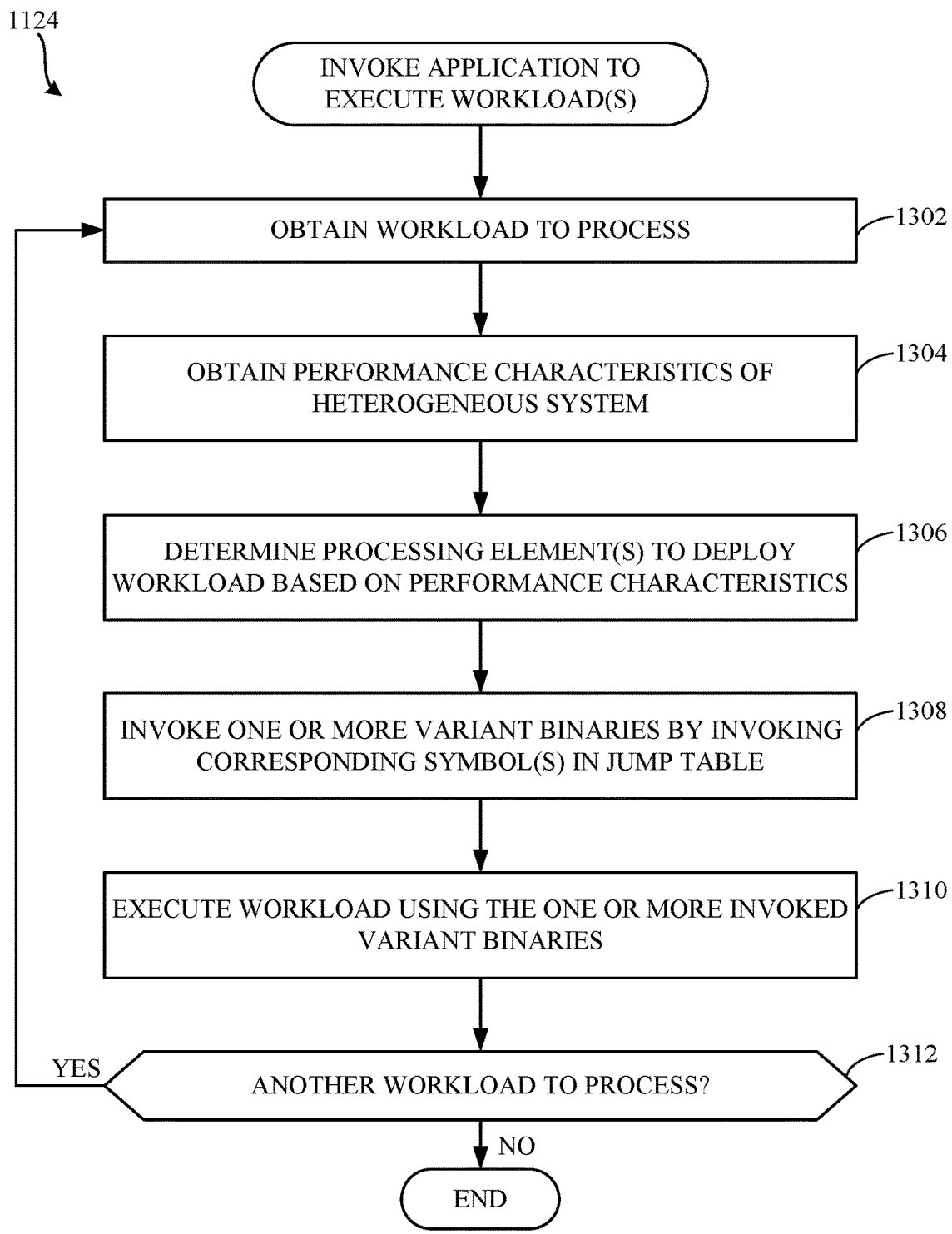
FIG. 13 is a flowchart representative of example machine readable instructions that may be executed to implement the heterogeneous system of FIGS. 1, 3, 4, and/or 6 to invoke an application to execute workload(s).

Additionally, flowcharts representative of example hardware logic, machine readable instructions, hardware implemented state machines, and/or any combination thereof for implementing the executable 308 of FIGS. 3 and/or 10 are shown in FIGS. 13 and/or 16. The machine readable instructions may be one or more executable programs or portion(s) of an executable program for execution by a computer processor such as the processor 1812 shown in the example processor platform 1800 discussed below in connection with FIG. 18. The program may be embodied in software stored on a non-transitory computer readable storage medium such as a CD-ROM, a floppy disk, a hard drive, a DVD, a Blu-ray disk, or a memory associated with the processor 1812, but the entire program and/or parts thereof could alternatively be executed by a device other than the processor 1812 and/or embodied in firmware or dedicated hardware. Further, although the example program is described with reference to the flowcharts illustrated in FIGS. 13 and/or 16, many other methods of implementing the example executable 308 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an API, etc., in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 11-16 may be implemented using executable instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 11 is a flowchart representative of example machine readable instructions 1100 that may be executed to implement the code translator 303 of FIGS. 3, 4, 6, and/or 10 and/or the variant generator 302 of FIGS. 3, 4, 6, 9 and/or 10 to invoke an application to execute workload(s) on the heterogeneous system 100 of FIG. 1 and/or the heterogeneous system 304 of FIGS. 3, 4, and/or 6. The machine readable instructions 1100 begin at block 1102, at which the code translator 303 and/or, more generally, the variant application 305 (FIG. 5) obtains application code corresponding to algorithm(s) in an imperative programming language representation to be executed on a heterogeneous system. For example, the code interface 602 (FIG. 6) may obtain the application code 700 of FIG. 7 from the database 208 of FIG. 2, the one or more external devices of FIG. 2, etc., and/or a combination thereof. In such examples, the application code 700 can correspond to one or more algorithms written and/or otherwise developed in an imperative programming language such as C or C++. Accordingly, the one or more algorithms can be represented in a first representation corresponding to the imperative programming language.

At block 1104, the code translator 303 and/or, more generally, the variant application 305 identifies annotated code block(s) in the application code. For example, the code lifter 604 (FIG. 6) may identify the annotated code 614 of FIGS. 6 and/or 7 as an intentional block in response to identifying the imperative programming language compiler extension "#pragma". In such examples, the code lifter 604 can identify the annotated code 614 based on a beginning of the annotated code 614 being annotated and/or otherwise identified with the "#pragma" identifier.

At block 1106, the code translator 303 and/or, more generally, the variant application 305 selects an annotated code block of interest to process. For example, the code lifter 604 may identify an annotated code block corresponding to the annotated code 614 depicted in FIG. 7 to process. In such examples, the code lifter 604 can identify an algorithm associated with the annotated code block to process.

At block 1108, the code translator 303 and/or, more generally, the variant application 305 lifts an algorithm intent from the annotated code bock to a lifted intermediate representation. For example, the code lifter 604 may use verified lifting to lift an algorithm intent from the annotated code 614 to generate the intermediate code 808 of FIG. 8.

At block 1110, the code translator 303 and/or, more generally, the variant application 305 lowers the annotated code block to a DSL representation. For example, the DSL generator 606 may convert the intermediate code 808 to the DSL code 812 of FIG. 8, where the DSL code 812 is in a DSL representation.

At block 1112, the code translator 303 and/or, more generally, the variant application 305 replaces the annotated code block with a function call to a runtime scheduler. For example, the code replacer 610 (FIG. 6) may replace the annotated code 614 in the application code 700 with one or more function calls to the runtime scheduler 314 of FIG. 3. In such examples, in response to the heterogeneous system 304 executing the application code 700 compiled in the executable 308 at a site (e.g., a code site) of the replaced code (e.g., the code site of the annotated code 614), the executable 308 can execute the one or more function calls to invoke the runtime scheduler 314 to execute the algorithm corresponding to the annotated code 614 with at least one of the processing elements of the heterogeneous system 304.

At block 1114, the code translator 303 and/or, more generally, the variant application 305 determines whether to select another annotated code block of interest to process. For example, the code lifter 604 may identify another code block in the application code 700 that has been flagged, identified, and/or otherwise annotated by "#pragma".

If, at block 1114, the code translator 303 and/or, more generally, the variant application 305 determines that there is another annotated code block of interest to process, control returns to block 1106 to select another annotated code block of interest to process. If, at block 1114, the code translator 303 and/or, more generally, the variant application 305 determines that there is not another annotated code block of interest to process, then, at block 1116, the variant generator 302 and/or, more generally, the variant application 305 compiles variant(s). For example, the variant compiler 410 (FIG. 4) may compile one or more of the variant binaries 502, 504, 506, 508, 510 of FIG. 5 based on the DSL code 812. An example process that may be used to implement block 1116 is described below in connection with FIG. 12.

At block 1118, the code translator 303 and/or, more generally, the variant application 305 modifies the application code to capture data semantics used for offload to the heterogeneous system. For example, the code replacer 610 may generate one or more memory allocation routines to be included in the application code 700 to ensure cross-processing element compatibility. For example, the code replacer 610 may generate the one or more memory allocation routines to copy data used in heterogeneous offload to a shared memory buffer that is visible to all processing elements of the heterogeneous system 304.

At block 1120, the code translator 303 and/or, more generally, the variant application 305 compiles an application. For example, the code replacer 610 may invoke the compiler 1008 of FIG. 10 to compile the executable 308 based on the modified version of the application code 700.

At block 1122, the code translator 303 and/or, more generally, the variant application 305 determines whether to select additional application code corresponding to another algorithm to process. If, at block 1122, the code translator 303 and/or, more generally, the variant application 305 determines that there is additional application code and/or additional algorithm(s) of interest to process, control returns to block 1102 to obtain the additional application code and/or the additional algorithm(s). If, at block 1122, the code translator 303 and/or, more generally, the variant application 305 determines that there is no additional code and/or algorithm(s) of interest to process, then, at block 1124, the heterogeneous system 304 invokes the application to execute workload(s). An example process that may be used to implement block 1124 is described below in connection with FIG. 13. In response to executing the application to execute workload(s) at block 1124, the machine readable instructions 1100 of FIG. 11 conclude.

FIG. 12 is a flowchart representative of the machine readable instructions 1116 that may be executed to implement the variant generator 302 of FIG. 3 to compile variant(s). The process of FIG. 12 may be used to implement block 1116 of FIG. 11. The machine readable instructions 1116 of FIG. 12 begin at block 1202, at which the variant generator 302 and/or, more generally, the variant application 305 obtains configuration(s) of hardware target(s) of interest. For example, the variant manager 402 (FIG. 4) may obtain a configuration (e.g., a target configuration) associated with the heterogeneous system 304 of FIG. 3. In such examples, the variant manager 402 can obtain a target configuration from the database 208 of FIG. 2, the one or more external devices of FIG. 2, the heterogeneous system 304 of FIGS. 3, 4, and/or 6, etc., and/or a combination thereof. The target configuration may include information indicative of the heterogeneous system 304 including the CPU 316, the FPGA 318, the VPU 320, and/or the GPU 322 of FIG. 3.

At block 1204, the variant generator 302 and/or, more generally, the variant application 305 selects a hardware target of interest. For example, the compilation auto-scheduler 408 (FIG. 4) may select the CPU 316 to process. At block 1206, the variant generator 302 and/or, more generally, the variant application 305 configures an auto-scheduler for the hardware target based on scheduling metadata and the corresponding configuration. For example, the compilation auto-scheduler 408 may be configured based on the target configuration associated with the CPU 316 and/or the scheduling metadata 1006 of FIG. 10. In such examples, the compilation auto-scheduler 408 can be configured based on a hardware architecture, scheduling heuristics, etc., associated with the CPU 316. In response to the configuring, the compilation auto-scheduler 408 can generate a schedule, one or more execution graphs, etc., that can be used by the CPU 316 to execute the workload.

At block 1208, the variant generator 302 and/or, more generally, the variant application 305 compiles a variant. For example, the variant compiler 410 (FIG. 4) may compile the first variant binary 502 of FIG. 5 based on the target configuration associated with the CPU 316, the schedule, the one or more execution graphs, the scheduling metadata 1006, etc., and/or a combination thereof. At block 1210, the variant generator 302 and/or, more generally, the variant application 305 adds the variant to a variant library. For example, the variant compiler 410 may add the first variant binary 502 to the variant library 310 of FIG. 3.

At block 1212, the variant generator 302 and/or, more generally, the variant application 305 adds a variant symbol to a jump table. For example, the variant compiler 410 may add a variant symbol that corresponds to the first variant binary 502 to the jump table 412 of FIG. 4 of the jump table library 312 of FIGS. 3 and/or 4. In such examples, the variant compiler 410 can add a variant symbol of "_halide_ algox_cpu" to correspond to the first variant binary 502 of "ALGOX_CPU.O" as depicted in the illustrated example of FIG. 5.

At block 1214, the variant generator 302 and/or, more generally, the variant application 305 determines whether to select another hardware target of interest. For example, the compilation auto-scheduler 408 may select the FPGA 318 of FIG. 3 to process. If, at block 1214, the variant generator 302 and/or, more generally, the variant application 305 determines to select another hardware target of interest, control returns to block 1204 to select another hardware target of interest. If, at block 1214, the variant generator 302 and/or, more generally, the variant application 305 determines not to select another hardware target of interest, then, at block 1216, the variant generator 302 and/or, more generally, the variant application 305 adds the jump table to a jump table library. For example, the application compiler 414 (FIG. 4) may add the jump table 412 of FIG. 4 to the jump table library 312 of FIGS. 3 and/or 4. In response to adding the jump table to the jump table library at block 1216, the machine readable instructions 1116 of FIG. 11 return to block 1118 of the machine readable instructions 1100 of FIG. 11 to modify the application code to capture data semantics used for offload to the heterogeneous system.

FIG. 13 is a flowchart representative of the machine readable instructions 1124 that may be executed to implement the heterogeneous system 304 of FIGS. 3, 4, and/or 6 to invoke an application to execute workload(s). The process of FIG. 13 may be used to implement block 1124 of FIG. 11. The machine readable instructions 1124 of FIG. 13 begin at block 1302, at which the heterogeneous system 304 obtains a workload to process. For example, the heterogenous system 304 may obtain an algorithm from the database 208 of FIG. 2, the one or more external devices of FIG. 2, from the storage 306 of FIG. 3, the storage 306 of FIG. 3, etc., to process.

At block 1304, the heterogeneous system 304 obtains performance characteristics of the heterogeneous system 304. For example, the runtime scheduler 314 (FIG. 3) may obtain the metadata 512 of FIG. 5 to obtain performance characteristics associated with the CPU 316, the FPGA 318, the VPU 320, and/or the GPU 322 of FIG. 3.

At block 1306, the heterogeneous system 304 determines processing element(s) to deploy the workload based on the performance characteristics. For example, the runtime scheduler 314 may determine to use the GPU 322 to execute the workload based on the performance characteristics corresponding to the GPU 322 being indicative that the GPU 322 has available bandwidth to execute the workload. In other examples, the runtime scheduler 314 can determine, at a first time, to use the GPU 322 even though the GPU 322 is unavailable to execute the workload at the first time. For example, the runtime scheduler 314 may determine that the GPU 322 can execute the workload at a second time after the first time. In such examples, the runtime scheduler 314 can determine that waiting until the second time to execute the workload with the GPU 322 is faster or provides a different benefit (e.g., a different quantity of power consumption, a more efficient use of the processing elements, etc.) than executing the workload with an available one of the processing elements at the first time.

At block 1308, the heterogeneous system 304 invokes one or more variant binaries by invoking corresponding symbol(s) in a jump table. For example, the runtime scheduler 314 may execute the jump function 516 of FIG. 5 to invoke the second variant binary 504 of FIG. 5 of the variant library 310. In such examples, the runtime scheduler 314 can invoke the second variant binary 504 by calling and/or otherwise invoking the variant symbol "_halide_algox_gpu" of the variant symbols 514 of the jump table 412.

At block 1310, the heterogeneous system 304 executes the workload using the one or more invoked variant binaries. For example, the runtime scheduler 314 may execute the application function 518 of FIG. 5 to execute the workload using the second variant binary 504. For example, the runtime scheduler 314 can load the second variant binary 504 onto the GPU 322 by accessing the respective variant symbol from the jump table library 312. In other examples, the runtime scheduler 314 can execute the application function 518 to execute a first portion of the workload using a first one of the variant binaries 502, 504, 506, 508, 510 and a second portion of the workload using a second one of the variant binaries 502, 504, 506, 508, 510. For example, the runtime scheduler 314 can load the second variant binary 504 onto the GPU 322 and load the fourth variant binary 508 onto the VPU 320 by accessing the respective variant symbol from the jump table library 312.

At block 1312, the heterogeneous system 304 determines whether there is another workload to process. For example, the runtime scheduler 314 may determine that there is another workload to process or, in other examples, can determine that there are no additional workloads to process. If, at block 1312, the heterogeneous system 304 determines that there is another workload of interest to process, control returns to block 1302 to obtain another workload to process, otherwise the machine readable instructions 1124 of FIG. 13 return to the machine readable instructions 1100 of FIG. 11 to conclude.

FIG. 14 is a flowchart representative of example machine readable instructions 1400 that may be executed to implement the variant generator 302 of FIGS. 3, 4, 6, 9, and/or 10 in a training phase. The machine readable instructions 1400 of FIG. 14 begin at block 1402, at which the variant manager 402 (FIG. 4) obtains an algorithm. For example, the external device may correspond to the administrator device 202 and the algorithm may correspond to an arbitrary algorithm in a set of arbitrary algorithms.

At block 1404, the variant generator 302 selects a processing element for which to develop the algorithm. For example, the variant generator 302 may be developing variants for use on a heterogeneous system including four processing elements. In such examples, the variant manager 402 can select one of the processing elements of the heterogeneous system 304 of FIG. 3 for which to generate a variant.

At block 1406, the variant generator 302 selects an aspect of the processing element to target for a success function of the selected processing element. For example, the variant manager 402 may select to target execution speed of the obtained algorithm on the FPGA 318 of FIG. 3.

At block 1408, the variant generator 302 generates a cost model for the selected processing element and the select aspect to target. For example, on an initial run, the cost model learner 404 (FIG. 4) may utilize generic weights for a DNN to generate one or more of the cost models 904 of FIG. 9. At block 1410, the variant generator 302 generates a schedule to implement the obtained algorithm with a success function associated with the selected aspect on the selected processing element. For example, the compilation auto-scheduler 408 (FIG. 4) may generate one or more of the schedules 912 of FIG. 9 to implement the obtained algorithm with a success function associated with the selected aspect on the selected processing element.

At block 1412, the variant generator 302 compiles a variant. For example, the variant compiler 410 (FIG. 4) may compile the variant according to the schedule generated by the compilation auto-scheduler 408. In such examples, the compiled variant can be loaded into an application that is compiled by the application compiler 414 (FIG. 4) as an executable file (e.g., a binary).

At block 1414, after the variant is subsequently executed on a training system (e.g., a training heterogeneous system), the variant generator 302 collects performance characteristics associated with the performance of the variant on the selected processing element. For example, the feedback interface 416 (FIG. 4) may obtain the performance characteristics associated with the performance of the variant on the selected processing element.

At block 1416, the variant generator 302 determines whether the execution of the variant meets a performance threshold. For example, the performance analyzer 418 (FIG. 4) may determine whether the execution of the variant meets and/or otherwise satisfies a performance threshold. If the execution of the variant does not meet the performance threshold (e.g., a desired performance level) (block 1416: NO), control returns to block 1408 where the collected performance characteristics are fed back into the cost model learner 404. If the execution of the variant meets the performance threshold (block 1416: YES), then, at block 1418, the variant generator 302 (e.g., the variant manager 402) determines whether there are any other aspects are to be targeted for success functions for the selected processing element. If there are subsequent aspects to target for success functions (block: 1418: YES), control returns to block 1406. If there are not subsequent aspects to target for success functions (block: 1418: NO), then, at block 1420, the variant generator 302 (e.g., the variant manager 402) determines whether there are any other processing elements for which to develop one or more variants for.

If there are subsequent processing elements (block: 1420: YES), control returns to block 1404. If there are not subsequent processing elements (block: 1420: NO), then, at block 1422, the variant generator 302 (e.g., the variant manager 402) determines whether there are additional algorithms. If there are additional algorithms (block: 1422: YES), control returns to block 1402. If there are not additional algorithms (block: 1422: NO), then, at block 1424, the variant generator 302 (e.g., the variant manager 402) outputs the respective trained DNN models (e.g., the trained ML/AI model 214 of FIGS. 2 and/or 3) corresponding the respective processing elements of a heterogeneous system (e.g., weight files) for use. For a algorithms to be executed on n processing elements that target m different aspects, the variant generator 302 can generate a*n*m DNN to generate and analyze the various cost models. For example, the variant manager 402 may output the trained DNN models to a database, another variant generator, and/or a heterogeneous system in the field or system.

At block 1426, the variant generator 302 monitors for input data. For example, the feedback interface 416 may monitor a database, a heterogeneous system in the field or system, or other data sources that may provide empirically collected performance characteristics.

At block 1428, the variant generator 302 (e.g., the feedback interface 416) determines whether input data has been received and/or otherwise obtained. If the feedback interface 416 determines that input data has not been received (block 1428: NO), control returns to block 1426. If the feedback interface 416 determines that input data has been received (block 1428: YES), then, at block 1430, the variant generator 302 (e.g., the performance analyzer 418) identifies an aspect of the heterogeneous system to target based on the success function of the system and the performance characteristics.

At block 1432, the variant generator 302 (e.g., the performance analyzer 418) determines the difference between the desired performance (e.g., a performance threshold) defined by the success function and the actual performance achieved during execution of the algorithm during the inference phase. In response to determining the difference at block 1432, the machine readable instructions 1400 of FIG. 14 return to block 1408 where the empirical data is re-inserted into the variant generator 302 (e.g., the cost model learner 404) to adjust the cost models of the individual processing element based on the contextual data associated with the system as a whole (e.g., the performance characteristics, such as, runtime load and environment characteristics).

Figure 15:
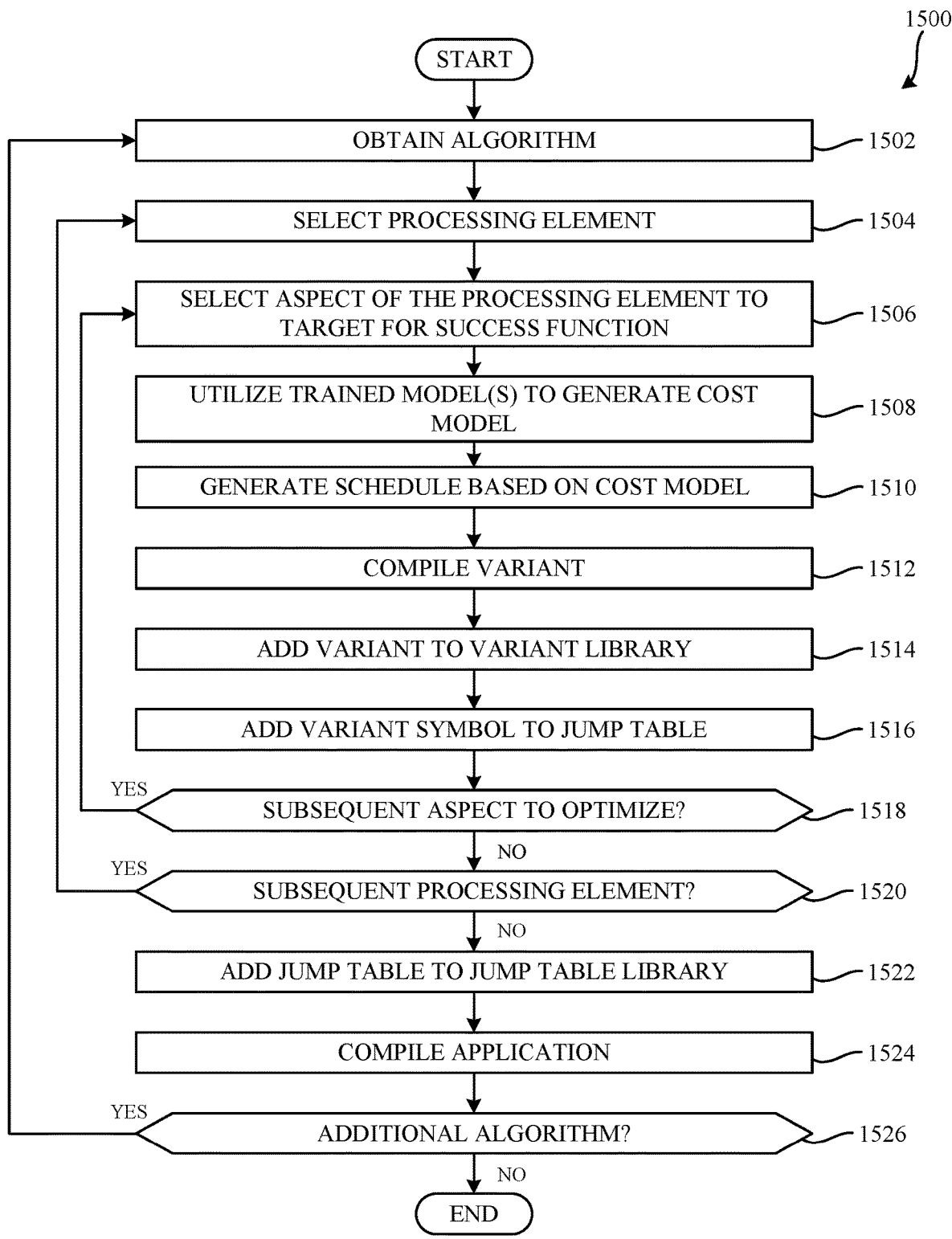
FIG. 15 is a flowchart representative of example machine readable instructions that may be executed to implement the example variant generator of FIGS. 3, 4, 6, 9 and/or 10 during an inference phase.

FIG. 15 is a flowchart representative of example machine readable instructions 1500 that may be executed to implement the variant generator 302 of FIGS. 3, 4, 6, 9 and/or 10 during an inference phase. The machine readable instructions 1500 of FIG. 15 begin at block 1502, at which the variant generator 302 (e.g., the variant manager 402) obtains an algorithm from an external device. For example, the external device may correspond to a laptop computer of a program developer, a user, an administrator, etc.

At block 1504, the variant generator 302 (e.g., the variant manager 402 of FIG. 4) selects a particular processing element for which to develop the algorithm. For example, the variant generator 302 may be developing variants for use on a heterogeneous system including four processing elements. In such examples, the variant manager 402 can select one of the processing elements for which to generate a variant.

At block 1506, the variant generator 302 (e.g., the variant manager 402) selects an aspect of the processing element to target for a success function of the selected processing element. For example, the variant manager 402 may select to target power consumption of execution of the obtained algorithm on an GPU such as the GPU 322 of FIG. 3.

At block 1508, the variant generator 302 (e.g., the cost model learner 404 of FIG. 4) utilizes the trained DNN models to generate at least one cost model of the algorithm for execution on at least one processing element of a heterogeneous system. At block 1510, the variant generator 302 (e.g., the compilation auto-scheduler 408 of FIG. 4) generates a schedule to implement the obtained algorithm with a success function associated with the selected aspect on the selected processing element. At block 1512, the variant generator 302 (e.g., the variant compiler 410 of FIG. 4) compiles a variant according to the schedule generated by the compilation auto-scheduler 408.

At block 1514, the variant generator 302 (e.g., the variant compiler 410) adds the variant to a variant library of the application to be compiled. At block 1516, the variant generator 302 (e.g., the variant compiler 410) adds a variant symbol (e.g., a pointer) to the jump table 412 of FIGS. 4 and/or 5 by transmitting the variant to the jump table 412, which generates a corresponding symbol associated with the location of the variant in a variant library of the application to be compiled.

At block 1518, the variant generator 302 (e.g., the variant manager 402) determines whether there are any other aspects are to be targeted for success functions for the selected processing element. If there are subsequent aspects to target for success functions (block: 1518: YES), control returns to block 1506. If there are not subsequent aspects to target for success functions (block: 1518: NO), then, at block 1520, the variant generator 302 (e.g., the variant manager 402) determines whether there are any other processing elements for which to develop one or more variants for. If there are subsequent processing elements (block: 1520: YES), control returns to block 1504. If there are not subsequent processing elements (block: 1520: NO), then, at block 1522, the variant generator 302 (e.g., the jump table 412) adds the current state of the jump table 412 to the jump table library of the application to be compiled. At block 1524, the variant generator 302 (e.g., the application compiler 414) compiles the different variants for the respective processing elements in the variant library, the variant symbols in the jump table library, and a runtime scheduler into an executable application.

At block 1526, the variant generator (e.g., the variant manager 402) determines whether there are additional algorithms. If there are additional algorithms (block: 1526: YES), control returns to block 1502. If there are not additional algorithms (block: 1526: NO), the machine readable instructions 1500 of FIG. 15 conclude.

Figure 16:
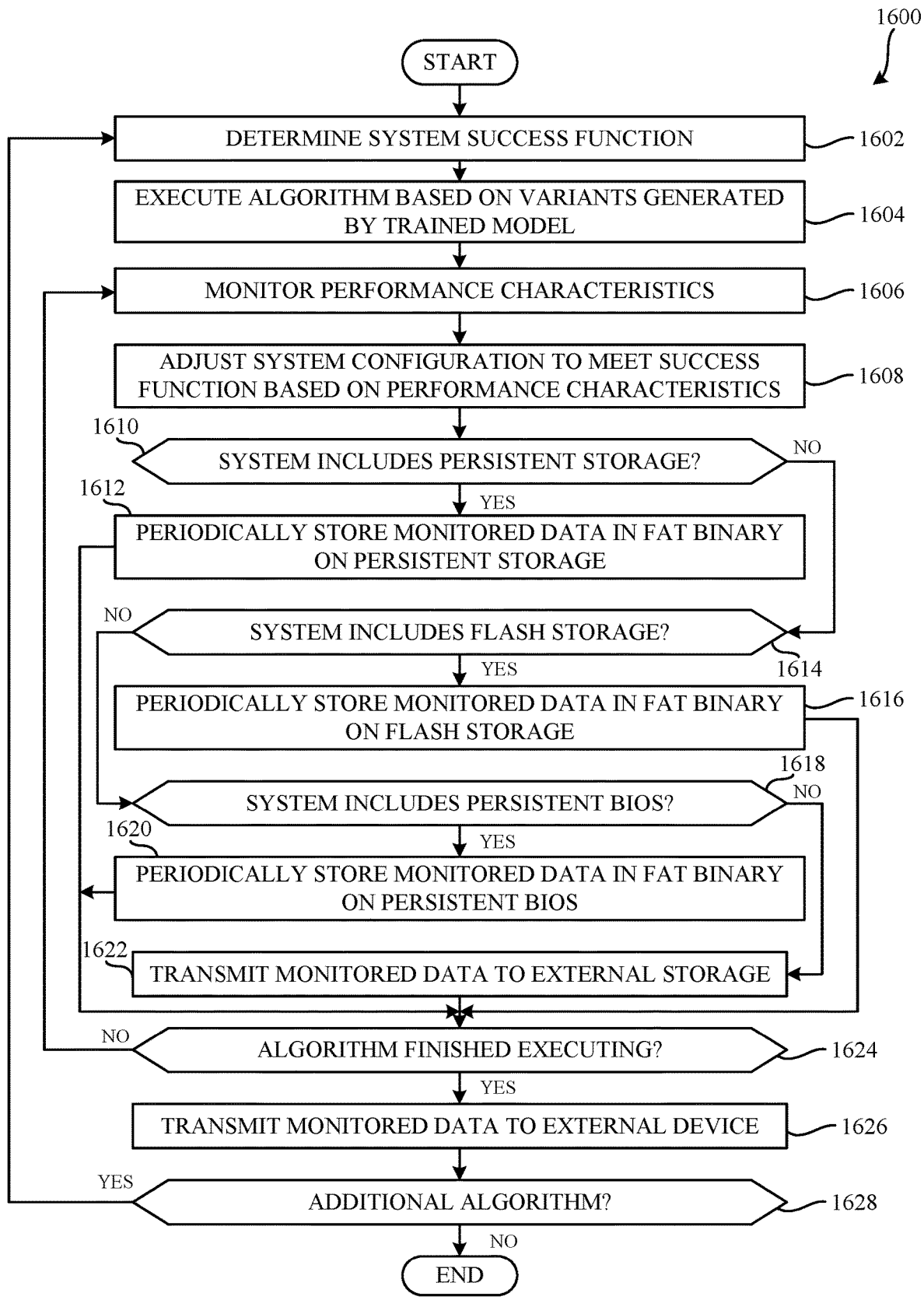
FIG. 16 is a flowchart representative of example machine readable instructions that may be executed to implement the example executable of FIGS. 3 and/or 10 and/or the example fat binary of FIGS. 3 and/or 5.

FIG. 16 is a flowchart representative of example machine readable instructions 1600 that may be executed to implement the executable 308 of FIGS. 3 and/or 10. The machine readable instructions 1600 begin at block 1602, at which the runtime scheduler 314 (FIG. 3) determines a system-wide success function for a heterogeneous system.

At block 1604, the runtime scheduler 314 executes the algorithm on a heterogeneous system according to variants generated by a trained ML/AI model. At block 1606, the runtime scheduler 314 monitors the performance characteristics of the heterogeneous system under a load and environmental conditions.

At block 1608, the runtime scheduler 314 adjusts the configuration of the heterogeneous system to meet the system-wide success function. For example, based on the performance characteristics, the runtime scheduler 314 may offload the workload executing on the CPU 316 to the GPU 322. To do so, the runtime scheduler 314 can access a variant for the specific algorithm of the workload that corresponds to the GPU 322 that is stored in the variant library 310. The runtime scheduler 314 can load the variant onto the GPU 322 by accessing the respective variant symbol from the jump table library 312.

At block 1610, the runtime scheduler 314 determines whether the heterogeneous system includes persistent storage. If the runtime scheduler 314 determines that the heterogeneous system does include persistent storage (block 1610: YES), then, at block 1612, the runtime scheduler 314 periodically stores the monitored data in the executable (e.g., the fat binary 309 of FIGS. 3 and/or 5) on the persistent storage. After block 1612, control proceeds to block 1624. If the runtime scheduler 314 determines that the heterogeneous system does not include persistent storage (block 1610: NO), then, at block 1614, the runtime scheduler 314 determines whether the heterogeneous system includes flash storage. If the runtime scheduler 314 determines that the heterogeneous system does include flash storage (block 1614: YES), then, at block 1616, the runtime scheduler 314 periodically stores the monitored data in the executable (e.g., the fat binary 309) on the flash storage. After block 1616, control proceeds to block 1624. If the runtime scheduler 314 determines that the heterogeneous system does not include flash storage (block 1614: NO), then, at block 1618, the runtime scheduler 314 determines whether the heterogeneous system includes persistent storage. If the runtime scheduler 314 determines that the heterogeneous system does include persistent BIOS (block 1618: YES), then, at block 1620, the runtime scheduler 314 periodically stores the monitored data in the executable (e.g., the fat binary 309) on the persistent BIOS. After block 1620, control proceeds to block 1624. If the runtime scheduler 314 determines that the heterogeneous system does not include persistent storage (block 1618: NO), then, at block 1622, the runtime scheduler 314 transmits the monitored data (e.g., the empirical performance characteristics) to an external storage (e.g., the database 208 of FIG. 2).

At block 1624, the runtime scheduler 314 determines whether the algorithm has finished executing. If the runtime scheduler 314 determines that the algorithm has not finished executing (block 1624: NO), control returns to block 1606. If the runtime scheduler 314 determines that the algorithm has finished executing (block 1624: YES), then, at block 1626, the runtime scheduler 314 transmits the monitored data (e.g., the empirical performance characteristics) to an external device (e.g., the database 208, the variant generator 302, etc.). At block 1628, the runtime scheduler 314 determines whether there are additional algorithms. If there are additional algorithms (block: 1628: YES), control returns to block 1602. If there are no additional algorithms (block: 1628: NO), the machine readable instructions 1600 of FIG. 16 conclude.

Figure 17:
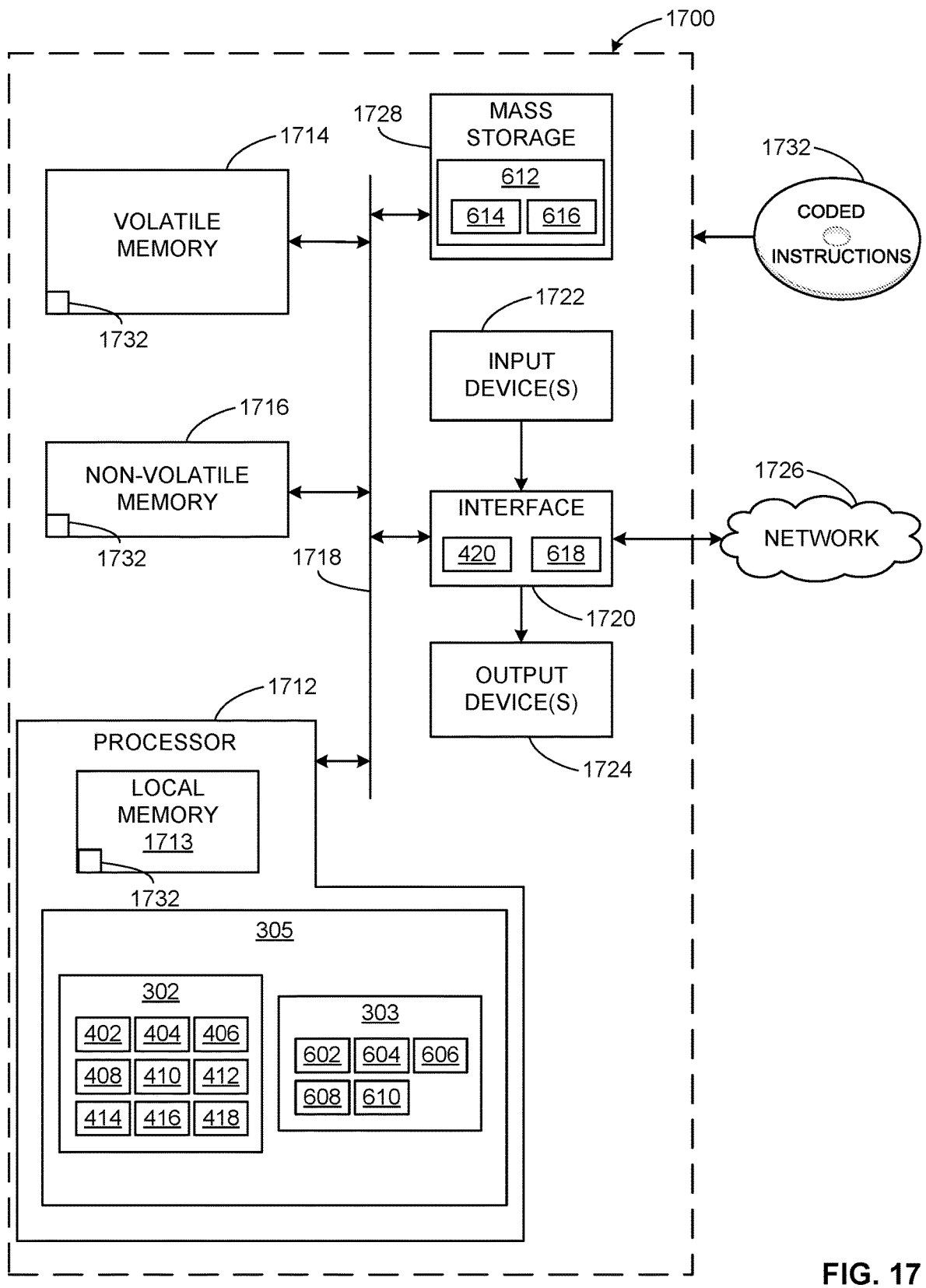
FIG. 17 is a block diagram of an example processing platform structured to execute the example machine readable instructions of FIGS. 11, 12, 14, and/or 15 to implement the example variant application of FIGS. 3, 4, 6, and/or 10.

FIG. 17 is a block diagram of an example processor platform 1700 structured to execute the instructions of FIGS. 11, 12, 14, and/or 15 to implement the variant application 305 of FIGS. 3, 4, 6, and/or 10 and/or, more generally, the third software adjustment system 301 of FIG. 3. The processor platform 1700 can be, for example, a server, a personal computer, a workstation, a self-learning machine (e.g., a neural network), a mobile device (e.g., a cell phone, a smart phone, a tablet such as an iPad™), or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1712 implements the example variant generator 302 of FIGS. 3, 4, 6, 9, and/or 10, and the example variant manager 402, the example cost model learner 404, the example weight storage 406, the example compilation auto-scheduler 408, the example variant compiler 410, the example jump table 412, the example application compiler 414, the example feedback interface 416, and the example performance analyzer 418 of FIG. 4. In this example, the processor 1712 implements the example code translator 303 of FIGS. 3, 4, 6, and/or 10, and the example code interface 602, the example code lifter 604, the example DSL generator 606, the example metadata generator 608, and/or the example code replacer 610 of FIG. 6. In this example, the processor 1712 implements the variant application 305 of FIGS. 3, 4, 6, and/or 10.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by SDRAM, DRAM, RDRAM®, and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), a Bluetooth® interface, a near field communication (NFC) interface, and/or a PCI express interface. In this example, the interface circuit 1720 implements the communication bus 420 of FIG. 4 and the communication bus 618 of FIG. 6. Alternatively, the interface circuit 1720 may implement the code interface 602 of FIG. 6.

In the illustrated example, one or more input devices 1722 are connected to the interface circuit 1720. The input device(s) 1722 permit(s) a user to enter data and/or commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1720 of the illustrated example, thus, typically includes a graphics driver card, a graphics driver chip and/or a graphics driver processor.

The interface circuit 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, redundant array of independent disks (RAID) systems, and DVD drives. In this example, the one or more mass storage devices 1728 implements the database 612 of FIG. 6, which includes the annotated code 614 and the non-annotated code 616 of FIGS. 6 and/or 7.

The machine executable instructions 1732 of FIGS. 11, 12, 14, and/or 15 may be stored in the mass storage device 1728, in the volatile memory 1714, in the non-volatile memory 1716, and/or on a removable non-transitory computer readable storage medium such as a CD or DVD.

Figure 18:
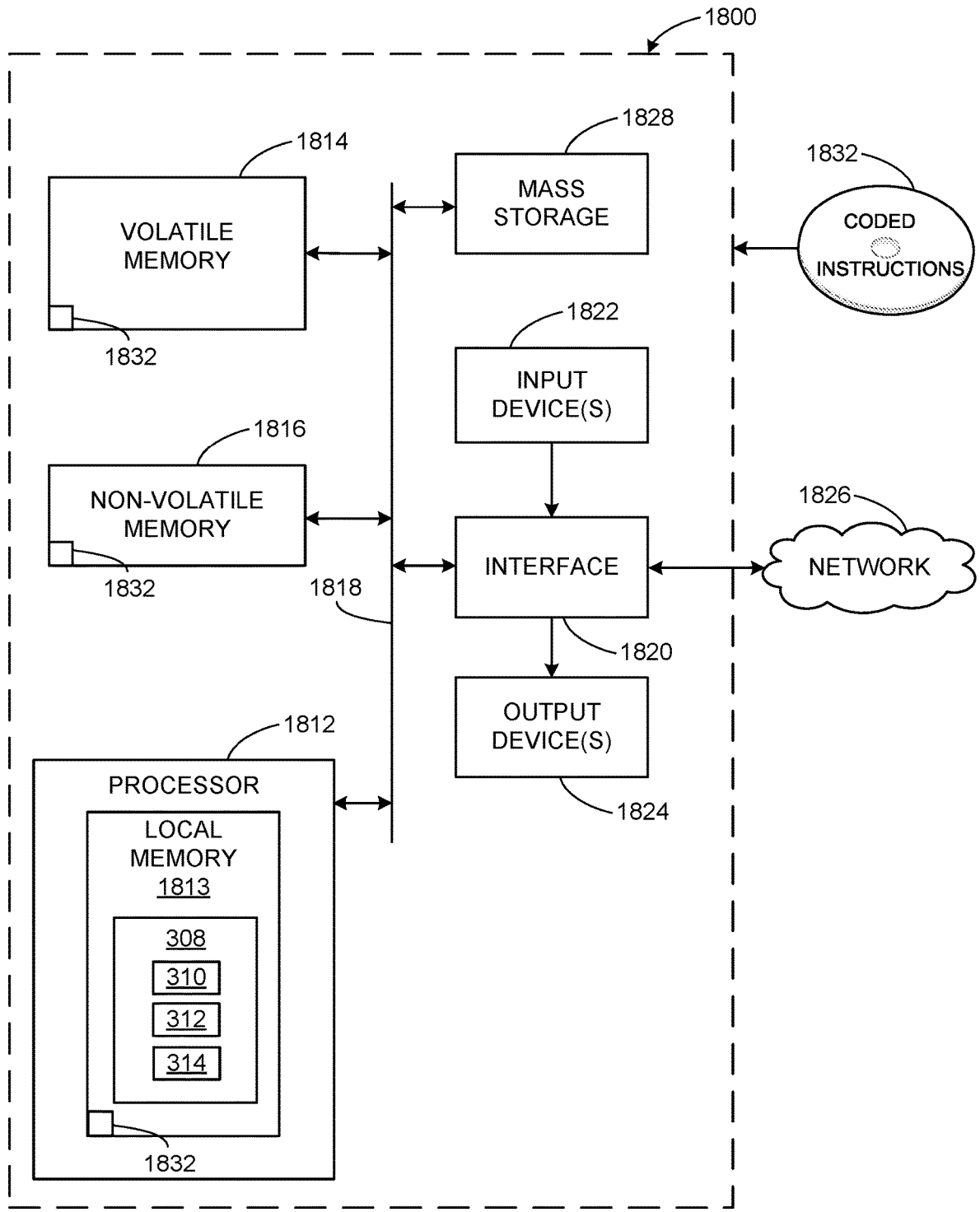
FIG. 18 is a block diagram of an example processing platform structured to execute the example machine readable instructions of FIGS. 13 and/or 16 to implement the example executable of FIGS. 3 and/or 10.

FIG. 18 is a block diagram of an example processor platform 1800 structured to execute the instructions of FIGS. 13 and/or 16 to implement the executable 308 of FIGS. 3 and/or 10. The processor platform 1800 can be, for example, a server, a personal computer, a workstation, a self-learning machine (e.g., a neural network), a mobile device (e.g., a cell phone, a smart phone, a tablet such as an iPad™), or any other type of computing device.

The processor platform 1800 of the illustrated example includes a processor 1812. The processor 1812 of the illustrated example is hardware. For example, the processor 1812 can be implemented by one or more integrated circuits, logic circuits, microprocessors, GPUs, DSPs, or controllers from any desired family or manufacturer. The hardware processor may be a semiconductor based (e.g., silicon based) device. Additionally, the processor platform 1800 may include additional processing elements such as, the example CPU 316, the example FPGA 318, the example VPU 320, and/or the example GPU 322 of FIG. 3.

The processor 1812 of the illustrated example includes a local memory 1813 (e.g., a cache). In this example, the local memory 1813 and/or, more generally, the processor 1812, includes and/or otherwise implements the example executable 308, the example variant library 310, the example jump table library 312, and the example runtime scheduler 314 of FIG. 3. The processor 1812 of the illustrated example is in communication with a main memory including a volatile memory 1814 and a non-volatile memory 1816 via a bus 1818. The volatile memory 1814 may be implemented by SDRAM, DRAM, RDRAM®, and/or any other type of random access memory device. The non-volatile memory 1816 may be implemented by flash memory and/or any other desired type of memory device. Access to the main memory 1814, 1816 is controlled by a memory controller.

The processor platform 1800 of the illustrated example also includes an interface circuit 1820. The interface circuit 1820 may be implemented by any type of interface standard, such as an Ethernet interface, a universal serial bus (USB), a Bluetooth® interface, a near field communication (NFC) interface, and/or a PCI express interface.

In the illustrated example, one or more input devices 1822 are connected to the interface circuit 1820. The input device(s) 1822 permit(s) a user to enter data and/or commands into the processor 1812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1824 are also connected to the interface circuit 1820 of the illustrated example. The output devices 1824 can be implemented, for example, by display devices (e.g., a LED, an OLED, a LCD, a CRT, an IPS display, a touchscreen, etc.), a tactile output device, a printer and/or speaker. The interface circuit 1820 of the illustrated example, thus, typically includes a graphics driver card, a graphics driver chip and/or a graphics driver processor.

The interface circuit 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1800 of the illustrated example also includes one or more mass storage devices 1828 for storing software and/or data. Examples of such mass storage devices 1828 include floppy disk drives, HDDs, CD drives, Blu-ray disk drives, RAID systems, and DVD drives.

The machine executable instructions 1832 of FIGS. 13 and/or 16 may be stored in the mass storage device 1828, in the volatile memory 1814, in the non-volatile memory 1816, and/or on a removable non-transitory computer readable storage medium such as a CD or DVD.

From the foregoing, it will be appreciated that example methods, apparatus and articles of manufacture have been disclosed that do not rely solely on theoretical understanding of processing elements, developer knowledge of algorithm transformations and other scheduling techniques, and the other pitfalls of some methods for compilation scheduling. The examples disclosed herein uses algorithms based on relatively simple semantics for denoting performance and/or power intensive code blocks in regular imperative programming language idioms. Such semantics can include metadata about developer intent beyond mere algorithmic definition. The examples disclosed herein use verified lifting techniques to convert imperative programming language code into a lifted intermediate representation or formal description of program intent. The examples disclosed herein convert the formal description of the program intent into a domain specific language representation that can be used to generate variants of the original algorithm to be deployed across one or more of a plurality of processing elements of a heterogeneous system.

The examples disclosed herein collect empirical performance characteristics as well as the difference between the desired performance (e.g., a success function) and the actual performance attained. Additionally, the examples disclosed herein allow for the continuous and automated performance improvement of a heterogeneous system without developer intervention. The disclosed methods, apparatus and articles of manufacture improve the efficiency of using a computing device by at least reducing the power consumption of an algorithm executing on a computing device by deploying workloads based on utilization of processing elements, increasing the speed of execution of an algorithm on a computing device by deploying workloads to processing elements that may be not utilized or underutilized, and increasing the usage of the various processing elements of a computing system by distributing workloads to available processing elements. The disclosed methods, apparatus and articles of manufacture are accordingly directed to one or more improvement(s) in the functioning of a computer.

Example methods, apparatus, systems, and articles of manufacture for intentional programming for heterogeneous systems are disclosed herein. Further examples and combinations thereof include the following:

Example 1 includes an apparatus for intentional programming for a heterogeneous system, the apparatus comprising a code lifter to identify annotated code corresponding to an algorithm to be executed on the heterogeneous system based on an identifier being associated with the annotated code, the annotated code in a first representation, and convert the annotated code in the first representation to intermediate code in a second representation by identifying the intermediate code as having a first algorithmic intent that corresponds to a second algorithmic intent of the annotated code, a domain specific language (DSL) generator to translate the intermediate code in the second representation to DSL code in a third representation when the first algorithmic intent matches the second algorithmic intent, the third representation corresponding to a DSL representation, and a code replacer to invoke a compiler to generate an executable including variant binaries based on the DSL code, each of the variant binaries to invoke a respective one of processing elements of the heterogeneous system to execute the algorithm.

Example 2 includes the apparatus of example 1, wherein the identifier is an imperative programming language compiler extension and the first representation is an imperative programming language representation.

Example 3 includes the apparatus of example 1, wherein the executable includes a runtime scheduler, and the code replacer is to replace the annotated code in application code with a function call to the runtime scheduler to invoke a variant binary to be loaded onto one or more of the processing elements of the heterogeneous system to execute the workload.

Example 4 includes the apparatus of example 1, further including a metadata generator to generate scheduling metadata corresponding to a power profile of the heterogeneous system, a compilation auto-scheduler to generate a schedule based on the scheduling metadata for the processing elements of the heterogeneous system, the processing elements including at least a first processing element and a second processing element, a variant compiler to compile variant binaries based on the schedule, each of the variant binaries associated with the algorithm in the DSL, the variant binaries including a first variant binary corresponding to the first processing element and a second variant binary corresponding to the second processing element, and an application compiler to compile the executable to include a runtime scheduler to select one or more of the variant binaries to execute the workload based on the schedule.

Example 5 includes the apparatus of example 1, further including a feedback interface to obtain a performance characteristic of the heterogeneous system from the executable, the performance characteristic associated with the processing elements of the heterogeneous system executing the workload at a first runtime, the executable executing according to a function designating successful execution of the executable on the heterogeneous system, the processing elements including a first processing element and a second processing element, and a performance analyzer to determine a performance delta based on the performance characteristic and the function, and prior to a second runtime, adjust, using a machine learning model, a cost model of the first processing element based on the performance delta.

Example 6 includes the apparatus of example 5, wherein the cost model is a first cost model, and further including a cost model learner, prior to the second runtime, by using a neural network, adjust a second cost model of the second processing element based on the performance delta.

Example 7 includes the apparatus of example 6, wherein the performance analyzer is to determine the performance delta by determining a difference between performance achieved at the first runtime and performance as defined by the function designating successful execution of the executable on the heterogeneous system.

Example 8 includes a non-transitory computer readable storage medium comprising instructions that, when executed, cause a machine to at least identify annotated code corresponding to an algorithm to be executed on the heterogeneous system based on an identifier being associated with the annotated code, the annotated code in a first representation, convert the annotated code in the first representation to intermediate code in a second representation by identifying the intermediate code as having a first algorithmic intent that corresponds to a second algorithmic intent of the annotated code, translate the intermediate code in the second representation to domain specific language (DSL) code in a third representation when the first algorithmic intent matches the second algorithmic intent, the third representation corresponding to a DSL representation, and invoke a compiler to generate an executable including variant binaries based on the DSL code, each of the variant binaries to invoke a respective one of processing elements of the heterogeneous system to execute the algorithm.

Example 9 includes the non-transitory computer readable storage medium of example 8, wherein the identifier is an imperative programming language compiler extension and the first representation is an imperative programming language representation.

Example 10 includes the non-transitory computer readable storage medium of example 8, wherein the executable includes a runtime scheduler, and the instructions, when executed, cause the machine to replace the annotated code in application code with a function call to the runtime scheduler to invoke a variant binary to be loaded onto the processing elements of the heterogeneous system to execute the workload.

Example 11 includes the non-transitory computer readable storage medium of example 8, wherein the instructions, when executed, cause the machine to generate scheduling metadata corresponding to a power profile of the heterogeneous system, generate a schedule based on the scheduling metadata for the processing elements of the heterogeneous system, the processing elements including at least a first processing element and a second processing element, compile variant binaries based on the schedule, each of the variant binaries associated with the algorithm in the DSL, the variant binaries including a first variant binary corresponding to the first processing element and a second variant binary corresponding to the second processing element, and compile the executable to include a runtime scheduler to select one or more of the variant binaries to execute the workload based on the schedule.

Example 12 includes the non-transitory computer readable storage medium of example 8, wherein the instructions, when executed, cause the machine to obtain a performance characteristic of the heterogeneous system from the executable, the performance characteristic associated with the processing elements of the heterogeneous system executing the workload at a first runtime, the executable executing according to a function designating successful execution of the executable on the heterogeneous system, the processing elements including a first processing element and a second processing element, determine a performance delta based on the performance characteristic and the function, and prior to a second runtime, adjust, using a machine learning model, a cost model of the first processing element based on the performance delta.

Example 13 includes the non-transitory computer readable storage medium of example 12, wherein the cost model is a first cost model, and wherein the instructions, when executed, cause the machine to, prior to the second runtime, by using a neural network, adjust a second cost model of the second processing element based on the performance delta.

Example 14 includes the non-transitory computer readable storage medium of example 13, wherein the instructions, when executed, cause the machine to determine the performance delta by determining a difference between performance achieved at the first runtime and performance as defined by the function designating successful execution of the executable on the heterogeneous system.

Example 15 includes a method for intentional programming for a heterogeneous system, the method comprising identifying annotated code corresponding to an algorithm to be executed on the heterogeneous system based on an identifier being associated with the annotated code, the annotated code in a first representation, converting the annotated code in the first representation to intermediate code in a second representation by identifying the intermediate code as having a first algorithmic intent that corresponds to a second algorithmic intent of the annotated code, translating the intermediate code in the second representation to domain specific language (DSL) code in a third representation when the first algorithmic intent matches the second algorithmic intent, the third representation corresponding to a DSL representation, and invoking a compiler to generate an executable including variant binaries based on the DSL code, each of the variant binaries to invoke a respective one of processing elements of the heterogeneous system to execute the algorithm.

Example 16 includes the method of example 15, wherein the identifier is an imperative programming language compiler extension and the first representation is an imperative programming language representation.

Example 17 includes the method of example 15, wherein the executable includes a runtime scheduler, and further including replacing the annotated code in application code with a function call to the runtime scheduler to invoke a variant binary to be loaded onto one of the processing elements of the heterogeneous system to execute the workload.

Example 18 includes the method of example 15, further including generating scheduling metadata corresponding to a power profile of the heterogeneous system, generating a schedule based on the scheduling metadata for the processing elements of the heterogeneous system, the processing elements including at least a first processing element and a second processing element, compiling variant binaries based on the schedule, each of the variant binaries associated with the algorithm in the DSL, the variant binaries including a first variant binary corresponding to the first processing element and a second variant binary corresponding to the second processing element, and compiling the executable to include a runtime scheduler to select one or more of the variant binaries to execute the workload based on the schedule.

Example 19 includes the method of example 15, further including obtaining a performance characteristic of the heterogeneous system from the executable, the performance characteristic associated with the processing elements of the heterogeneous system executing the workload at a first runtime, the executable executing according to a function designating successful execution of the executable on the heterogeneous system, the processing elements including a first processing element and a second processing element, and determining a performance delta based on the performance characteristic and the function, and prior to a second runtime, adjusting, using a machine learning model, a cost model of the first processing element based on the performance delta.

Example 20 includes the method of example 19, wherein the cost model is a first cost model, and further including, prior to the second runtime, by using a neural network, adjusting a second cost model of the second processing element based on the performance delta.

Example 21 includes the method of example 20, wherein determining the performance delta includes determining a difference between performance achieved at the first runtime and performance as defined by the function designating successful execution of the executable on the heterogeneous system.

Example 22 includes an apparatus for intentional programming for a heterogeneous system, the apparatus comprising means for identifying annotated code corresponding to an algorithm to be executed on the heterogeneous system based on an identifier being associated with the annotated code, the annotated code in a first representation, means for converting the annotated code in the first representation to intermediate code in a second representation by identifying the intermediate code as having a first algorithmic intent that corresponds to a second algorithmic intent of the annotated code, means for translating the intermediate code in the second representation to domain specific language (DSL) code in a third representation when the first algorithmic intent matches the second algorithmic intent, the third representation corresponding to a DSL representation, and means for invoking a compiler to generate an executable including variant binaries based on the DSL code, each of the variant binaries to invoke a respective one of processing elements of the heterogeneous system to execute the algorithm.

Example 23 includes the apparatus of example 22, wherein the identifier is an imperative programming language compiler extension and the first representation is an imperative programming language representation.

Example 24 includes the apparatus of example 22, wherein the executable includes a runtime scheduler, and further including means for replacing the annotated code in application code with a function call to the runtime scheduler to invoke a variant binary to be loaded onto one of the processing elements of the heterogeneous system to execute the workload.

Example 25 includes the apparatus of example 22, further including first means for generating scheduling metadata corresponding to a power profile of the heterogeneous system, second means for generating a schedule based on the scheduling metadata for the processing elements of the heterogeneous system, the processing elements including at least a first processing element and a second processing element, first means for compiling variant binaries based on the schedule, each of the variant binaries associated with the algorithm in the DSL, the variant binaries including a first variant binary corresponding to the first processing element and a second variant binary corresponding to the second processing element, and second means for compiling the executable to include a runtime scheduler to select one or more of the variant binaries to execute the workload based on the schedule.

Example 26 includes the apparatus of example 22, further including means for obtaining a performance characteristic of the heterogeneous system from the executable, the performance characteristic associated with the processing elements of the heterogeneous system executing the workload at a first runtime, the executable executing according to a function designating successful execution of the executable on the heterogeneous system, the processing elements including a first processing element and a second processing element, means for determining a performance delta based on the performance characteristic and the function, and prior to a second runtime, means for adjusting, using a machine learning model, a cost model of the first processing element based on the performance delta.

Example 27 includes the apparatus of example 26, wherein the cost model is a first cost model, and further including prior to the second runtime, by using a neural network, means for adjusting a second cost model of the second processing element based on the performance delta.

Example 28 includes the apparatus of example 26, wherein the means for determining is to determine the performance delta by determining a difference between performance achieved at the first runtime and performance as defined by the function designating successful execution of the executable on the heterogeneous system.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A method comprising:
   identifying a first code block in an intermediate representation based on an input code block in an imperative programming language representation, the first code block having a first purpose, the input code block having a second purpose associated with the first purpose;
   translating the first code block from the intermediate representation to a domain specific language (DSL) representation;

compiling, by executing an instruction with at least one processor circuit, the DSL representation of the first code block into an executable variant of the input code block, the executable variant to be executed by an accelerator; and outputting the executable variant.

2. The method of claim 1, wherein the accelerator includes at least one of a field programmable gate array, a graphics processing unit, a vision processing unit, an application specific integrated circuit, an application-specific instruction set processor, a physics processing unit, a digital signal processor, an image processor, a coprocessor, a floating-point unit, a network processor, or a front-end processor.

3. At least one non-transitory computer readable storage medium comprising instructions that cause at least one processor circuit to at least:

identify a first code block in an intermediate representation based on an input code block in an imperative programming language representation, the first code block having a first purpose, the input code block having a second purpose associated with the first purpose;

translate the first code block from the intermediate representation to a domain specific language (DSL) representation;

compile the DSL representation of the first code block into an executable variant of the input code block, the executable variant to be executed by an accelerator; and output the executable variant.

4. The at least one non-transitory computer readable storage medium of claim 3, wherein the accelerator includes at least one of a field programmable gate array, a graphics processing unit, a vision processing unit, an application specific integrated circuit, an application-specific instruction set processor, a physics processing unit, a digital signal processor, an image processor, a coprocessor, a floating-point unit, a network processor, or a front-end processor.

5. The at least one non-transitory computer readable storage medium of claim 3, wherein the instructions cause one or more of the at least one processor circuit to determine that the second purpose corresponds to the first purpose by executing a machine learning model.

6. The at least one non-transitory computer readable storage medium of claim 3, wherein the instructions cause one or more of the at least one processor circuit to:

determine that the input code block includes a loop;

determine that the first code block is a stencil code block; and translate the first code block into the DSL representation based on a replacement of the loop with the stencil code block.

7. The at least one non-transitory computer readable storage medium of claim 3, wherein the accelerator is a first accelerator, and the instructions cause one or more of the at least one processor circuit to:

generate a first schedule for the first accelerator to execute a first portion of a workload, the first schedule based on the DSL representation;

generate a second schedule for a second accelerator to execute a second portion of the workload, the second schedule based on the DSL representation;

cause the first accelerator to execute the first portion based on the first schedule; and cause the second accelerator to execute the second portion based on the second schedule.

8. The at least one non-transitory computer readable storage medium of claim 7, wherein the instructions cause one or more of the at least one processor circuit to determine that the first accelerator is to execute the first portion in parallel with the execution of the second portion by the second accelerator.

9. The at least one non-transitory computer readable storage medium of claim 7, wherein the second accelerator is a graphics processing unit, and the instructions cause one or more of the at least one processor circuit to:

determine that the first accelerator is to execute the first portion and the second portion; and based on a determination that utilization of the first accelerator satisfies a threshold, cause the first accelerator to offload the second portion to the graphics processing unit.

10. The at least one non-transitory computer readable storage medium of claim 3, wherein the instructions cause one or more of the at least one processor circuit to output the executable variant to the accelerator.

11. An apparatus comprising:

at least one interface circuit;

machine-readable instructions; and at least one processor circuit to utilize the machine-readable instructions to at least:

identify a first code block in an intermediate representation based on an input code block in an imperative programming language representation, the first code block having a first purpose, the input code block having a second purpose associated with the first purpose;

translate the first code block from the intermediate representation to a domain specific language (DSL) representation;

compile the DSL representation of the first code block into an executable variant of the input code block, the executable variant to be executed by an accelerator; and output the executable variant.

12. The apparatus of claim 11, wherein the accelerator includes at least one of a field programmable gate array, a graphics processing unit, a vision processing unit, an application specific integrated circuit, an application-specific instruction set processor, a physics processing unit, a digital signal processor, an image processor, a coprocessor, a floating-point unit, a network processor, or a front-end processor.

13. The apparatus of claim 11, wherein one or more of the at least one processor circuit is to determine that the second purpose corresponds to the first purpose by executing a machine learning model.

14. The apparatus of claim 11, wherein one or more of the at least one processor circuit is to:

determine that the input code block includes a loop;

determine that the first code block is a stencil code block; and translate the first code block into the DSL representation based on a replacement of the loop with the stencil code block.

15. The apparatus of claim 11, wherein the accelerator is a first accelerator, and one or more of the at least one processor circuit is to:

generate a first schedule for the first accelerator to execute a first portion of a workload, the first schedule based on the DSL representation;

generate a second schedule for a second accelerator to execute a second portion of the workload, the second schedule based on the DSL representation;

cause the first accelerator to execute the first portion based on the first schedule; and cause the second accelerator to execute the second portion based on the second schedule.

16. The apparatus of claim 15, wherein one or more of the at least one processor circuit is to determine that the first accelerator is to execute the first portion in parallel with the execution of the second portion by the second accelerator.

17. The apparatus of claim 15, wherein the second accelerator is a graphics processing unit, and one or more of the at least one processor circuit is to:
   determine that the first accelerator is to execute the first portion and the second portion; and
   based on a determination that utilization of the first accelerator satisfies a threshold, cause the first accelerator to offload the second portion to the graphics processing unit.

18. The apparatus of claim 11, wherein one or more of the at least one processor circuit is to output the executable variant to the accelerator.

* * * * *